US012798805B2

(12) United States Patent
Lowe et al.

(10) Patent No.: US 12,798,805 B2
(45) Date of Patent: Nov. 17, 2026

(54) BASE STATION FOR AN UNMANNED AERIAL VEHICLE INCLUDING A ROTATABLE ROOF ASSEMBLY

(71) Applicant: Skydio, Inc., San Mateo, CA (US)

(72) Inventors: Patrick Allen Lowe, Palo Alto, CA (US); Christopher C. Berthelet, Sunnyvale, CA (US); George Oliver Turvey, Brookdale, CA (US); Yee Shan Woo, Columbus, OH (US); Kellen James Waterman O'Rourke, Belmont, CA (US); Lingyun Luo, Foster City, CA (US); Benjamin Scott Thompson, San Carlos, CA (US); Joseph Tankeh, Fremont, CA (US); Hunter Celio, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/222,036

(22) Filed: May 29, 2025

(65) Prior Publication Data

US 2026/0138763 A1 May 21, 2026

Related U.S. Application Data

(60) Provisional application No. 63/683,504, filed on Aug. 15, 2024.

(51) Int. Cl.
*B64U 70/90* (2023.01)
*B64U 80/70* (2023.01)
*B64U 80/25* (2023.01)

(52) U.S. Cl.
CPC ............ *B64U 80/70* (2023.01); *B64U 70/90* (2023.01); *B64U 80/25* (2023.01)

(58) Field of Classification Search
CPC ......... B64U 80/70; B64U 80/25; B64U 70/90
See application file for complete search history.

(56) References Cited

U.S. PATENT DOCUMENTS 3,229,649 A * 1/1966 Baker ....................... E04H 9/10
109/1 R
3,253,806 A 5/1966 Eickmann
(Continued)

FOREIGN PATENT DOCUMENTS

CN 117818944 A 4/2024
CN 220764753 U 4/2024

OTHER PUBLICATIONS

International Search Report and Written Opinion mailed on Jan. 9, 2026 in corresponding PCT Application No. PCT/US2025/041862.

*Primary Examiner* — Tye William Abell
(74) *Attorney, Agent, or Firm* — Young Basile Hanlon & MacFarlane, P.C.

(57) ABSTRACT

A base station for an unmanned aerial vehicle (UAV) that includes a base that includes a body defining a cavity therein and a landing platform supported by the body and configured to support the UAV. The base station also includes a roof assembly movably coupled to the base to move between a closed position, in which the roof assembly is configured to enclose the landing platform, and an open position, in which the roof assembly is located such that the landing platform is unobstructed by the roof assembly. The roof assembly is actuated between the closed position and the open position by a drive system that includes a first drive assembly located in the cavity of the body and extending through a first side panel of the body to couple to a first side of the roof assembly, and a second drive assembly disposed in the cavity of the body and extending through a second side panel of the body to couple to an opposing second side of the roof assembly.

20 Claims, 32 Drawing Sheets

(56) References Cited

U.S. PATENT DOCUMENTS

| | | | |
|---|---|---|---|
| 3,417,729 | A | 12/1968 | Gilday et al. |
| 3,483,696 | A | 12/1969 | Gilbert et al. |
| 3,575,527 | A | 4/1971 | Watanabe et al. |
| 3,805,723 | A | 4/1974 | Bernaerts |
| 4,262,712 | A | 4/1981 | Young |
| 4,865,248 | A | 9/1989 | Barth |
| 4,954,962 | A | 9/1990 | Evans, Jr. et al. |
| 4,974,795 | A | 12/1990 | Christol |
| 5,040,116 | A | 8/1991 | Evans, Jr. et al. |
| 5,116,273 | A | 5/1992 | Chan |
| 5,283,739 | A | 2/1994 | Summerville et al. |
| 5,371,581 | A | 12/1994 | Wangler et al. |
| 5,386,462 | A | 1/1995 | Schlamp |
| 5,452,374 | A | 9/1995 | Cullen et al. |
| 5,497,236 | A | 3/1996 | Wolff et al. |
| 5,731,884 | A | 3/1998 | Inoue |
| 5,842,667 | A | 12/1998 | Jones |
| 5,847,522 | A | 12/1998 | Barba |
| 5,901,253 | A | 5/1999 | Tretter |
| 5,995,898 | A | 11/1999 | Tuttle |
| 6,031,612 | A | 2/2000 | Shirley |
| 6,073,283 | A | 6/2000 | Zheng |
| 6,079,668 | A | 6/2000 | Brown |
| 6,193,190 | B1 | 2/2001 | Nance |
| 6,266,577 | B1 | 7/2001 | Popp et al. |
| 6,344,796 | B1 | 2/2002 | Ogilvie et al. |
| 6,374,155 | B1 | 4/2002 | Wallach et al. |
| 6,426,699 | B1 | 7/2002 | Porter |
| 6,507,670 | B1 | 1/2003 | Moed |
| 6,543,983 | B1 | 4/2003 | Felder et al. |
| 6,636,781 | B1 | 10/2003 | Shen et al. |
| 6,676,460 | B1 | 1/2004 | Motsenbocker |
| 6,690,997 | B2 | 2/2004 | Rivalto |
| 6,694,217 | B2 | 2/2004 | Bloom |
| 6,705,523 | B1 | 3/2004 | Stamm et al. |
| 6,804,607 | B1 | 10/2004 | Wood |
| 6,919,803 | B2 | 7/2005 | Breed |
| 6,954,290 | B1 | 10/2005 | Braudaway et al. |
| 6,961,711 | B1 | 11/2005 | Chee |
| 6,965,440 | B1 | 11/2005 | Nakagiri et al. |
| 6,970,838 | B1 | 11/2005 | Kamath et al. |
| 7,006,952 | B1 | 2/2006 | Matsumoto et al. |
| 7,016,536 | B1 | 3/2006 | Ling et al. |
| 7,031,519 | B2 | 4/2006 | Elmenhurst |
| 7,082,883 | B1 | 8/2006 | Arias |
| 7,129,817 | B2 | 10/2006 | Yamagishi |
| 7,133,743 | B2 | 11/2006 | Tilles et al. |
| 7,145,699 | B2 | 12/2006 | Dolan |
| 7,149,611 | B2 | 12/2006 | Beck et al. |
| 7,171,879 | B2 | 2/2007 | Gass et al. |
| 7,188,513 | B2 | 3/2007 | Wilson |
| 7,334,755 | B2 | 2/2008 | Svoboda, Jr. |
| 7,335,071 | B1 | 2/2008 | Motsenbocker |
| 7,337,686 | B2 | 3/2008 | Sagi-Dolev |
| 7,337,944 | B2 | 3/2008 | Devar |
| 7,339,993 | B1 | 3/2008 | Brooks et al. |
| 7,459,880 | B1 | 12/2008 | Rosen |
| 7,639,386 | B1 | 12/2009 | Siegel et al. |
| 7,668,404 | B2 | 2/2010 | Adams et al. |
| 7,673,831 | B2 | 3/2010 | Steele et al. |
| 7,685,953 | B2 | 3/2010 | Giles |
| 7,693,745 | B1 | 4/2010 | Pomerantz et al. |
| 7,780,148 | B2 | 8/2010 | Kirby |
| 7,894,939 | B2 | 2/2011 | Zini et al. |
| 7,925,375 | B2 | 4/2011 | Schininger et al. |
| 7,946,526 | B2 | 5/2011 | Zimet |
| 7,946,530 | B1 | 5/2011 | Talmage, Jr. |
| 7,966,093 | B2 | 6/2011 | Zhuk |
| 8,015,023 | B1 | 9/2011 | Lee et al. |
| 8,052,081 | B2 | 11/2011 | Olm et al. |
| 8,078,317 | B2 | 12/2011 | Allinson et al. |
| 8,126,642 | B2 | 2/2012 | Trepagnier et al. |
| 8,131,607 | B2 | 3/2012 | Park et al. |
| 8,145,351 | B2 | 3/2012 | Schininger et al. |
| 8,195,328 | B2 | 6/2012 | Mallett et al. |
| 8,245,469 | B2 | 8/2012 | Rubel et al. |
| 8,256,172 | B2 | 9/2012 | Benson |
| 8,286,236 | B2 | 10/2012 | Jung et al. |
| 8,412,588 | B1 | 4/2013 | Bodell et al. |
| 8,424,802 | B2 | 4/2013 | Tripier-Larivaud |
| 8,429,754 | B2 | 4/2013 | Jung et al. |
| 8,511,606 | B1 | 8/2013 | Lutke et al. |
| 8,599,027 | B2 | 12/2013 | Sanchez |
| 8,602,349 | B2 | 12/2013 | Petrov |
| 8,639,400 | B1 | 1/2014 | Wong |
| 8,736,820 | B2 | 5/2014 | Choe et al. |
| 8,752,166 | B2 | 6/2014 | Jung et al. |
| 8,791,790 | B2 | 7/2014 | Robertson et al. |
| 8,874,301 | B1 | 10/2014 | Rao et al. |
| 8,899,903 | B1 | 12/2014 | Saad et al. |
| 8,948,914 | B2 | 2/2015 | Zini et al. |
| 8,956,100 | B2 | 2/2015 | Davi et al. |
| 8,989,053 | B1 | 3/2015 | Skaaksrud et al. |
| 9,033,285 | B2 | 5/2015 | Iden et al. |
| 9,050,997 | B1 | 6/2015 | Schramm |
| 9,051,043 | B1 | 6/2015 | Peeters et al. |
| 9,056,676 | B1 | 6/2015 | Wang |
| 9,079,587 | B1 | 7/2015 | Rupp et al. |
| 9,126,693 | B1 | 9/2015 | Shi et al. |
| 9,139,310 | B1 | 9/2015 | Wang |
| 9,163,909 | B2 | 10/2015 | Chengalva |
| 9,193,452 | B2 | 11/2015 | Carreker |
| 9,195,959 | B1 | 11/2015 | Lopez et al. |
| 9,216,587 | B2 | 12/2015 | Ando et al. |
| 9,216,857 | B1 | 12/2015 | Kalyan et al. |
| 9,235,213 | B2 | 1/2016 | Villamar |
| 9,244,147 | B1 | 1/2016 | Soundararajan et al. |
| 9,256,852 | B1 | 2/2016 | Myllymaki |
| 9,261,578 | B2 | 2/2016 | Im et al. |
| 9,290,277 | B2 | 3/2016 | You |
| 9,321,531 | B1 | 4/2016 | Takayama et al. |
| 9,336,635 | B2 | 5/2016 | Robertson et al. |
| 9,358,975 | B1 | 6/2016 | Watts |
| 9,381,916 | B1 | 7/2016 | Zhu et al. |
| 9,387,928 | B1 | 7/2016 | Gentry et al. |
| 9,397,518 | B1 | 7/2016 | Theobald |
| 9,404,761 | B2 | 8/2016 | Meuleau |
| 9,409,644 | B2 | 8/2016 | Stanek et al. |
| 9,411,337 | B1 | 8/2016 | Theobald et al. |
| 9,412,280 | B1 | 8/2016 | Zwillinger et al. |
| 9,421,869 | B1 | 8/2016 | Ananthanarayanan et al. |
| 9,436,183 | B2 | 9/2016 | Thakur et al. |
| 9,436,926 | B2 | 9/2016 | Cousins et al. |
| 9,446,858 | B2 | 9/2016 | Hess |
| 9,448,559 | B2 | 9/2016 | Kojo et al. |
| 9,457,899 | B2 | 10/2016 | Duffy et al. |
| 9,489,490 | B1 | 11/2016 | Theobald |
| 9,527,605 | B1 | 12/2016 | Gentry et al. |
| 9,535,421 | B1 | 1/2017 | Canoso et al. |
| 9,551,989 | B2 | 1/2017 | Scarlatti et al. |
| 9,561,941 | B1 | 2/2017 | Watts |
| 9,563,201 | B1 | 2/2017 | Tofte et al. |
| 9,568,335 | B2 | 2/2017 | Thakur et al. |
| 9,582,950 | B2 | 2/2017 | Shimizu et al. |
| 9,589,448 | B1 | 3/2017 | Schneider et al. |
| 9,600,645 | B2 | 3/2017 | Fadell et al. |
| 9,619,776 | B1 | 4/2017 | Ford et al. |
| 9,623,562 | B1 | 4/2017 | Watts |
| 9,643,722 | B1 | 5/2017 | Myslinski |
| 9,650,136 | B1 | 5/2017 | Haskin et al. |
| 9,652,912 | B2 | 5/2017 | Fadell et al. |
| 9,656,805 | B1 | 5/2017 | Evans et al. |
| 9,671,791 | B1 | 6/2017 | Paczan |
| 9,676,481 | B1 | 6/2017 | Buchmueller |
| 9,677,564 | B1 | 6/2017 | Woodworth et al. |
| 9,697,730 | B2 | 7/2017 | Thakur et al. |
| 9,718,564 | B1 | 8/2017 | Beckman et al. |
| 9,720,414 | B1 | 8/2017 | Theobald |
| 9,733,646 | B1 | 8/2017 | Nusser et al. |
| 9,746,852 | B1 | 8/2017 | Watts et al. |
| 9,746,853 | B2 | 8/2017 | Scheepjens et al. |
| 9,777,502 | B2 | 10/2017 | Curlander et al. |
| 9,778,653 | B1 | 10/2017 | McClintock et al. |
| 9,783,075 | B2 | 10/2017 | Henry et al. |

(56) References Cited

U.S. PATENT DOCUMENTS

| | | | |
|---|---|---|---|
| 9,783,301 | B2 | 10/2017 | Schliwa et al. |
| 9,786,187 | B1 | 10/2017 | Bar-Zeev et al. |
| 9,796,529 | B1 | 10/2017 | Hoareau et al. |
| 9,815,633 | B1 | 11/2017 | Kisser et al. |
| 9,828,092 | B1 | 11/2017 | Navot et al. |
| 9,858,604 | B2 | 1/2018 | Apsley et al. |
| 9,886,035 | B1 | 2/2018 | Watts et al. |
| 9,896,204 | B1 | 2/2018 | Willison |
| 9,957,045 | B1 | 5/2018 | Daly |
| 9,959,771 | B1 | 5/2018 | Carlson |
| 9,974,612 | B2 | 5/2018 | Pinter et al. |
| 10,022,753 | B2 | 7/2018 | Chelian et al. |
| 10,048,697 | B1 | 8/2018 | Theobald |
| 10,099,561 | B1 | 10/2018 | Ananthanarayanan et al. |
| 10,099,785 | B1 | 10/2018 | Gonzalez |
| 10,108,185 | B1 | 10/2018 | Theobald |
| 10,137,984 | B1 | 11/2018 | Flick |
| 10,176,722 | B1 | 1/2019 | Boyd et al. |
| 10,239,638 | B1 | 3/2019 | Cohen et al. |
| 10,249,200 | B1 | 4/2019 | Grenier et al. |
| 10,268,208 | B1 | 4/2019 | Hopwood Thomas |
| 10,287,033 | B2 | 5/2019 | Hu |
| 10,310,501 | B2 | 6/2019 | Greenberger et al. |
| 10,434,885 | B2 | 10/2019 | Antonini et al. |
| 10,467,685 | B1 | 11/2019 | Brisson et al. |
| 10,526,094 | B2 * | 1/2020 | Cheng .................... B64U 80/25 |
| 10,534,372 | B2 * | 1/2020 | Fisher ...................... G08G 5/76 |
| 10,558,226 | B1 | 2/2020 | Bigdeli |
| 10,577,126 | B2 | 3/2020 | Mozer |
| 10,719,080 | B2 | 7/2020 | Zhang et al. |
| 10,745,102 | B2 | 8/2020 | Nysæter et al. |
| 10,745,132 | B1 | 8/2020 | Kimchi |
| 10,780,988 | B2 | 9/2020 | Buchmueller et al. |
| 10,793,268 | B2 * | 10/2020 | Wolf-Monheim ... B62D 63/025 |
| 10,807,846 | B1 | 10/2020 | Vos, Jr. |
| D903,576 | S | 12/2020 | Feldman |
| 10,860,115 | B1 | 12/2020 | Tran |
| 10,870,498 | B2 | 12/2020 | Zambelli |
| 10,875,648 | B2 | 12/2020 | Schmalzried et al. |
| 10,899,436 | B2 | 1/2021 | Gentry |
| 10,967,970 | B2 | 4/2021 | Van Niekerk et al. |
| 10,988,949 | B2 | 4/2021 | Puchner et al. |
| 11,007,290 | B2 | 5/2021 | Kreitenberg et al. |
| 11,079,752 | B1 | 8/2021 | Lombardini |
| 11,111,033 | B1 | 9/2021 | Burks et al. |
| D932,369 | S | 10/2021 | Passley |
| 11,148,808 | B2 | 10/2021 | Wiggerich |
| 11,156,010 | B1 | 10/2021 | Corban |
| 11,164,149 | B1 | 11/2021 | Williams et al. |
| 11,180,253 | B1 | 11/2021 | Seeley |
| 11,235,890 | B1 | 2/2022 | Dahlstrom et al. |
| 11,292,620 | B1 | 4/2022 | Molony |
| 11,370,561 | B2 | 6/2022 | Ratajczak et al. |
| 11,459,117 | B1 | 10/2022 | Shapiro |
| 11,511,886 | B1 | 11/2022 | Tian |
| 11,524,596 | B2 | 12/2022 | Cheng et al. |
| 11,534,801 | B2 | 12/2022 | Volta et al. |
| 11,572,197 | B1 | 2/2023 | Nevdahs et al. |
| 11,597,515 | B2 | 3/2023 | Passley |
| 11,597,516 | B1 | 3/2023 | Klinkmueller et al. |
| 11,603,218 | B2 | 3/2023 | Fisher et al. |
| 11,603,219 | B2 | 3/2023 | Ratajczak et al. |
| 11,619,952 | B2 | 4/2023 | Kwon et al. |
| 11,628,932 | B2 | 4/2023 | Seung et al. |
| 11,636,771 | B2 | 4/2023 | Barker et al. |
| 11,641,966 | B2 | 5/2023 | Nakanishi |
| 11,649,050 | B1 | 5/2023 | Miller |
| 11,655,048 | B2 | 5/2023 | Sugimoto et al. |
| 11,667,402 | B2 | 6/2023 | Liske et al. |
| 11,673,690 | B2 | 6/2023 | Dayan et al. |
| 11,710,092 | B2 | 7/2023 | Dearing |
| 11,713,136 | B2 | 8/2023 | Foggia et al. |
| 11,714,189 | B2 | 8/2023 | Padmanabhan et al. |
| 11,738,867 | B2 | 8/2023 | Ehasoo et al. |
| 11,741,422 | B2 | 8/2023 | Gil et al. |
| 11,748,688 | B2 | 9/2023 | Ur |
| 11,760,485 | B2 | 9/2023 | Wabnegger et al. |
| 11,767,129 | B2 | 9/2023 | Warwick et al. |
| 11,772,814 | B2 | 10/2023 | Dubois et al. |
| 11,776,136 | B1 | 10/2023 | Pachikov et al. |
| 11,780,606 | B2 | 10/2023 | Carthew et al. |
| 11,794,894 | B2 | 10/2023 | Brock et al. |
| 11,794,922 | B1 | 10/2023 | Twyford et al. |
| 11,808,580 | B1 | 11/2023 | Ebrahimi Afrouzi et al. |
| 11,814,191 | B2 | 11/2023 | Cheng et al. |
| 11,814,241 | B2 | 11/2023 | Tian |
| D1,008,873 | S | 12/2023 | Lin |
| 11,840,152 | B2 | 12/2023 | Fisher et al. |
| 11,851,162 | B1 | 12/2023 | Daube et al. |
| 11,851,209 | B2 | 12/2023 | Fisher et al. |
| 11,858,662 | B2 | 1/2024 | Gil |
| 11,866,168 | B2 | 1/2024 | Cooper et al. |
| 11,868,146 | B2 | 1/2024 | Yasunaga et al. |
| 11,884,422 | B2 | 1/2024 | Lowe et al. |
| 11,898,368 | B2 | 2/2024 | Blake et al. |
| 11,900,823 | B2 | 2/2024 | Surace |
| 11,932,315 | B2 | 3/2024 | Hwang et al. |
| 11,933,613 | B2 | 3/2024 | Michini et al. |
| 11,939,046 | B1 | 3/2024 | Berry et al. |
| 11,939,057 | B2 | 3/2024 | Hamm |
| 11,939,080 | B2 | 3/2024 | Cowden |
| 11,939,083 | B2 | 3/2024 | Baklycki |
| 12,032,388 | B2 | 7/2024 | Villiers |
| 12,043,421 | B2 | 7/2024 | Cevacins et al. |
| 12,059,089 | B1 | 8/2024 | Dunn |
| 12,078,912 | B2 | 9/2024 | Valio et al. |
| 12,084,211 | B2 | 9/2024 | Li et al. |
| 12,091,194 | B2 | 9/2024 | Wang et al. |
| 12,099,370 | B2 | 9/2024 | Jourdan et al. |
| 12,122,243 | B2 | 10/2024 | Shah et al. |
| 12,134,329 | B2 | 11/2024 | Todeschini |
| 12,168,533 | B1 | 12/2024 | Hinman et al. |
| 12,172,777 | B2 | 12/2024 | Carthew et al. |
| 12,195,213 | B2 | 1/2025 | Qi et al. |
| 12,420,961 | B2 * | 9/2025 | Jeong ..................... B64U 70/00 |
| 2001/0045449 | A1 | 11/2001 | Shannon |
| 2002/0016726 | A1 | 2/2002 | Ross |
| 2002/0035450 | A1 | 3/2002 | Thackston |
| 2002/0072979 | A1 | 6/2002 | Sinha et al. |
| 2002/0087375 | A1 | 7/2002 | Griffin et al. |
| 2002/0107751 | A1 | 8/2002 | Rajagopalan et al. |
| 2002/0111914 | A1 | 8/2002 | Terada et al. |
| 2002/0116289 | A1 | 8/2002 | Yang |
| 2002/0123930 | A1 | 9/2002 | Boyd et al. |
| 2002/0156645 | A1 | 10/2002 | Hansen |
| 2003/0040980 | A1 | 2/2003 | Nakajima et al. |
| 2003/0072031 | A1 | 4/2003 | Kuwata et al. |
| 2003/0121968 | A1 | 7/2003 | Miller et al. |
| 2003/0141411 | A1 | 7/2003 | Pandya et al. |
| 2004/0002898 | A1 | 1/2004 | Kuhlmann et al. |
| 2004/0068416 | A1 | 4/2004 | Solomon |
| 2004/0112660 | A1 | 6/2004 | Johansson et al. |
| 2004/0160335 | A1 | 8/2004 | Reitmeier |
| 2004/0162638 | A1 | 8/2004 | Solomon |
| 2004/0256519 | A1 | 12/2004 | Ellis et al. |
| 2004/0257199 | A1 | 12/2004 | Fitzgibbon et al. |
| 2005/0061910 | A1 | 3/2005 | Wobben |
| 2005/0068178 | A1 | 3/2005 | Lee et al. |
| 2005/0093865 | A1 | 5/2005 | Jia |
| 2005/0102240 | A1 | 5/2005 | Misra et al. |
| 2005/0178894 | A1 | 8/2005 | McGeer et al. |
| 2005/0244060 | A1 | 11/2005 | Nagarajan et al. |
| 2005/0285934 | A1 | 12/2005 | Carter |
| 2006/0038067 | A1 | 2/2006 | Dennis |
| 2006/0053534 | A1 | 3/2006 | Mullen |
| 2006/0118162 | A1 | 6/2006 | Saelzer et al. |
| 2006/0136237 | A1 | 6/2006 | Spiegel et al. |
| 2006/0249622 | A1 | 11/2006 | Steele |
| 2006/0287829 | A1 | 12/2006 | Pashko-Paschenko |
| 2007/0016496 | A1 | 1/2007 | Bar et al. |
| 2007/0073552 | A1 | 3/2007 | Hileman |
| 2007/0102565 | A1 | 5/2007 | Speer et al. |
| 2007/0150375 | A1 | 6/2007 | Yang |
| 2007/0170237 | A1 | 7/2007 | Neff |

(56) References Cited

U.S. PATENT DOCUMENTS

2007/0176432 A1 8/2007 Rolt
2007/0210953 A1 9/2007 Abraham et al.
2007/0233337 A1 10/2007 Plishner
2007/0244763 A1 10/2007 Williams et al.
2007/0246601 A1 10/2007 Layton
2007/0262195 A1 11/2007 Bulaga et al.
2007/0293978 A1 12/2007 Wurman et al.
2008/0012697 A1 1/2008 Smith et al.
2008/0027591 A1 1/2008 Lenser et al.
2008/0100258 A1 5/2008 Ward
2008/0109246 A1 5/2008 Russell
2008/0111816 A1 5/2008 Abraham et al.
2008/0141921 A1 6/2008 Hinderks
2008/0150679 A1 6/2008 Bloomfield
2008/0154659 A1 6/2008 Bettes et al.
2008/0167817 A1 7/2008 Hessler et al.
2008/0184906 A1 8/2008 Kejha
2008/0189012 A1 8/2008 Kaufmann
2008/0217486 A1 9/2008 Colten et al.
2008/0301009 A1 12/2008 Plaster et al.
2009/0027253 A1 1/2009 van Tooren et al.
2009/0057486 A1 3/2009 Becht, IV et al.
2009/0062974 A1 3/2009 Tamamoto et al.
2009/0063166 A1 3/2009 Palmer
2009/0079388 A1 3/2009 Reddy
2009/0086275 A1 4/2009 Liang et al.
2009/0091435 A1 4/2009 Bolourchi
2009/0106124 A1 4/2009 Yang
2009/0149985 A1 6/2009 Chirnomas
2009/0164379 A1 6/2009 Jung et al.
2009/0165127 A1 6/2009 Jung et al.
2009/0216394 A1 8/2009 Heppe et al.
2009/0236470 A1 9/2009 Goossen et al.
2009/0254457 A1 10/2009 Folsom
2009/0254482 A1 10/2009 Vadlamani et al.
2009/0299903 A1 12/2009 Hung et al.
2009/0303507 A1 12/2009 Abeloe
2009/0314883 A1 12/2009 Arlton et al.
2010/0007479 A1 1/2010 Smith
2010/0030608 A1 2/2010 Kaminsky et al.
2010/0031351 A1 2/2010 Jung et al.
2010/0038480 A1 2/2010 Wu et al.
2010/0088163 A1 4/2010 Davidson et al.
2010/0088175 A1 4/2010 Lundquist
2010/0100269 A1 4/2010 Ekhaguere et al.
2010/0169185 A1 7/2010 Cottingham
2010/0170993 A1 7/2010 Misegades
2010/0206145 A1 8/2010 Tetelbaum et al.
2010/0287065 A1 11/2010 Alivandi
2010/0299067 A1 11/2010 McCollough et al.
2010/0299222 A1 11/2010 Hamilton, IV et al.
2010/0320313 A1 12/2010 Hanafin et al.
2011/0035149 A1 2/2011 McAndrew et al.
2011/0068224 A1 3/2011 Kang et al.
2011/0074570 A1 3/2011 Feldstein et al.
2011/0087350 A1 4/2011 Fogel et al.
2011/0112761 A1 5/2011 Hurley et al.
2011/0153052 A1 6/2011 Pettibone et al.
2011/0166707 A1 7/2011 Romanov et al.
2011/0174925 A1 7/2011 Ying
2011/0178711 A1 7/2011 Christoph
2011/0210866 A1 9/2011 David et al.
2011/0227435 A1 9/2011 Maeda
2011/0246331 A1 10/2011 Luther et al.
2011/0253831 A1 10/2011 Cheng
2011/0264311 A1 10/2011 Lee et al.
2011/0282476 A1 11/2011 Hegemier et al.
2011/0301787 A1 12/2011 Chaperon et al.
2011/0313878 A1 12/2011 Norman
2012/0039694 A1 2/2012 Suzanne
2012/0078592 A1 3/2012 Sims, Jr.
2012/0080556 A1 4/2012 Root, Jr.
2012/0091260 A1 4/2012 Callou
2012/0109419 A1 5/2012 Mercado
2012/0219397 A1 8/2012 Baker
2012/0221438 A1 8/2012 Cook, Jr. et al.
2012/0227389 A1 9/2012 Hinderks
2012/0229325 A1 9/2012 Dutruc
2012/0234969 A1 9/2012 Savoye et al.
2012/0235606 A1 9/2012 Takeuchi
2012/0323365 A1 12/2012 Taylor et al.
2013/0006739 A1 1/2013 Horvitz et al.
2013/0073477 A1 3/2013 Grinberg
2013/0081245 A1 4/2013 Vavrina et al.
2013/0093582 A1 4/2013 Walsh et al.
2013/0099054 A1 4/2013 Besenzoni
2013/0126611 A1 5/2013 Kangas et al.
2013/0148123 A1 6/2013 Hayashi
2013/0193269 A1 8/2013 Zwaan et al.
2013/0206915 A1 8/2013 Desaulniers et al.
2013/0218446 A1 8/2013 Bradley et al.
2013/0218799 A1 8/2013 Lehmann et al.
2013/0233964 A1 9/2013 Woodworth et al.
2013/0261792 A1 10/2013 Gupta et al.
2013/0262252 A1 10/2013 Lakshman et al.
2013/0262276 A1 10/2013 Wan et al.
2013/0262336 A1 10/2013 Wan et al.
2013/0264381 A1 10/2013 Kim et al.
2013/0320133 A1 12/2013 Ratti et al.
2013/0324164 A1 12/2013 Vulcano
2013/0332062 A1 12/2013 Kreitmair-Steck et al.
2013/0344778 A1 12/2013 Schafer et al.
2014/0010656 A1 1/2014 Nies
2014/0025230 A1 1/2014 Levien et al.
2014/0030444 A1 1/2014 Swaminathan et al.
2014/0031964 A1 1/2014 Sidhu et al.
2014/0032034 A1 1/2014 Raptopoulos et al.
2014/0040065 A1 2/2014 DuBois
2014/0052661 A1 2/2014 Shakes et al.
2014/0058959 A1 2/2014 Isbjornssund et al.
2014/0081445 A1 3/2014 Villamar
2014/0089073 A1 3/2014 Jacobs et al.
2014/0124619 A1 5/2014 McGeer et al.
2014/0124621 A1 5/2014 Godzdanker et al.
2014/0136282 A1 5/2014 Fedele
2014/0136414 A1 5/2014 Abhyanker
2014/0149244 A1 5/2014 Abhyanker
2014/0156053 A1 6/2014 Mahdavi et al.
2014/0180914 A1 6/2014 Abhyanker
2014/0200697 A1 7/2014 Cheng
2014/0214684 A1 7/2014 Pell
2014/0240313 A1 8/2014 Varga
2014/0244433 A1 8/2014 Cruz
2014/0254896 A1 9/2014 Zhou et al.
2014/0257595 A1 9/2014 Tillmann
2014/0271200 A1 9/2014 Sutton et al.
2014/0273865 A1 9/2014 Skarda et al.
2014/0283104 A1 9/2014 Nilsson
2014/0309813 A1 10/2014 Ricci
2014/0319272 A1 10/2014 Casado Magana et al.
2014/0325218 A1 10/2014 Shimizu et al.
2014/0330456 A1 11/2014 Lopez Morales et al.
2015/0006005 A1 1/2015 Yu et al.
2015/0066178 A1 3/2015 Stava
2015/0069968 A1 3/2015 Pounds
2015/0097530 A1 4/2015 Scarlatti et al.
2015/0098819 A1 4/2015 Tourin et al.
2015/0102154 A1 4/2015 Duncan et al.
2015/0112837 A1 4/2015 O'Dea
2015/0112885 A1 4/2015 Fadell et al.
2015/0120094 A1 4/2015 Kimchi et al.
2015/0120602 A1 4/2015 Huffman et al.
2015/0123462 A1 5/2015 Kamradt
2015/0127712 A1 5/2015 Fadell et al.
2015/0129716 A1 5/2015 Yoffe
2015/0148855 A1 5/2015 Szakelyhidi
2015/0158587 A1 6/2015 Patrick et al.
2015/0158599 A1 6/2015 Sisko
2015/0167262 A1 6/2015 Gartner
2015/0175276 A1 6/2015 Koster
2015/0183528 A1 7/2015 Walsh et al.
2015/0185034 A1 7/2015 Abhyanker
2015/0191255 A1 7/2015 Zolich et al.
2015/0202770 A1 7/2015 Patron et al.

(56) References Cited

U.S. PATENT DOCUMENTS

| | | | |
|---|---|---|---|
| 2015/0217860 | A1 | 8/2015 | Yang |
| 2015/0227882 | A1 | 8/2015 | Bhatt |
| 2015/0246727 | A1 | 9/2015 | Masticola et al. |
| 2015/0253777 | A1 | 9/2015 | Binney et al. |
| 2015/0254611 | A1 | 9/2015 | Perez |
| 2015/0259078 | A1 | 9/2015 | Filipovic et al. |
| 2015/0286216 | A1 | 10/2015 | Miwa |
| 2015/0314881 | A1 | 11/2015 | Tsaliah et al. |
| 2015/0317597 | A1 | 11/2015 | Shucker et al. |
| 2015/0332206 | A1 | 11/2015 | Trew et al. |
| 2015/0336669 | A1 | 11/2015 | Kantor et al. |
| 2015/0336670 | A1 | 11/2015 | Zhang |
| 2015/0336677 | A1 | 11/2015 | Smaoui et al. |
| 2015/0363843 | A1 | 12/2015 | Loppatto et al. |
| 2015/0367850 | A1 | 12/2015 | Clarke et al. |
| 2015/0370251 | A1 | 12/2015 | Siegel et al. |
| 2016/0001877 | A1 | 1/2016 | Paulos |
| 2016/0001883 | A1 | 1/2016 | Sanz et al. |
| 2016/0003637 | A1 | 1/2016 | Andersen |
| 2016/0009413 | A1 | 1/2016 | Lee et al. |
| 2016/0011592 | A1 | 1/2016 | Zhang et al. |
| 2016/0019495 | A1 | 1/2016 | Kolchin |
| 2016/0023761 | A1 | 1/2016 | McNally |
| 2016/0033966 | A1 | 2/2016 | Farris et al. |
| 2016/0039541 | A1 | 2/2016 | Beardsley et al. |
| 2016/0051110 | A1 | 2/2016 | Cao et al. |
| 2016/0058181 | A1 | 3/2016 | Han et al. |
| 2016/0068264 | A1 | 3/2016 | Ganesh et al. |
| 2016/0068265 | A1 | 3/2016 | Hoareau et al. |
| 2016/0068267 | A1 | 3/2016 | Liu et al. |
| 2016/0070265 | A1 | 3/2016 | Liu et al. |
| 2016/0085238 | A1 | 3/2016 | Hayes |
| 2016/0101856 | A1 | 4/2016 | Kohstall |
| 2016/0104099 | A1 | 4/2016 | Villamar |
| 2016/0104113 | A1 | 4/2016 | Gorlin |
| 2016/0107750 | A1 | 4/2016 | Yates |
| 2016/0114488 | A1 | 4/2016 | Mascorro Medina et al. |
| 2016/0117931 | A1 | 4/2016 | Chan et al. |
| 2016/0125746 | A1 | 5/2016 | Kunzi et al. |
| 2016/0129592 | A1 | 5/2016 | Saboo et al. |
| 2016/0130000 | A1 | 5/2016 | Rimanelli |
| 2016/0130015 | A1 | 5/2016 | Caubel et al. |
| 2016/0131025 | A1 | 5/2016 | Pekrul |
| 2016/0131358 | A1 | 5/2016 | Spiro |
| 2016/0132059 | A1 | 5/2016 | Mason et al. |
| 2016/0144734 | A1 | 5/2016 | Wang et al. |
| 2016/0144982 | A1 | 5/2016 | Sugumaran |
| 2016/0180618 | A1 | 6/2016 | Ho et al. |
| 2016/0185466 | A1 | 6/2016 | Dreano, Jr. |
| 2016/0194959 | A1 | 7/2016 | Pekrul |
| 2016/0196755 | A1 | 7/2016 | Navot et al. |
| 2016/0196756 | A1 | 7/2016 | Prakash et al. |
| 2016/0200438 | A1 | 7/2016 | Bokeno et al. |
| 2016/0207627 | A1 | 7/2016 | Hoareau et al. |
| 2016/0214717 | A1 | 7/2016 | De Silva |
| 2016/0214728 | A1 | 7/2016 | Rossi et al. |
| 2016/0221671 | A1 | 8/2016 | Fisher et al. |
| 2016/0229299 | A1 | 8/2016 | Streett |
| 2016/0229530 | A1 | 8/2016 | Welsh et al. |
| 2016/0235236 | A1 | 8/2016 | Byers et al. |
| 2016/0239789 | A1 | 8/2016 | Hanks |
| 2016/0239803 | A1 | 8/2016 | Borley et al. |
| 2016/0244162 | A1 | 8/2016 | Weller |
| 2016/0244187 | A1 | 8/2016 | Byers et al. |
| 2016/0257401 | A1 | 9/2016 | Buchmueller et al. |
| 2016/0257423 | A1 | 9/2016 | Martin |
| 2016/0257424 | A1 | 9/2016 | Stabler et al. |
| 2016/0257426 | A1 | 9/2016 | Mozer |
| 2016/0258775 | A1 | 9/2016 | Santilli et al. |
| 2016/0266578 | A1 | 9/2016 | Douglas et al. |
| 2016/0272317 | A1 | 9/2016 | Cho et al. |
| 2016/0280371 | A1 | 9/2016 | Canavor et al. |
| 2016/0282126 | A1 | 9/2016 | Watts et al. |
| 2016/0286128 | A1 | 9/2016 | Zhou |
| 2016/0291445 | A1 | 10/2016 | Fisher, Sr. et al. |
| 2016/0299233 | A1 | 10/2016 | Levien et al. |
| 2016/0304198 | A1 | 10/2016 | Jourdan |
| 2016/0304217 | A1 | 10/2016 | Fisher et al. |
| 2016/0307448 | A1 | 10/2016 | Salnikov et al. |
| 2016/0311329 | A1 | 10/2016 | Rodriguez |
| 2016/0321503 | A1 | 11/2016 | Zhou |
| 2016/0334229 | A1 | 11/2016 | Ross et al. |
| 2016/0340006 | A1 | 11/2016 | Tang |
| 2016/0340021 | A1 | 11/2016 | Zhang et al. |
| 2016/0355261 | A1 | 12/2016 | Chin et al. |
| 2016/0364660 | A1 | 12/2016 | Brown |
| 2016/0364679 | A1 | 12/2016 | Cao |
| 2016/0364823 | A1 | 12/2016 | Cao |
| 2016/0364989 | A1 | 12/2016 | Speasl et al. |
| 2016/0371984 | A1 | 12/2016 | Macfarlane et al. |
| 2016/0378108 | A1 | 12/2016 | Paczan et al. |
| 2017/0011333 | A1 | 1/2017 | Greiner et al. |
| 2017/0011340 | A1 | 1/2017 | Gabbai |
| 2017/0015415 | A1 | 1/2017 | Chan et al. |
| 2017/0021923 | A1 | 1/2017 | Fisher et al. |
| 2017/0021941 | A1 | 1/2017 | Fisher et al. |
| 2017/0021942 | A1 | 1/2017 | Fisher et al. |
| 2017/0023949 | A1 | 1/2017 | Fisher et al. |
| 2017/0032315 | A1 | 2/2017 | Gupta et al. |
| 2017/0050749 | A1 | 2/2017 | Pilskalns |
| 2017/0073085 | A1 | 3/2017 | Tremblay et al. |
| 2017/0081043 | A1 | 3/2017 | Jones et al. |
| 2017/0087999 | A1 | 3/2017 | Miller et al. |
| 2017/0096222 | A1 | 4/2017 | Spinelli et al. |
| 2017/0100837 | A1 | 4/2017 | Zevenbergen et al. |
| 2017/0113352 | A1 | 4/2017 | Lutz et al. |
| 2017/0117676 | A1 | 4/2017 | James et al. |
| 2017/0121023 | A1 | 5/2017 | High et al. |
| 2017/0129464 | A1 | 5/2017 | Wang et al. |
| 2017/0129603 | A1 | 5/2017 | Raptopoulos et al. |
| 2017/0132558 | A1 | 5/2017 | Perez |
| 2017/0137118 | A1 | 5/2017 | Gentry |
| 2017/0137150 | A1 | 5/2017 | Conyers et al. |
| 2017/0144776 | A1 | 5/2017 | Fisher et al. |
| 2017/0147975 | A1 | 5/2017 | Natarajan et al. |
| 2017/0152060 | A1 | 6/2017 | Morisawa |
| 2017/0154347 | A1 | 6/2017 | Bateman |
| 2017/0158352 | A1 | 6/2017 | von Flotow et al. |
| 2017/0158353 | A1 | 6/2017 | Schmick |
| 2017/0166327 | A1 | 6/2017 | Schmidt |
| 2017/0167881 | A1 | 6/2017 | Rander et al. |
| 2017/0174335 | A1 | 6/2017 | Malloy |
| 2017/0190443 | A1 | 7/2017 | Fisher et al. |
| 2017/0193442 | A1 | 7/2017 | Ekkel et al. |
| 2017/0199522 | A1 | 7/2017 | Li |
| 2017/0203632 | A1 | 7/2017 | Westendarp et al. |
| 2017/0203857 | A1 | 7/2017 | O'Toole |
| 2017/0225782 | A1 | 8/2017 | Kohstall et al. |
| 2017/0225783 | A1 | 8/2017 | Fisher et al. |
| 2017/0225799 | A1 | 8/2017 | Selwyn et al. |
| 2017/0225801 | A1 | 8/2017 | Bennett |
| 2017/0225802 | A1 | 8/2017 | Lussier et al. |
| 2017/0240291 | A1 | 8/2017 | Kim |
| 2017/0247120 | A1 | 8/2017 | Miller |
| 2017/0248948 | A1 | 8/2017 | Otani et al. |
| 2017/0253349 | A1 | 9/2017 | Wang et al. |
| 2017/0255896 | A1 | 9/2017 | Van Dyke |
| 2017/0270314 | A1 | 9/2017 | Tsybrovskyy et al. |
| 2017/0275025 | A1 | 9/2017 | Johnson et al. |
| 2017/0279640 | A1 | 9/2017 | Yang et al. |
| 2017/0283090 | A1 | 10/2017 | Miller et al. |
| 2017/0286905 | A1 | 10/2017 | Richardson et al. |
| 2017/0300855 | A1 | 10/2017 | Lund et al. |
| 2017/0305526 | A1 | 10/2017 | Thomassey |
| 2017/0305575 | A1 | 10/2017 | Bash et al. |
| 2017/0308850 | A1 | 10/2017 | Roush et al. |
| 2017/0309088 | A1 | 10/2017 | Arya et al. |
| 2017/0313421 | A1 | 11/2017 | Gil |
| 2017/0316379 | A1 | 11/2017 | Lepek et al. |
| 2017/0316701 | A1 | 11/2017 | Gil et al. |
| 2017/0323129 | A1 | 11/2017 | Davidson et al. |
| 2017/0327091 | A1 | 11/2017 | Capizzo |
| 2017/0330145 | A1 | 11/2017 | Studnicka |
| 2017/0341769 | A1 | 11/2017 | Haberbusch et al. |

(56) References Cited

U.S. PATENT DOCUMENTS

2017/0345245 A1 11/2017 Torresani et al.
2017/0372256 A1 12/2017 Kantor et al.
2018/0024554 A1 1/2018 Brady et al.
2018/0039286 A1 2/2018 Tirpak et al.
2018/0053139 A1 2/2018 Stoman
2018/0056794 A1 3/2018 Kim et al.
2018/0088586 A1 3/2018 Hance et al.
2018/0092345 A1 4/2018 Okumura
2018/0092484 A1 4/2018 Lewis et al.
2018/0105020 A1 4/2018 Smith et al.
2018/0105271 A1 4/2018 Wypyszynski et al.
2018/0105289 A1 4/2018 Walsh et al.
2018/0118340 A1 5/2018 Russo
2018/0118374 A1 5/2018 Lombardini et al.
2018/0124326 A1 5/2018 Irie et al.
2018/0127211 A1 5/2018 Jarvis et al.
2018/0137454 A1 5/2018 Kulkarni et al.
2018/0141682 A1 5/2018 Blake et al.
2018/0194484 A1 7/2018 Livieratos et al.
2018/0196418 A1 7/2018 Meier et al.
2018/0208070 A1 7/2018 Sanchez et al.
2018/0233055 A1 8/2018 Damnjanovic et al.
2018/0237161 A1 8/2018 Minnick et al.
2018/0245365 A1* 8/2018 Wankewycz .............. E04H 6/44
2018/0257775 A1 9/2018 Baek et al.
2018/0265196 A1 9/2018 Phillips et al.
2018/0265295 A1 9/2018 Beckman et al.
2018/0265296 A1 9/2018 Beckman et al.
2018/0295327 A1 10/2018 Yearwood
2018/0312276 A1 11/2018 Miller et al.
2018/0319496 A1 11/2018 Zhang et al.
2018/0327091 A1 11/2018 Burks et al.
2018/0354649 A1 12/2018 Ortiz et al.
2018/0357910 A1 12/2018 Hobbs et al.
2018/0360326 A1 12/2018 Lee et al.
2018/0364740 A1 12/2018 Collins et al.
2018/0370618 A1 12/2018 Harris
2018/0370652 A1 12/2018 Vendrame et al.
2019/0002128 A1 1/2019 Raz et al.
2019/0009926 A1 1/2019 Hu
2019/0016476 A1 1/2019 Scherz
2019/0023133 A1 1/2019 Renold et al.
2019/0023416 A1 1/2019 Borko et al.
2019/0028904 A1 1/2019 Carpenter et al.
2019/0047462 A1 2/2019 Vijayaraghavan et al.
2019/0051192 A1 2/2019 Schick et al.
2019/0055018 A1 2/2019 Bei et al.
2019/0100108 A1 4/2019 Davis et al.
2019/0100313 A1 4/2019 Campbell
2019/0100330 A1 4/2019 Cheng et al.
2019/0106224 A1 4/2019 Nishikawa et al.
2019/0108472 A1 4/2019 Sweeney et al.
2019/0127083 A1 5/2019 Di Benedetto et al.
2019/0135403 A1 5/2019 Perry et al.
2019/0152326 A1 5/2019 Nishikawa
2019/0161190 A1 5/2019 Gil et al.
2019/0172358 A1 6/2019 Zhou et al.
2019/0193952 A1 6/2019 Zevenbergen et al.
2019/0217952 A1 7/2019 Zawadzki et al.
2019/0217968 A1 7/2019 Schmidt
2019/0233103 A1 8/2019 High et al.
2019/0233107 A1 8/2019 Tian
2019/0245365 A1 8/2019 Farrahi Moghaddam et al.
2019/0256201 A1 8/2019 Plekhanov
2019/0256202 A1 8/2019 Resnick
2019/0256207 A1 8/2019 Nohmi et al.
2019/0258910 A1 8/2019 Stoman
2019/0263519 A1 8/2019 Argus
2019/0270526 A1 9/2019 Hehn et al.
2019/0283871 A1 9/2019 Wieczorek
2019/0291961 A1 9/2019 Urban
2019/0308724 A1* 10/2019 Cooper .................. B64U 80/25
2019/0315235 A1 10/2019 Kung
2019/0315463 A1 10/2019 Chen et al.
2019/0337407 A1 11/2019 Wang
2019/0348862 A1 11/2019 Obayashi
2019/0375504 A1 12/2019 Schmalzried et al.
2019/0382134 A1 12/2019 Baklycki
2019/0383052 A1 12/2019 Blake et al.
2020/0003529 A1 1/2020 Benezra
2020/0010214 A1 1/2020 Newcomb
2020/0017218 A1 1/2020 Ahmad et al.
2020/0017237 A1 1/2020 Walker
2020/0031466 A1 1/2020 Anderson
2020/0036243 A1 1/2020 Zhao
2020/0044463 A1 2/2020 Kim et al.
2020/0053325 A1 2/2020 Deyle et al.
2020/0055613 A1 2/2020 Miller et al.
2020/0062373 A1 2/2020 Liao
2020/0082570 A1 3/2020 Wunderwald
2020/0094957 A1 3/2020 Sohmshetty et al.
2020/0108930 A1 4/2020 Foley
2020/0113167 A1 4/2020 Bouten
2020/0148322 A1 5/2020 Pekrul
2020/0165008 A1 5/2020 Krauss et al.
2020/0180940 A1 6/2020 Rainville
2020/0189731 A1 6/2020 Mistry et al.
2020/0198803 A1 6/2020 Zhou
2020/0207484 A1 7/2020 Foggia et al.
2020/0207485 A1 7/2020 Foggia et al.
2020/0218287 A1 7/2020 Wang et al.
2020/0218288 A1 7/2020 Johnson et al.
2020/0225684 A1 7/2020 Anderson et al.
2020/0239160 A1 7/2020 Cheng et al.
2020/0247540 A1 8/2020 Jones et al.
2020/0262583 A1 8/2020 Ducharme et al.
2020/0272144 A1 8/2020 Yang et al.
2020/0284883 A1 9/2020 Ferreira et al.
2020/0290752 A1 9/2020 Kolosiuk
2020/0301445 A1 9/2020 Jourdan et al.
2020/0307829 A1 10/2020 Smith et al.
2020/0309489 A1 10/2020 Kadavanich et al.
2020/0310465 A1 10/2020 Carthew et al.
2020/0324898 A1 10/2020 Youmans et al.
2020/0346736 A1 11/2020 Krasnoff
2020/0346743 A1 11/2020 Bernard
2020/0349852 A1 11/2020 DiCosola
2020/0369384 A1 11/2020 Kelly
2020/0369408 A1 11/2020 Dolata et al.
2020/0398999 A1 12/2020 Ortiz et al.
2020/0406773 A1 12/2020 Lacaze et al.
2021/0016696 A1 1/2021 Kelly et al.
2021/0031947 A1 2/2021 Wankewycz et al.
2021/0045564 A1 2/2021 Duckers et al.
2021/0046650 A1 2/2021 Deyle et al.
2021/0047055 A1 2/2021 Lee et al.
2021/0053677 A1 2/2021 Passley
2021/0070468 A1 3/2021 Svirsky et al.
2021/0074170 A1 3/2021 Barker et al.
2021/0086913 A1 3/2021 Friedman et al.
2021/0089055 A1 3/2021 Tran
2021/0094686 A1 4/2021 Metzner et al.
2021/0107682 A1 4/2021 Kozlenko et al.
2021/0107684 A1 4/2021 Le Lann
2021/0114729 A1 4/2021 Ragan et al.
2021/0122495 A1 4/2021 Rezvani et al.
2021/0125503 A1 4/2021 Henry et al.
2021/0127658 A1 5/2021 Luebke et al.
2021/0197983 A1 7/2021 Wang et al.
2021/0214068 A1 7/2021 Bry et al.
2021/0214102 A1 7/2021 Geng et al.
2021/0229805 A1 7/2021 Getman
2021/0237694 A1 8/2021 Hirschvogel et al.
2021/0237899 A1 8/2021 Warwick et al.
2021/0253242 A1 8/2021 Falk-Petersen et al.
2021/0276732 A1 9/2021 Fisher et al.
2021/0276735 A1 9/2021 Raptopoulos et al.
2021/0284335 A1 9/2021 Mclaughlin et al.
2021/0284356 A1 9/2021 Jourdan et al.
2021/0300591 A1 9/2021 Tian
2021/0309388 A1 10/2021 Ratajczak et al.
2021/0339842 A1 11/2021 Sauer
2021/0347500 A1 11/2021 Hagan
2021/0349456 A1 11/2021 Pham et al.

(56) References Cited

U.S. PATENT DOCUMENTS

2021/0354820 A1 11/2021 Hiller
2021/0371128 A1 12/2021 Rodriguez et al.
2021/0394930 A1 12/2021 O'Toole
2021/0405655 A1 12/2021 Yi et al.
2022/0009647 A1 1/2022 Johannesson et al.
2022/0019247 A1 1/2022 Dayan et al.
2022/0041279 A1 2/2022 Rowse et al.
2022/0041299 A1 2/2022 Wankewycz et al.
2022/0055745 A1 2/2022 Walker et al.
2022/0055770 A1 2/2022 O'Toole
2022/0063798 A1 3/2022 Johnson
2022/0073214 A1 3/2022 Liske et al.
2022/0106125 A1 4/2022 Ragan et al.
2022/0119105 A1 4/2022 Schmalzried et al.
2022/0162001 A1 5/2022 Gherardi et al.
2022/0163980 A1 5/2022 Beer et al.
2022/0169400 A1 6/2022 Seeley
2022/0169401 A1 6/2022 Di Cosola
2022/0171388 A1 6/2022 Yanagihashi et al.
2022/0177124 A1 6/2022 Marshall et al.
2022/0185501 A1 6/2022 Kempley
2022/0234757 A1 7/2022 Dayan et al.
2022/0242589 A1 8/2022 Pham et al.
2022/0267026 A1 8/2022 Lee
2022/0289376 A1 9/2022 Hayakawa
2022/0306320 A1 9/2022 Howe et al.
2022/0315248 A1 10/2022 Castellano Aldave et al.
2022/0348405 A1 11/2022 Cheng et al.
2022/0380063 A1 12/2022 Shah et al.
2022/0396373 A1 12/2022 Wang et al.
2022/0396421 A1 12/2022 Tian
2023/0017530 A1 1/2023 Lowe et al.
2023/0023246 A1 1/2023 Mclaughlin et al.
2023/0031028 A1 2/2023 Ehasoo et al.
2023/0044050 A1 2/2023 Cevacins et al.
2023/0045483 A1 2/2023 Ahn
2023/0045691 A1 2/2023 Cevacins et al.
2023/0046127 A1 2/2023 Guerra Johansson
2023/0063715 A1 3/2023 Bell
2023/0065140 A1 3/2023 Blevins et al.
2023/0074715 A1 3/2023 Kwon
2023/0088830 A1 3/2023 Kim
2023/0096139 A1 3/2023 Ubaldi
2023/0100169 A1 3/2023 Laczak et al.
2023/0133068 A1 5/2023 Wiegman
2023/0140387 A1 5/2023 Infanti et al.
2023/0159192 A1 5/2023 Gil et al.
2023/0202680 A1 6/2023 Yehya
2023/0202682 A1 6/2023 Kiyokami et al.
2023/0202691 A1 6/2023 Kiyokami et al.
2023/0244249 A1 8/2023 Smith et al.
2023/0249851 A1 8/2023 Tian
2023/0257139 A1 8/2023 Straus et al.
2023/0298268 A1 9/2023 Oleynikova et al.
2023/0303272 A1 9/2023 Passley
2023/0348106 A1 11/2023 Berthelet et al.
2023/0349146 A1 11/2023 Vasconi
2023/0356863 A1 11/2023 Zhang et al.
2023/0373626 A1 11/2023 Kiyokami
2023/0373668 A1 11/2023 Kozlenko et al.
2023/0399132 A1 12/2023 Kiyokami et al.
2024/0002080 A1 1/2024 Shi et al.
2024/0010368 A1 1/2024 Liao et al.
2024/0067371 A1 2/2024 Turner et al.
2024/0076067 A1 3/2024 Takahashi et al.
2024/0076072 A1 3/2024 Arii et al.
2024/0101286 A1 3/2024 Regev
2024/0101287 A1 3/2024 Takahashi et al.
2024/0101288 A1 3/2024 Takahashi et al.
2024/0109656 A1 4/2024 Stege
2024/0132238 A1 * 4/2024 Qiu ........................ B64U 70/92
2024/0140630 A1 5/2024 Lee et al.
2024/0158112 A1 5/2024 Le Lann
2024/0176367 A1 5/2024 Zhou et al.
2024/0190593 A1 6/2024 Shah et al.
2024/0262545 A1 8/2024 Fu
2024/0278946 A1 8/2024 Roberts
2024/0300677 A1 9/2024 Sercel et al.
2024/0326680 A1 10/2024 Rosen
2024/0336378 A1 10/2024 Neate et al.
2024/0343426 A1 10/2024 Cornew et al.
2024/0384587 A1 11/2024 Anderson et al.
2024/0391616 A1 11/2024 Dayan et al.
2024/0425199 A1 12/2024 Li et al.
2025/0002185 A1 1/2025 Liu
2025/0003581 A1 1/2025 Talbi
2025/0011017 A1 1/2025 Kim et al.
2025/0026509 A1 1/2025 Infanti et al.
2025/0074632 A1 3/2025 DiCosola
2025/0076040 A1 3/2025 Sandall et al.
2025/0108935 A1 4/2025 Johnson
2025/0108943 A1 4/2025 Sekiguchi et al.
2025/0121966 A1 4/2025 Gronstedt et al.
2025/0128638 A1 4/2025 Scheler et al.
2025/0145314 A1 5/2025 Gronstedt et al.
2025/0185139 A1 6/2025 Spiro
2025/0187761 A1 6/2025 Yamakawa et al.
2025/0205528 A1 6/2025 Hakos
2025/0206463 A1 6/2025 Aralis et al.
2025/0223061 A1 7/2025 Merdin et al.
2025/0224541 A1 7/2025 Quist et al.
2025/0250006 A1 8/2025 Burgess et al.

* cited by examiner

BASE STATION FOR AN UNMANNED AERIAL VEHICLE INCLUDING A ROTATABLE ROOF ASSEMBLY

CROSS-REFERENCE TO RELATED APPLICATION(S)

This application claims priority to and the benefit of U.S. Provisional Patent Application Ser. No. 63/683,504, filed Aug. 15, 2024, the entire contents of which are incorporated by reference herein for all purposes.

TECHNICAL FIELD

The present disclosure relates to a base station for an unmanned aerial vehicle (UAV) and, more specifically, to a base station that includes a rotatable roof assembly.

BACKGROUND

A base station for a UAV is designed to house and protect the UAV when not in use. The base station may include a landing platform on which the UAV may take flight and land. For example, the base station may include one or more fiducial markings that may be detected by an image sensor (e.g., a camera) of the UAV. Based upon detection of the one or more fiducial markings, the UAV may execute a landing procedure to safely land on the landing platform of the base station. Additionally, the base station may include an integrated charging system that, when the UAV is not in use and is stored on the landing platform, may replenish a power supply (e.g., a battery) of the UAV.

SUMMARY

In one aspect of the present disclosure, a base station for a UAV is disclosed that includes a base and a roof assembly that is supported by the base such that the roof assembly is repositionable between a closed position, in which the UAV is concealed within the base station, and an open position, which facilitates takeoff and landing of the UAV. The base includes a body and a landing platform that is supported by the body and which is configured to receive the UAV during docking. The roof assembly is rotatable through an angular range of motion that lies substantially within the range of approximately 110 degrees to approximately 120 degrees during repositioning between the closed position and the open position.

In some configurations, the base may further include hoists that are configured to facilitate transport and/or repositioning of the base station.

In some configurations, the base may further include an access module that is configured to accommodate at least one accessibility component.

In some configurations, the access module may include: a box; a door that is connected to the box such that the door is repositionable between open and closed positions; and an umbrella that is supported by the box and which is configured to inhibit the entry of water, dust, and/or debris.

In some configurations, the base may further include a lighting and heating assembly that is configured to provide a visual indication of activity of the base station and facilitate deicing of the roof assembly.

In some configurations, the lighting and heating assembly may be positioned adjacent to a perimeter of the base.

In some configurations, the lighting and heating assembly may include: at least one diffuser lens; at least one light positioned vertically below the landing platform; and at least one heater.

In some configurations, the lighting and heating assembly may be waterproof in construction.

In some configurations, the roof assembly may include: a cover; ears that connect the cover to the base; and a drive system that engages the ears and which is configured to rotate the ears in relation to the base during repositioning of the roof assembly between the closed position and the open position.

In some configurations, the roof assembly may further include at least one camera to facilitate inspection during repositioning of the roof assembly between the closed position and the open position.

In some configurations, the roof assembly may further include a pivot shaft that supports the ears and which defines a channel that is configured to receive at least one data and/or power transmission member.

In some configurations, the drive system may include: at least one motor that is connected to the base; at least one spacer that is positioned between the at least one motor and the base; at least one belt that engages the at least one motor; and at least one pulley that supports the at least one belt.

In some configurations, the at least one spacer may include a generally symmetrical configuration.

In some configurations, the drive system may further include at least one damper that is configured to absorb force during repositioning of the roof assembly between the closed position and the open position.

In some configurations, the drive system may further include at least one limit sensor.

In another aspect of the present disclosure, a base station for an unmanned aerial vehicle (UAV) is disclosed. The base station includes a body and a landing platform supported by the body and configured to support the UAV. The base station also includes a roof assembly movably coupled to the base. The roof assembly includes a cover defining a cavity therein and one or more ears coupled to the cover and movably coupled to the body such that the roof assembly is movable between a closed position, in which the cover is configured to enclose the landing platform and the UAV supported thereon, and an open position, in which the cover is located at least partially below the landing platform with respect to an elevational direction such that the landing platform is unobstructed by the cover to facilitate takeoff and landing of the UAV. The roof assembly is rotatable through an angular range of motion that is defined by the one or more ears.

In some configurations, the one or more ears may include a first ear coupled to a first side of the cover and movably coupled to a first side of the body and a second ear coupled to an opposing second side of the cover and movably coupled to an opposing second side of the body. The first ear may be movably coupled to the first side of the body by a first pivot shaft projecting from the first ear. The second ear may be movably coupled to the opposing second side of the body by a second pivot shaft projecting from the second ear. The first pivot shaft and the second pivot shaft may be coaxial along an axis of rotation of the roof assembly.

In some configurations, the body may define a cavity therein. One or more actuators may be disposed in the cavity of the body and coupled to the roof assembly to move the roof assembly between the closed position and the open position. The one or more actuators may extend at least partially through the body to engage the one or more ears.

In some configurations, the roof assembly may be rotatable through the angular range of motion, which may be substantially within a range of approximately 110 degrees to approximately 120 degrees during repositioning of the roof assembly between the closed position and the open position.

In some configurations, the base station may further comprise indicator lighting extending at least partially around a perimeter of the base. The indicator lighting remains unobstructed by the roof assembly when the roof assembly is in the open position and the closed position. The indicator lighting may be disposed along a top edge of the body and secured to the body by a peripheral bracket projecting in the elevational direction away from the top edge. A light module configured to control and power the indicator lighting may be electrically connected to the indicator lighting and disposed within confines of the body.

In some configurations, the roof assembly may further include one or more of a rain or a wind sensor coupled to an exterior surface of the cover.

In some configurations, the base may further include a user interface disposed along an exterior surface of the body. The user may be configured to stop movement of the roof assembly between the closed position and the open position by interacting with the user interface.

In some configurations, the roof assembly may further include a camera coupled to the cover and at least partially disposed within the cavity of the cover. The camera may be positioned such that a field of view of the camera is configured to monitor the landing platform when the roof assembly is in the closed position. The camera may be configured to extend above the landing platform in the elevational direction when the roof assembly is in the closed position such that the field of view of the camera maintains monitoring of the landing platform.

In another aspect of the present disclosure, a base station for an unmanned aerial vehicle (UAV) is disclosed. The base station includes a landing platform configured to support the UAV and a roof assembly movably coupled to the base and configured to move between a closed position, in which the roof assembly is configured to enclose the landing platform and the UAV supported thereon, and an open position, in which the roof assembly exposes the landing platform to facilitate takeoff and landing of the UAV. The roof assembly includes a cover defining a cavity therein, a first ear extending downward from the cover with respect to an elevational direction and coupled to a first side of the base via a first pivot shaft, a second ear extending downward from the cover with respect to the elevational direction and coupled to an opposing second side of the base via a second pivot shaft, and a camera coupled to the cover and configured for enclosure by the base and the cover when the roof assembly is in the closed position. The landing platform is configured for positioning within a field of view of the camera when the roof assembly is in the closed position and the open position.

In some configurations, the first pivot shaft and the second pivot shaft may each define an opening therein. Wiring of the base station may be configured for routing through one or more of the opening of the first pivot shaft or the opening of the second pivot shaft to electrically connect the base to the roof assembly.

In some configurations, the roof assembly may further include a light located adjacent to the camera and contained within the cavity of the cover.

In some configurations, the base station may further comprise indicator lighting extending around a periphery of the base. The indicator lighting may be configured to provide a visual indication of activity of the base station.

In another aspect of the present disclosure, a base station for an unmanned aerial vehicle (UAV) is disclosed. The base station includes a base that includes a landing platform configured to support the UAV and a roof assembly movably coupled to the base and configured to move between a closed position, in which the roof assembly is configured to enclose the landing platform and the UAV supported thereon, and an open position, in which the roof assembly exposes the landing platform. The roof assembly includes a cover defining a cavity therein, a heating element disposed along an interior surface of the cover and located within the cavity of the cover, and a cover panel disposed within the cavity of the cover such that the heating element is located between the interior surface of the cover and the cover panel. The heating element is configured to facilitate de-icing of one or more of the roof assembly, the base, or the UAV. The heating element and the cover panel define a cutout therein that is configured to facilitate wireless communication between the UAV located on the landing platform and an external device when the roof assembly is in the closed position.

In some configurations, the roof assembly may further include one or more antennas coupled to the interior surface of the cover and contained within the cavity of the cover. In some configurations, the cutout defined by the heating element and the cover panel may be enclosed by the cover.

In another aspect of the present disclosure, a base station for an unmanned aerial vehicle (UAV) is disclosed. The base station includes a base that includes a body defining a cavity therein and a landing platform supported by the body and configured to support the UAV. The base station also includes a roof assembly movably coupled to the base to move between a closed position, in which the roof assembly is configured to enclose the landing platform, and an open position, in which the roof assembly is located such that the landing platform is unobstructed by the roof assembly. The roof assembly is actuated between the closed position and the open position by a drive system that includes a first drive assembly located in the cavity of the body and extending through a first side panel of the body to couple to a first side of the roof assembly, and a second drive assembly disposed in the cavity of the body and extending through a second side panel of the body to couple to an opposing second side of the roof assembly.

In some configurations, the roof assembly may include a cover, a first ear coupled to a first side of the cover and movably coupled to a first side of the body, and a second ear coupled to an opposing second side of the cover and movably coupled to an opposing second side of the body. The first drive assembly may be movably coupled to the first ear. The second drive assembly may be movably coupled to the second ear. The first drive assembly and the second drive assembly may be located beneath the landing platform with respect to an elevational direction.

In some configurations, the first ear may be movably coupled to the first side of the body by a first pivot shaft projecting from the first ear into a first pivot opening defined by the first side panel. The second ear may be movably coupled to the opposing second side of the body by a second pivot shaft projecting from the second ear into a second pivot opening defined by the second side panel. The first pivot opening and the second pivot opening may define an axis of rotation of the roof assembly. The first pivot shaft and the second pivot shaft may be coaxial along the axis of rotation. The first pivot opening may be spaced apart from the first drive assembly and the second pivot opening may be spaced apart from the second drive assembly.

In some configurations, the first ear may include a first track that is configured to guide the first drive assembly during actuation of the roof assembly and the second ear may include a second track that is configured to guide the second drive assembly during actuation of the roof assembly. The first track and the second track may be symmetrical. The first drive assembly may be configured to engage a first belt disposed within the first track and the second drive assembly may be configured to engage a second belt disposed within the second track to actuate the roof assembly.

In another aspect of the present disclosure, a base station for an unmanned aerial vehicle (UAV) is disclosed. The base station includes a base that includes a landing platform configured to support the UAV. The base station also includes a roof assembly movably coupled to the base and configured to move between a closed position, in which the roof assembly is configured to enclose the landing platform, and an open position, in which the roof assembly exposes the landing platform. The roof assembly includes a cover, an ear extending downward from the cover with respect to an elevational direction and coupled to the base via a pivot shaft, and a drive assembly disposed within the base and coupled to the ear. The drive assembly includes a drive shaft extending through the base and into the ear, an actuator coupled to the drive shaft and configured to rotate the drive shaft, and a gear coupled to the drive shaft and in communication with the ear. Rotation of the drive shaft rotates the gear to drive the roof assembly between the closed position and the open position.

In some configurations, the ear may define a track. The belt may be disposed within the track. The gear may be positioned within the track and configured to engage with the belt to drive the roof assembly between the closed position and the open position. Rotational movement of the gear may be configured to advance the belt along the gear to drive the roof assembly between the closed position and the open position. The base station may further comprise a retaining mechanism located at least partially within the base and coupled to the actuator. The belt may be routed through the retaining mechanism such that the retaining mechanism maintains engagement between the belt and the gear.

In some configurations, the drive assembly may be coupled to the base by a mounting bracket located therebetween.

In another aspect of the present disclosure, a base station for an unmanned aerial vehicle (UAV) is disclosed. The base station includes a base that includes a body defining a cavity therein and a landing platform supported by the body. The base station also includes a roof assembly movably coupled to the body and configured to move between a closed position and an open position. The roof assembly includes a cover, an ear coupled to the cover and movably coupled to the body via a pivot shaft, and a drive assembly disposed within the cavity of the body and movably coupled to the ear. The drive assembly includes an actuator disposed within the cavity of the body and coupled to an interior surface of the body by a mounting bracket, a drive shaft extending through an actuator opening defined by the body and a track defined by the ear, and a gear coupled to the drive shaft and configured to engage a belt within the track. The drive shaft is rotatably coupled to the actuator. Rotation of the gear advances the belt along the gear to drive the roof assembly between the closed position and the open position.

In some configurations, the mounting bracket may be secured within the actuator opening. The mounting bracket may be keyed to the actuator opening to prevent rotation of the mounting bracket with respect to the body.

In some configurations, the drive shaft may extend through the mounting bracket to couple to the gear.

In some configurations a retaining mechanism may be coupled to the mounting bracket and configured to maintain engagement between the belt and the gear. The retaining mechanism may be guided along the track during movement of the roof assembly between the closed position and the open position. The retaining mechanism may include one or more bushings that are guided along the track during movement of the roof assembly. The retaining mechanism may include a pair of bushings that are disposed on opposing sides of the gear. The belt may be routed around the gear and between the pair of bushings.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure relates to a base station for use with a UAV. The base station may be configured to support the UAV. The base station may be configured to charge a power source (e.g., a battery) of the UAV when the UAV is supported on or contained within the base station. For example, the base station may include a support assembly, such as a landing platform, which may support the UAV during periods of inactivity (e.g., when not in use) and may further support the UAV during takeoff and landing. The landing platform may be positioned within the base station such that, when the UAV is docked (e.g., supported by the landing platform), the base station may contain the UAV.

In an example, the base station may include a base, which may include or be the landing platform, and a roof assembly. The roof assembly may be movable so that, when the UAV is docked, the roof assembly may at least partially enclose the UAV such that the UAV is no longer exposed to environmental conditions, such as precipitation (e.g., rain, snow, hail, etc.), wind, extreme temperatures (e.g., extreme heat and/or cold), sunlight, debris, other external factors, or a combination thereof. Additionally, when the UAV is prepared for takeoff, the roof assembly may move so that the landing platform remains unobstructed by the roof assembly and the UAV may safely take off from the landing platform.

Conventional base stations are often mechanically complex to ensure proper docking of the UAV. Similarly, conventional base stations may frequently require significant operator interaction to ensure proper takeoff and landing of the UAV. For example, the operator may be required to manually move a portion of the base station (e.g., a cover) to ensure that takeoff and landing of the UAV remains unobstructed. Additionally, conventional base stations may often provide a landing surface for the UAV yet provide no protection to the UAV once docked. For example, conventional base stations may not include a roof assembly to prevent exposure of the UAV to various environmental conditions, such as those described above.

The present teachings provide a base station that addresses the aforementioned challenges. Operations of the base station herein may advantageously be substantially or entirely automated to substantially alleviate user interaction. The base station herein may also provide protection to the UAV when docked. For example, the base station may partially or entirely enclose the UAV therein to protect the UAV from environmental conditions. Additionally, the base station may be thermally regulated to ensure proper operation of the base station even in extreme weather conditions (e.g., extreme cold, which may expose the base station to snow and/or ice).

Figure 1:
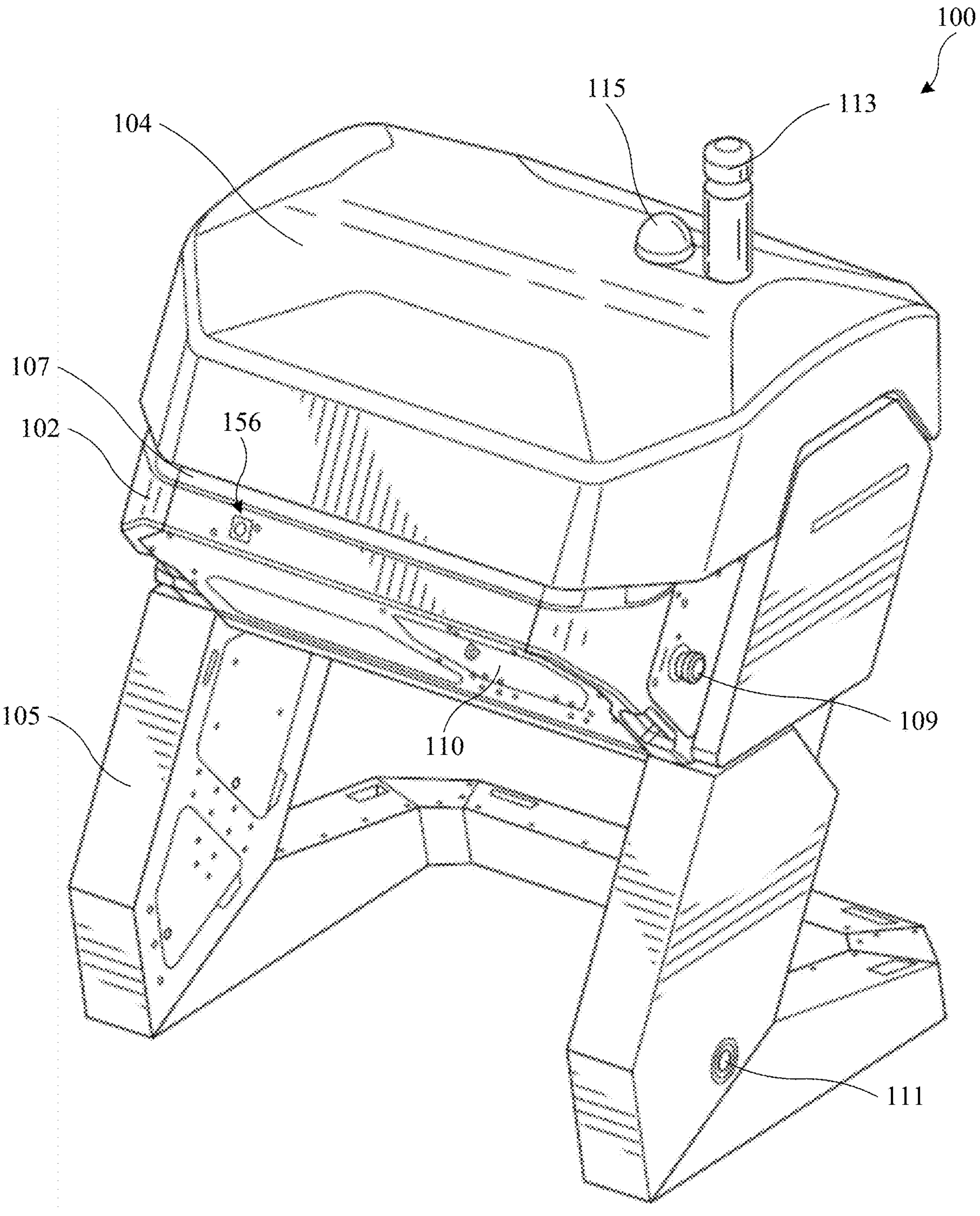
FIG. 1 is a perspective view of a base station for use with a UAV, which includes a rotatable roof assembly.
Figure 2:
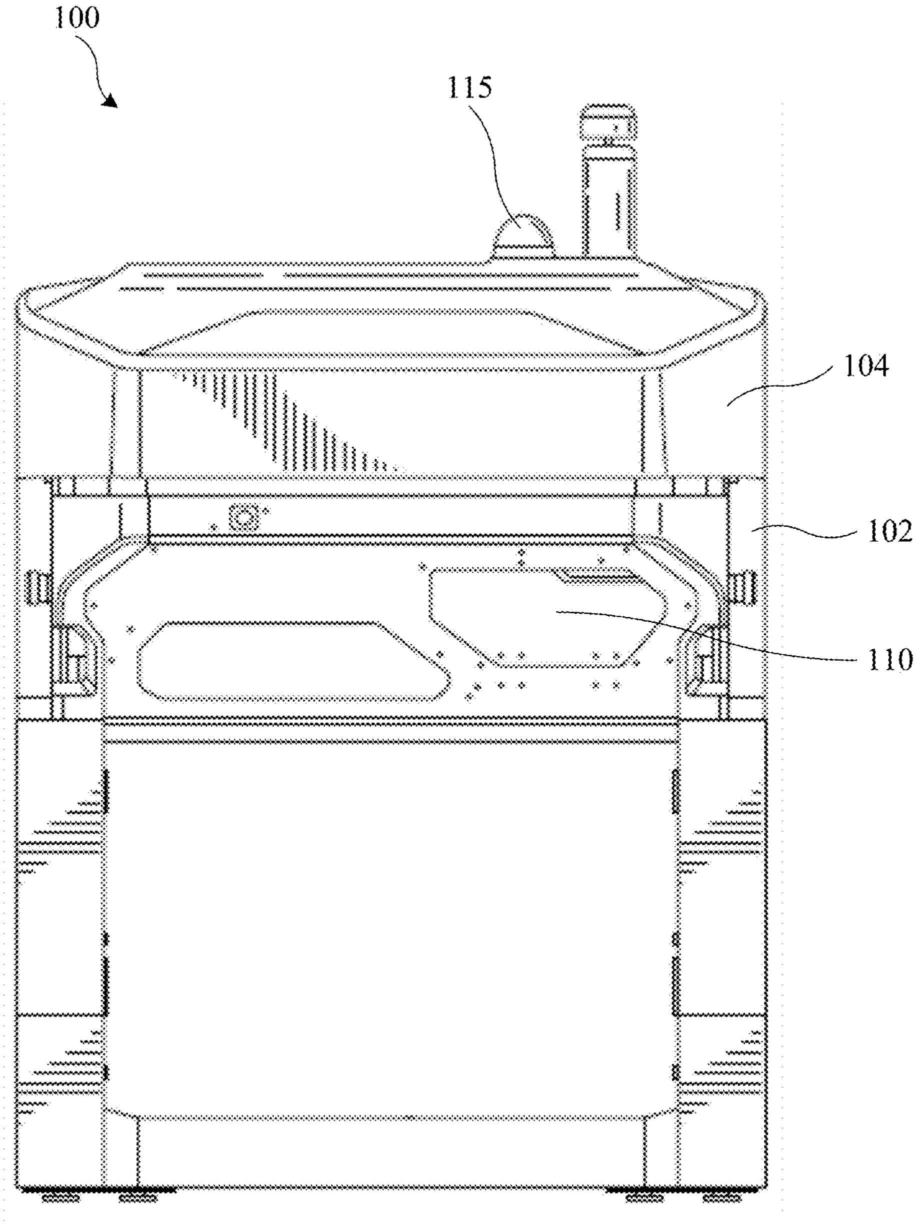
FIG. 2 is a front view of the base station.
Figure 3:
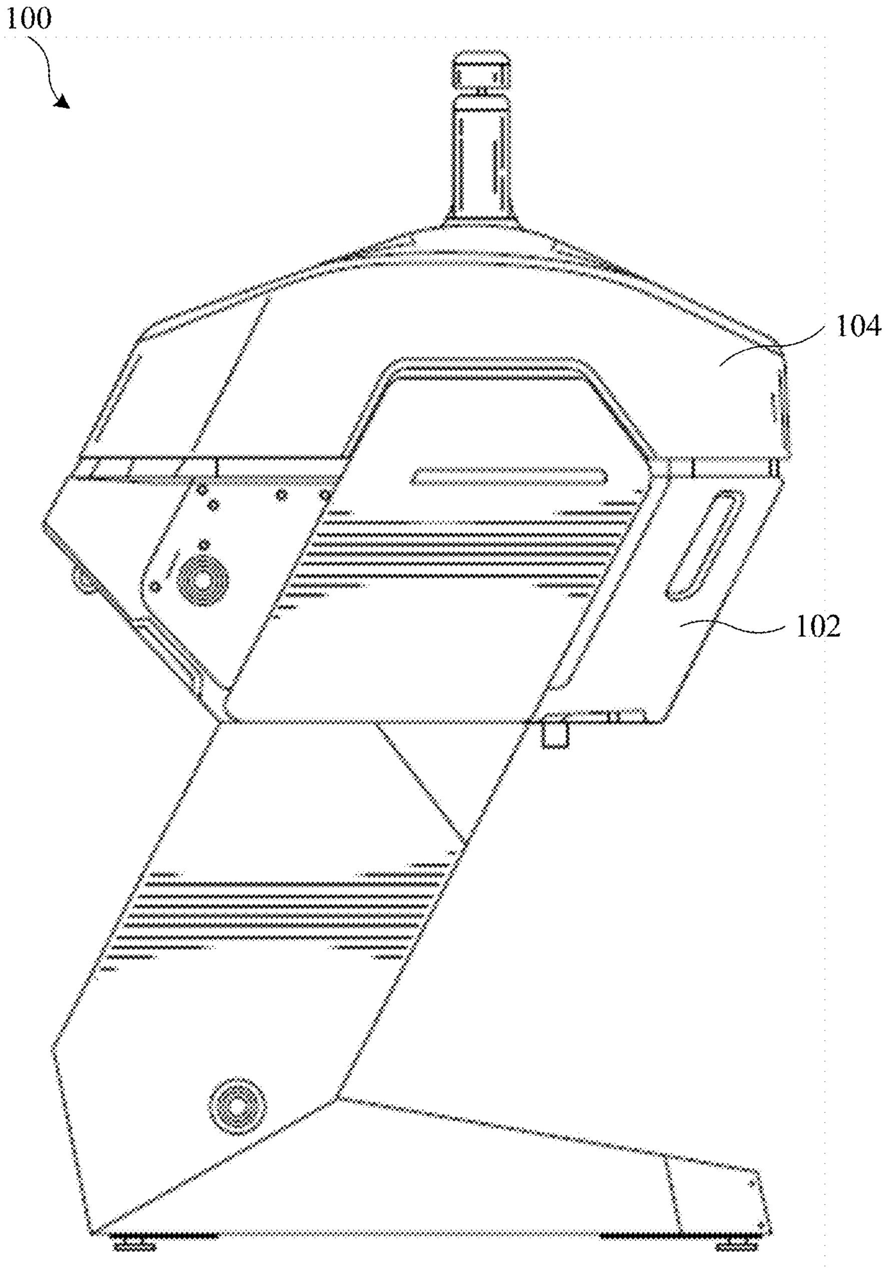
FIG. 3 is a side view of the base station.
Figure 4:
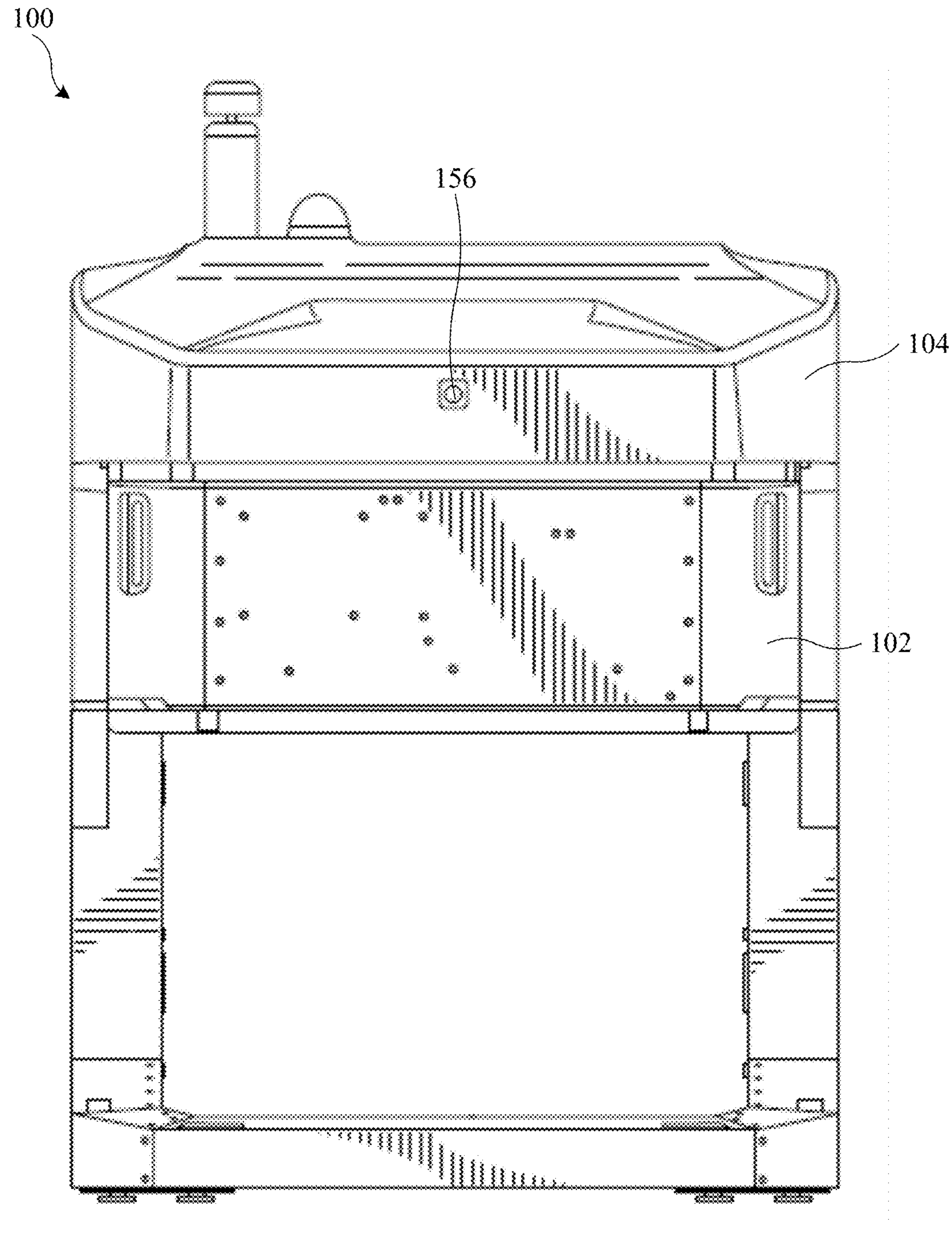
FIG. 4 is a rear view of the base station.
Figure 5:
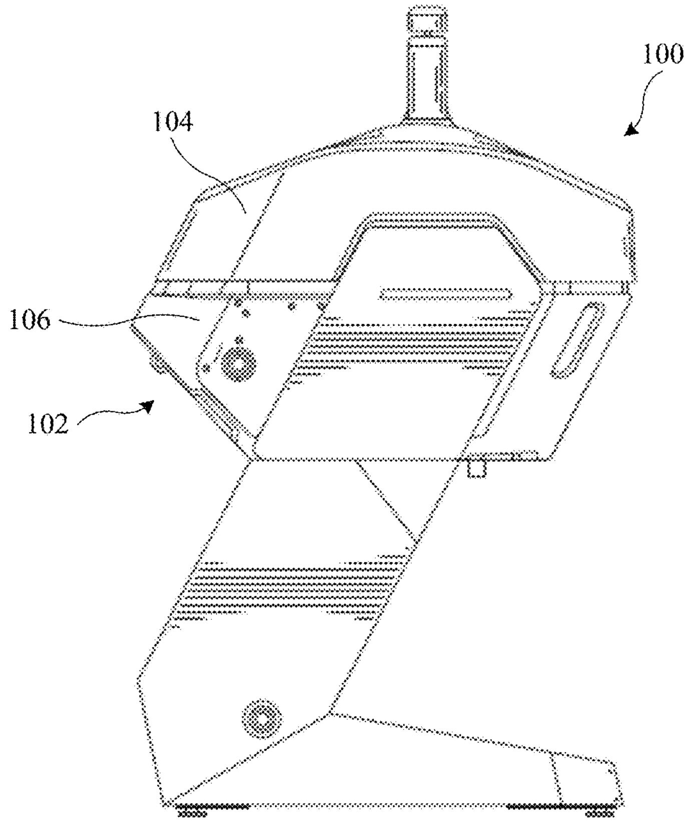
FIG. 5 is a side view of the base station with the roof assembly shown in a closed position.
Figure 6:
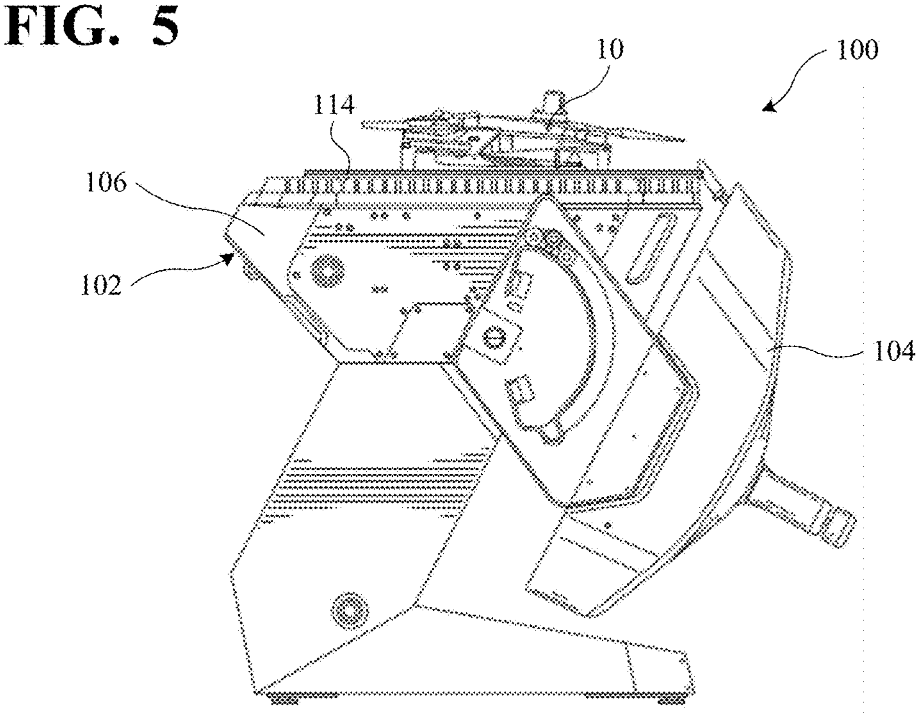
FIG. 6 is a side view of the base station with the roof assembly shown in an open position.
Figure 7:
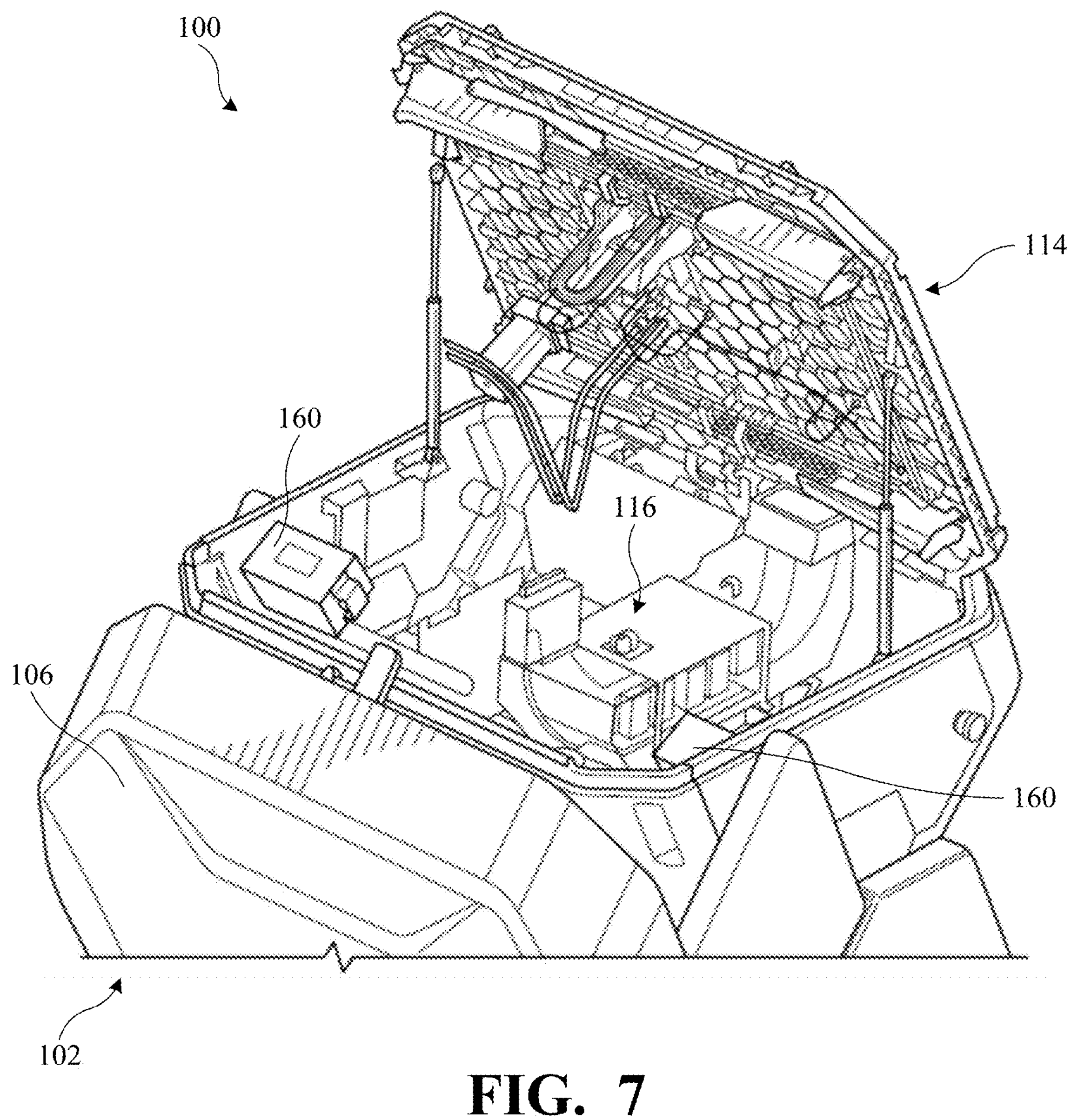
FIG. 7 is a perspective view of the base station illustrating a landing platform for the UAV and various internal components.
Figure 8:
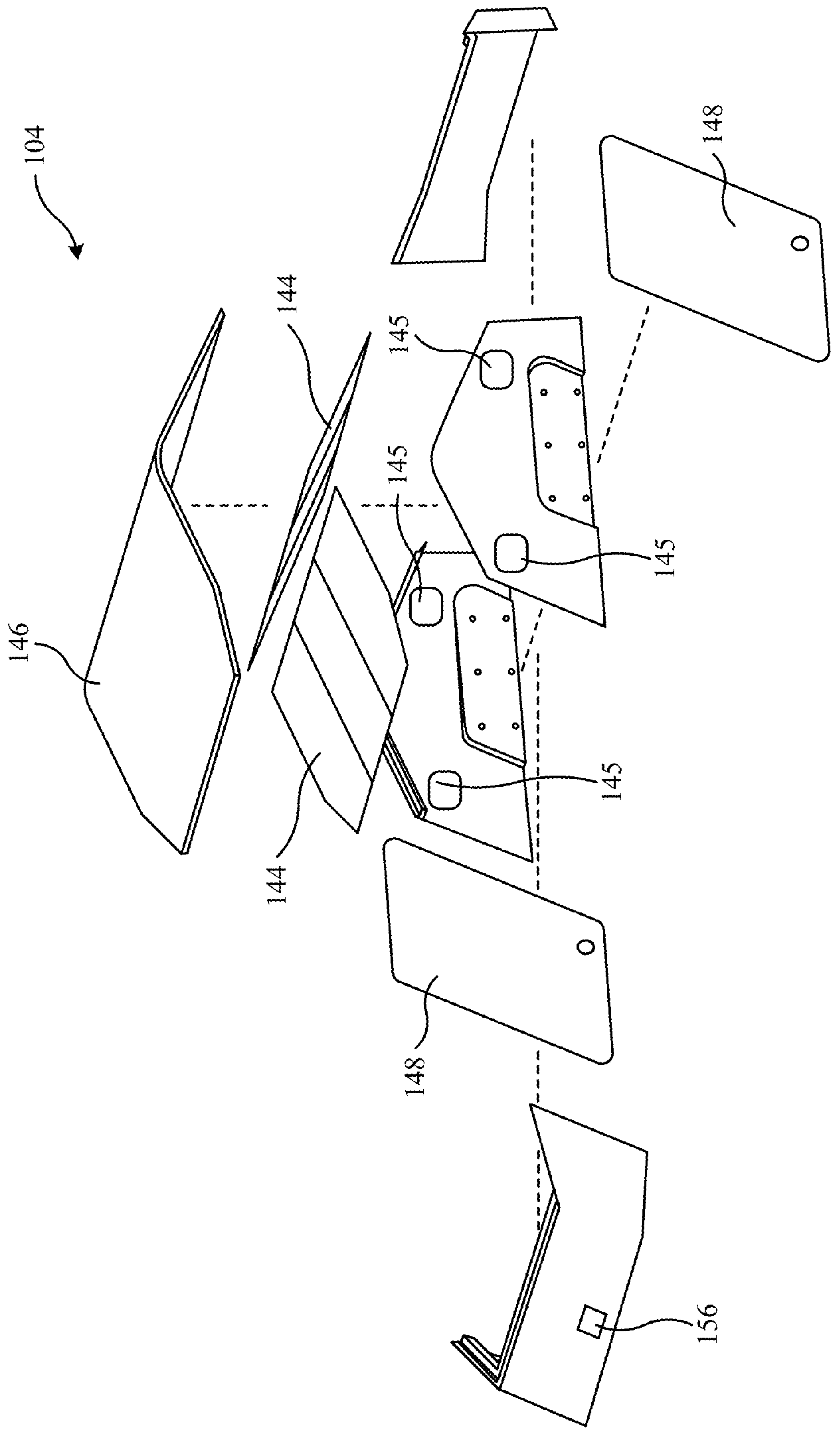
FIG. 8 is a perspective view of the roof assembly shown with parts separated according to one example of the present disclosure.
Figure 9:
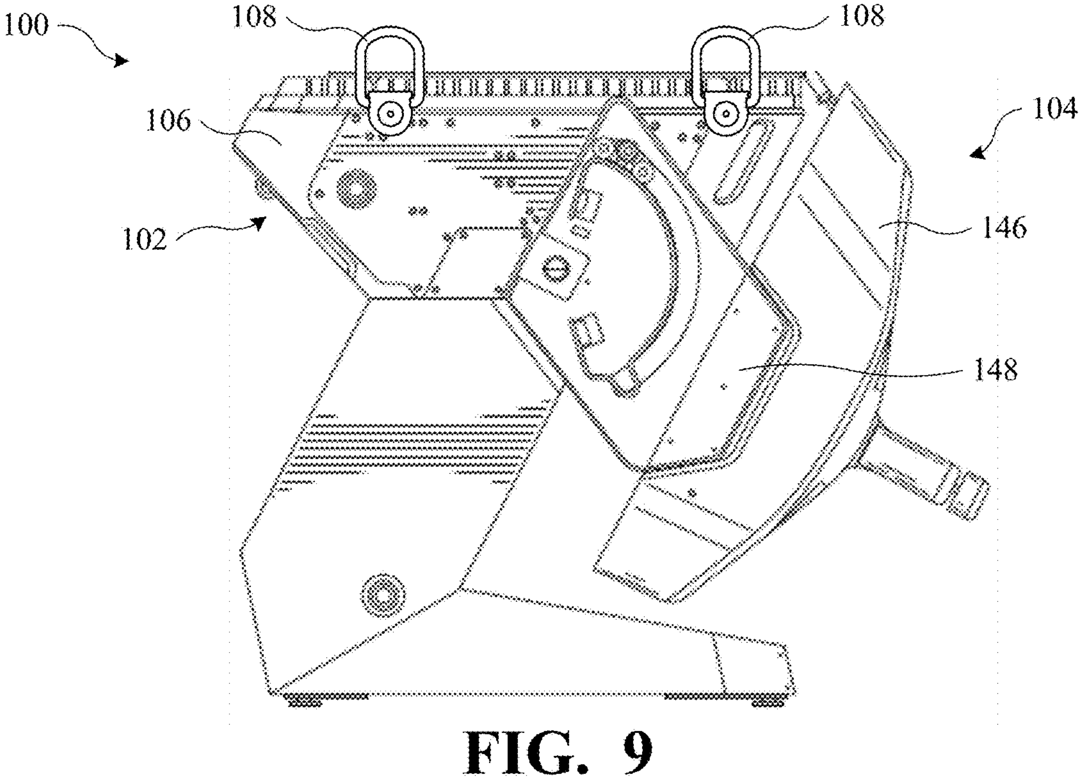
FIG. 9 is a side view of the base station illustrating hoists for use in transporting and/or repositioning the base station.
Figure 10:
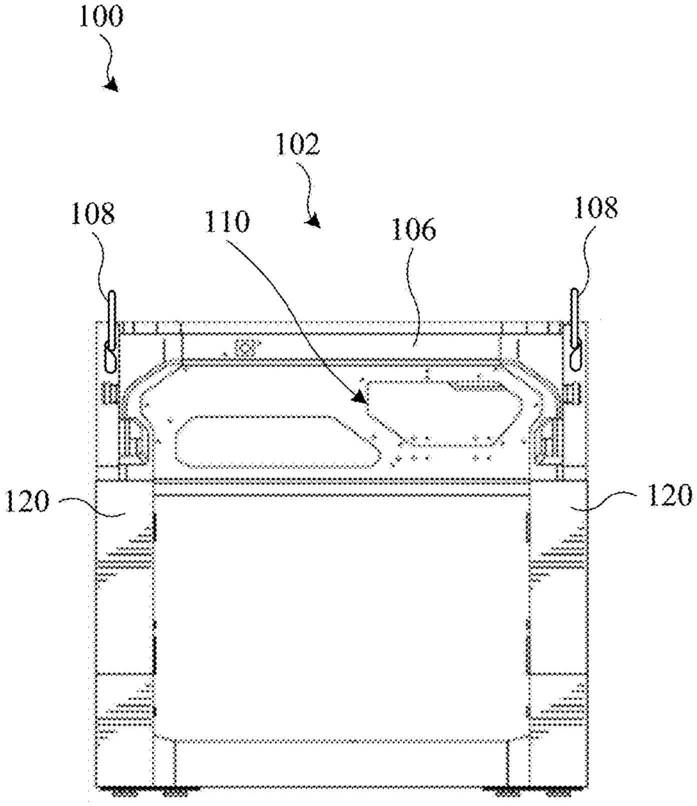
FIG. 10 is a front view of the base station illustrating the hoists and an access module.
Figure 11:
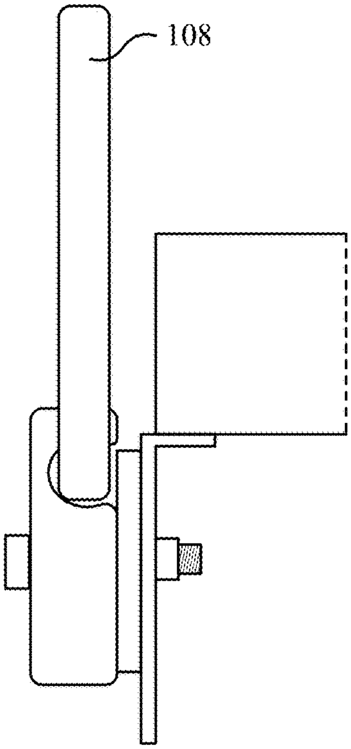
FIG. 11 is a close-up front view of the base station illustrating one of the hoists.
Figure 12:
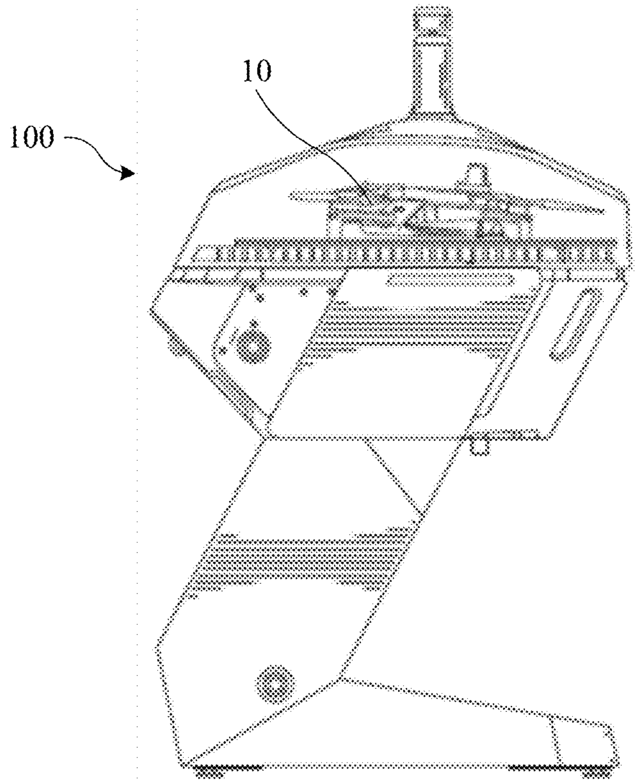
FIG. 12 is a cross-sectional view of the UAV and the base station.

Turning now to the figures, FIGS. 1-6 illustrate a base station 100 (e.g., a dock) for an unmanned aerial vehicle (UAV) 10 (FIGS. 6, 12), whereby the base station 100 is configured for automated servicing (e.g., storage, charging, operation, etc.) and accommodation of the UAV 10. While the base station 100 and the UAV 10 are shown and described herein, in certain embodiments of the disclosure, it is envisioned that a plurality of base stations 100 and more than one of the UAV 10 may be utilized depending, for example, upon the particular intended use of the UAVs 10.

The base station 100 includes a base 102 and a roof assembly 104, which is supported by the base 102 such that the roof assembly 104 is repositionable between a closed position (FIGS. 1-5), in which the UAV 10 is concealed within the base station 100, and an open position (FIG. 6), which facilitates takeoff and landing of the UAV 10. The base station 100 may further include a stand 105 to support the base 102 and the roof assembly 104.

With reference now to FIGS. 7-16 as well, the base 102 includes: a body 106 (e.g., enclosure); hoists 108; an access module 110 (e.g., user box, panel, etc.); a lighting and heating assembly 112, which is waterproof in construction; and a landing platform 114.

The body 106 is the main structural member of the base 102 and supports various internal and external components of the base station 100. For example, the body 106 accommodates: various lights and cameras, such as an indicator light 107; an (emergency) stop 109; one or more vent openings, which support thermal management and heat dissipation; various electrical components (e.g., processors, logic boards, wiring, connectors, etc.); various motors; the access module 110; and the landing platform 114; a temperature control (e.g., heating and cooling) system 116 (FIGS. 7, 14), which is configured to thermally condition (e.g., cool and heat) the base station 100 and the UAV 10 when docked (subject to environmental conditions); one or more internal power sources (e.g., a charging hub 118 (FIG. 16) that is configured for electrical connection to the UAV 10, in which the charging hub 118 may be powered by an external power source (e.g., wall outlet) via wiring routed through a conduit punchout 111 of the stand 105); handles 120, which facilitate transport and/or repositioning of the base station 100; and antennas 145 disposed within the roof assembly 104.

The hoists 108 (FIGS. 9-11) facilitate transport and/or repositioning of the base station 100 (e.g., using a crane or the like) and are connected (secured) to the base 102. In the illustrated embodiment, the base 102 includes a pair of hoists 108. Embodiments in which the particular number of hoists 108 may be increased or decreased are also envisioned herein, however, and would not be beyond the scope of the present disclosure.

Figure 13:
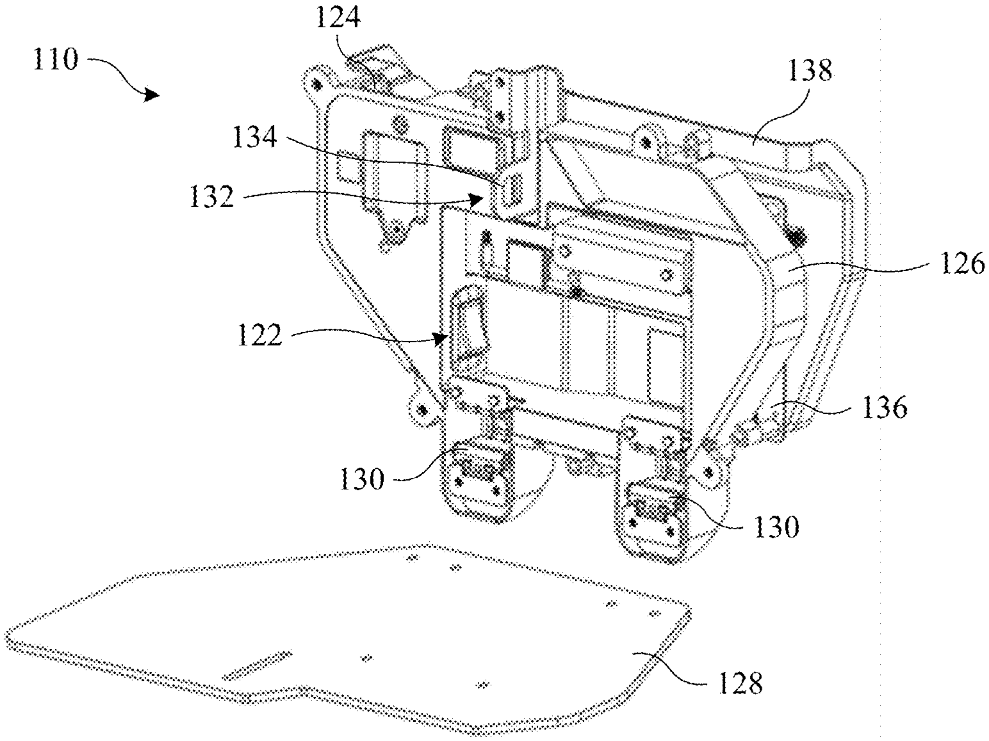
FIG. 13 is a perspective view of the access module.
Figure 14:
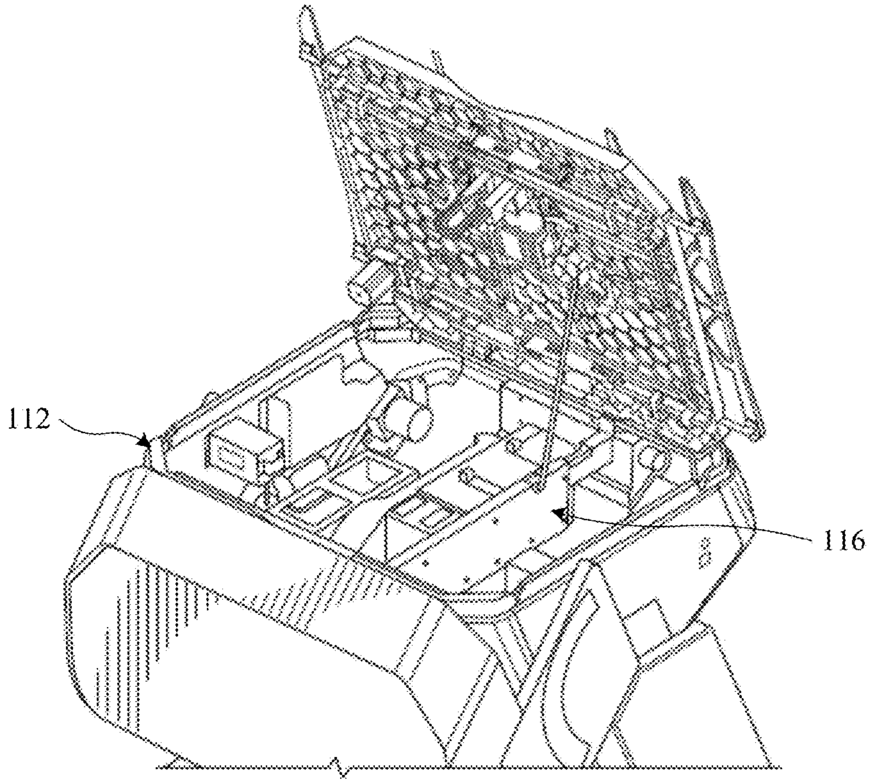
FIG. 14 is a perspective view of the base station illustrating a lighting and heating assembly.
Figure 15:
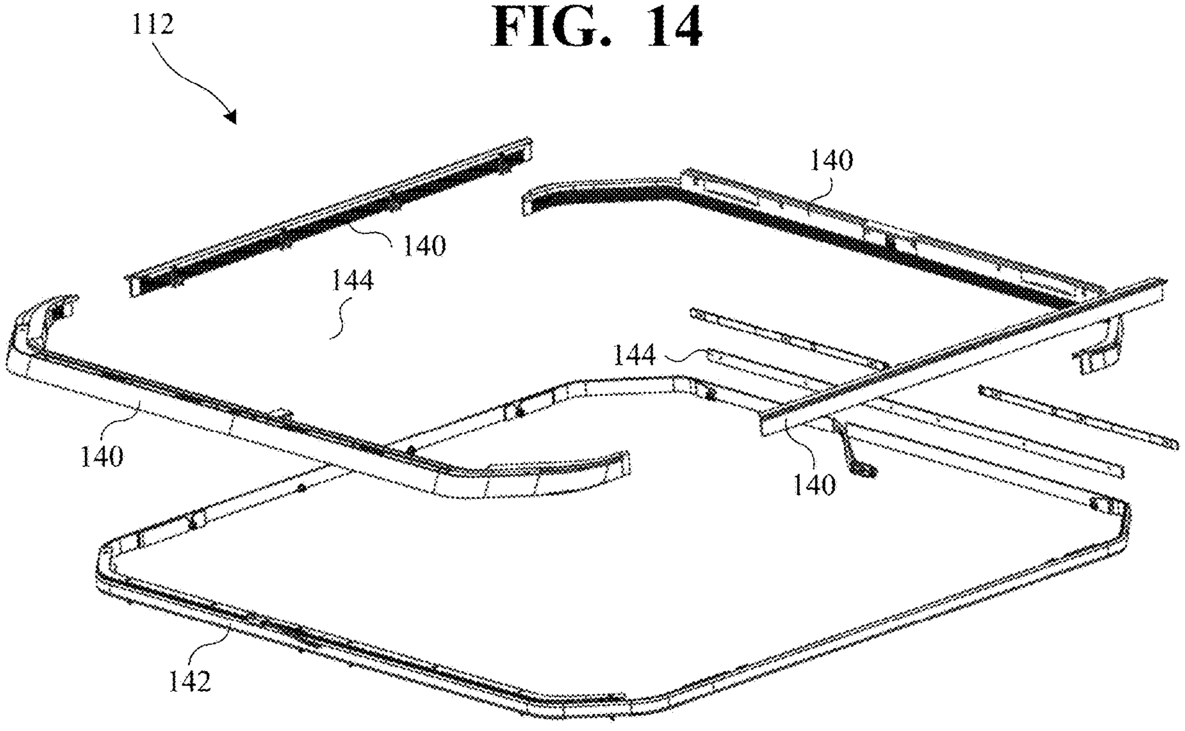
FIG. 15 is a perspective view of the lighting and heating assembly shown separated from the base station.

The access module 110 (FIGS. 1, 2, 10, 13) is connected (secured) to (or otherwise supported by) the body 106 and provides user access to at least one accessibility component 122 including, for example, (one or more) at least one port (e.g., ethernet, USB, etc.), (one or more) at least one switch (e.g., a rocker switch), (one or more) at least one latch (e.g., a roof latch lever 124), etc. As seen in FIG. 13, the access module 110 includes: a box 126, which accommodates the accessibility components 122; a door 128, which is connected to the box 126 such that the door 128 is repositionable between open and closed positions; (one or more) at least one hinge member 130, which pivotably connects the door 128 to the box 126; a locking member 132 (e.g., a padlock loop 134); a printed circuit board (PCB) 136; and an umbrella 138, which is supported by the box 126 and is configured to inhibit (if not entirely prevent) the entry of water, dust, debris, etc.

The lighting and heating assembly 112 (FIGS. 14, 15) provides a visual indication that the base station 100 is (and/or will become) active and facilitates de-icing of the roof assembly 104 in order to support repositioning of the roof assembly 104 between the closed and open positions. The lighting and heating assembly 112 is generally positioned at (e.g., adjacent to) the perimeter of the base 102 and includes: (one or more) at least one diffuser lens 140; (one or more) at least one light 142 (e.g., an LED strip), which is positioned (located) vertically below the landing platform 114; (one or more) at least one heater 144; and a (wiring) harness.

The landing platform 114 (FIGS. 6, 7, 16) is supported by (e.g., connected (secured) to the body 106 and receives the UAV 10 during docking. More specifically, the landing platform 114 is configured to receive the UAV 10 such that a camera 12 (FIG. 16) (or other such image/video capture device) on the UAV 10 is positioned (located) vertically above the landing platform 114, which establishes line-of-sight between the camera 12 and the interface with the charging hub 118 (e.g., to allow for inspection of the electrical connection between the base station 100 and the UAV 10 upon docking).

Figure 17:
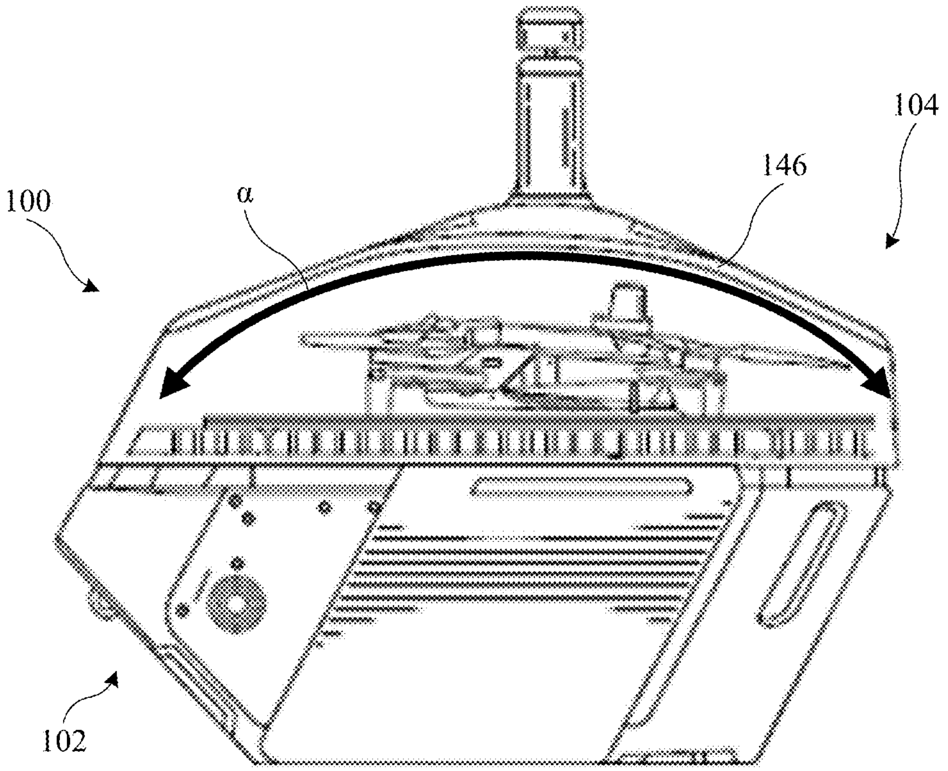
FIG. 17 is a side view of the UAV and the base station with the roof assembly shown in the closed position and illustrating an angular range of motion thereof.
Figure 18:
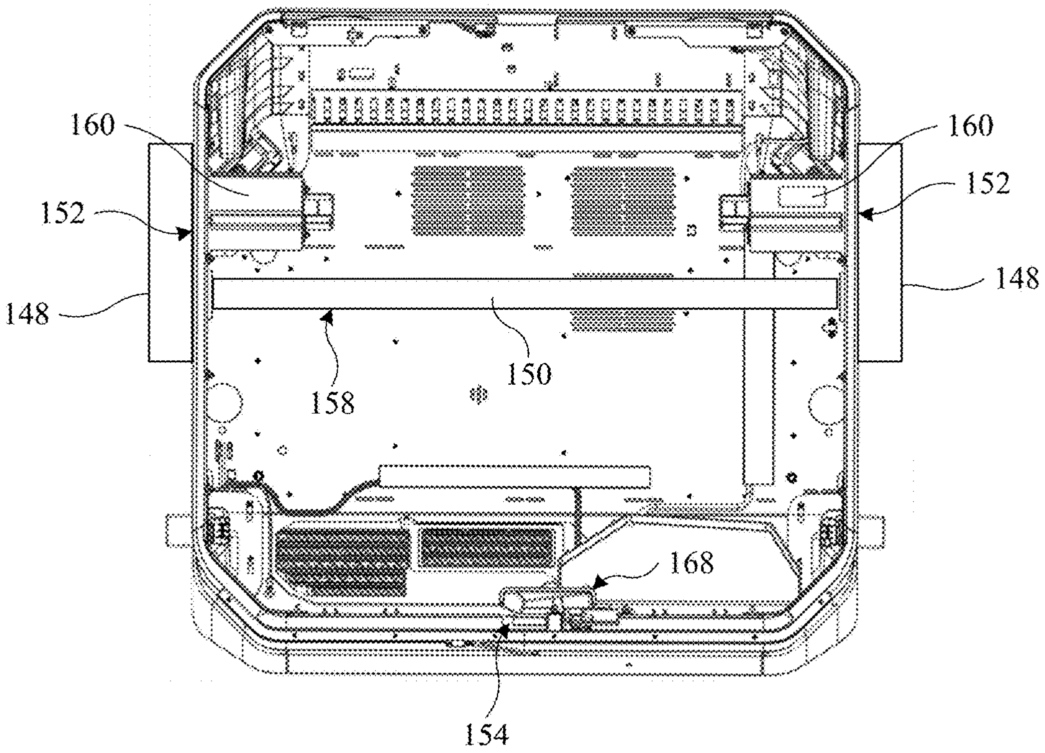
FIG. 18 is a top view of the base station illustrating a drive system of the roof assembly.

Referring now to FIGS. 17-25 as well, the roof assembly 104 will be discussed. The roof assembly 104 is connected (secured) to (or otherwise supported by) the base 102 such, during repositioning of the roof assembly 104 between the closed and open positions, the roof assembly 104 is rotatable through an angular range of motion $\alpha$ (FIG. 17).

Figure 16:
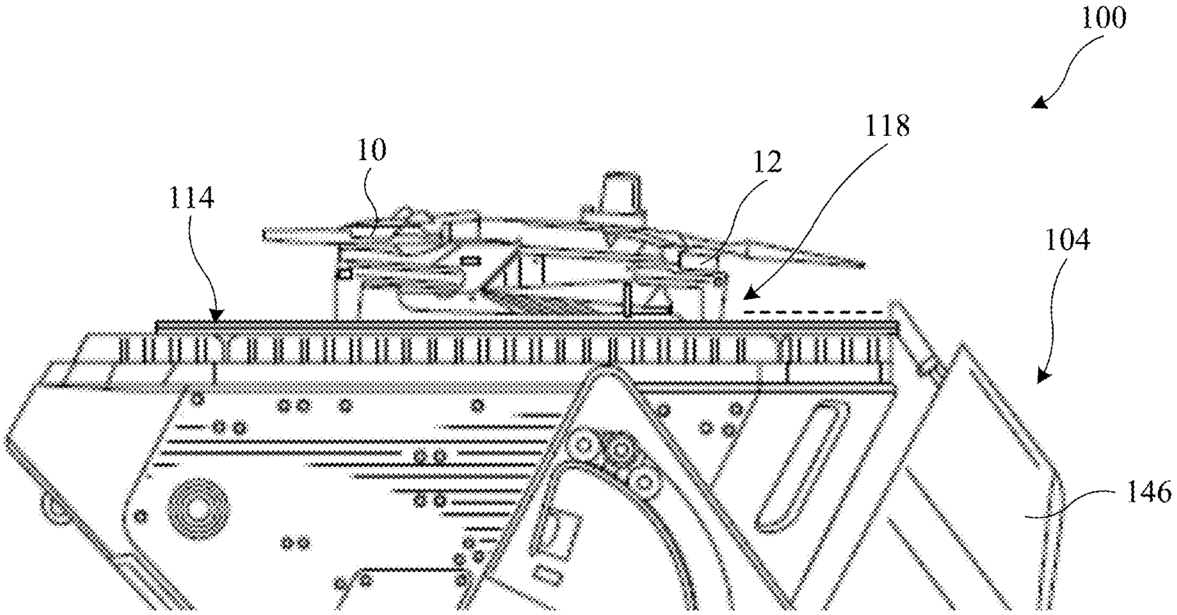
FIG. 16 is a side view of the UAV and the base station with the roof assembly shown in the open position.

In the illustrated embodiment, the roof assembly 104 is configured such that the angular range of motion $\alpha$ lies substantially within the range of approximately 110 degrees to approximately 120 degrees (e.g., 117 degrees), which allows the roof assembly 104 to be positioned substantially or entirely below the landing platform 114 in the open position with respect to an elevational axis (e.g., an elevation direction extending up and down with respect to the base station 100, as seen in FIG. 16, and inhibits (if not entirely prevents) contact between the roof assembly 104 and the UAV 10. Embodiments in which the roof assembly 104 may be configured such that the angular range of motion $\alpha$ lies outside of the disclosed range are also envisioned herein (e.g., depending upon the particular configuration of the UAV 10), however, and would not be beyond the scope of the present disclosure. That is, a variety of angular ranges of motion of the roof assembly 104 may be possible based on the teachings herein.

In order to inhibit (if not entirely prevent) unintended repositioning of the roof assembly 104 into the open position (e.g., in the event of power loss), it is envisioned that the base station 100 may include the aforementioned (emergency) stop.

The roof assembly 104 includes: a cover 146; ears 148, which connect the cover 146 to the base 102 and support repositioning of the roof assembly 104 between the closed and open positions (i.e., movement through the angular range of motion $\alpha$); a pivot shaft 150; a drive system 152; a locking mechanism 154; and (one or more) at least one camera 156 (FIGS. 1, 4) (or other such image/video capture device), which facilitates inspection during repositioning of the roof assembly 104 between the closed and open positions. The roof assembly 104 may further include one or more sensors coupled to or otherwise disposed in the cover 146, such as a wind sensor 113 and/or a rain sensor 115.

The pivot shaft 150 is connected (secured) to and supports the ears 148 during repositioning of the roof assembly 104 between the closed and open positions. The pivot shaft 150 defines a channel 158 (FIG. 18), which is configured to receive (one or more) data and/or power transition members (e.g., wire(s), cable(s), flexible printed circuits, etc.).

In the illustrated embodiment, the pivot shaft 150 is configured such that the channel 158 defines an inner diameter that lies substantially within the range of approximately 30 mm to approximately 50 mm (e.g., approximately 45 mm). Embodiments in which the pivot shaft 150 may be configured such that the inner diameter of the channel 158 lies outside of the disclosed range also envisioned herein, however, and would not be beyond the scope of the present disclosure.

Figure 19:
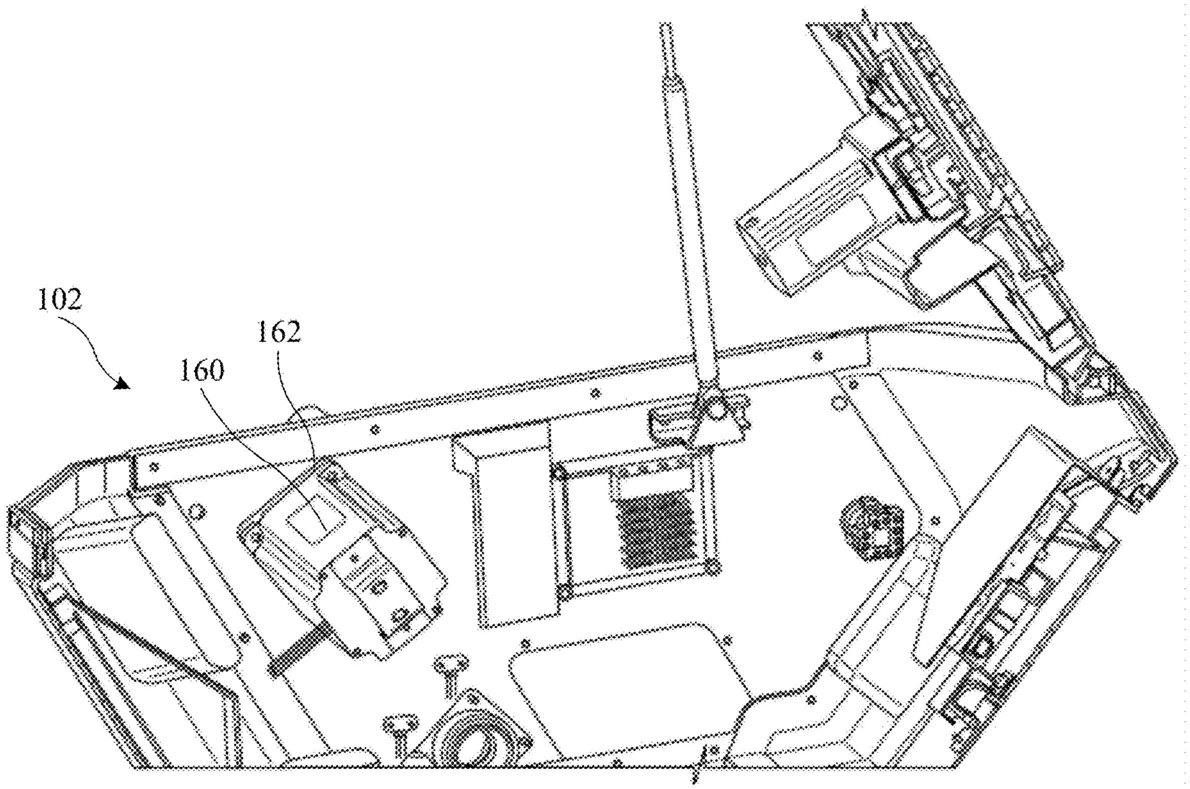
FIG. 19 is a perspective view of the base station illustrating the drive system of the roof assembly.
Figure 20:
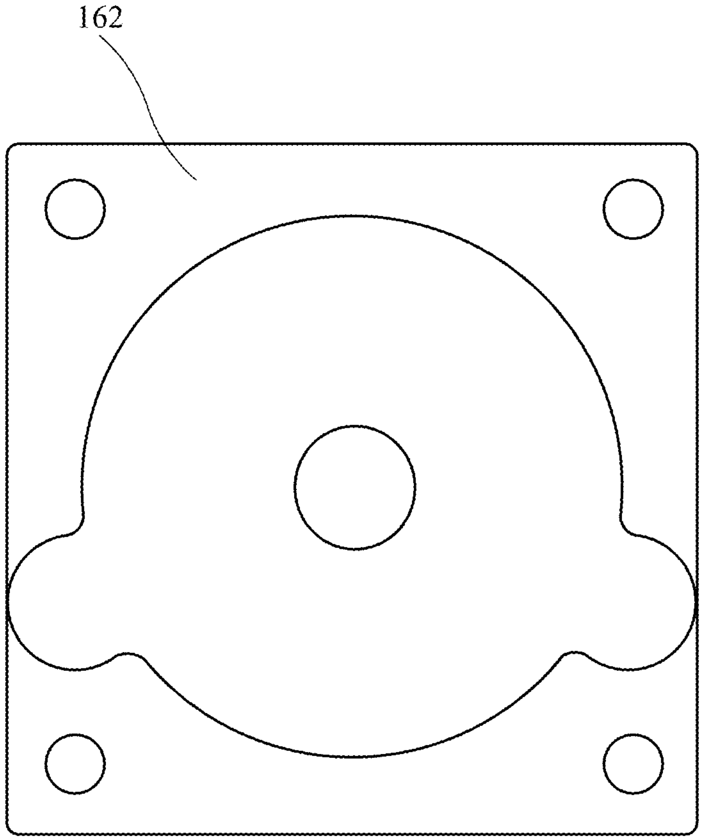
FIG. 20 is a side view of a spacer.
Figure 21:
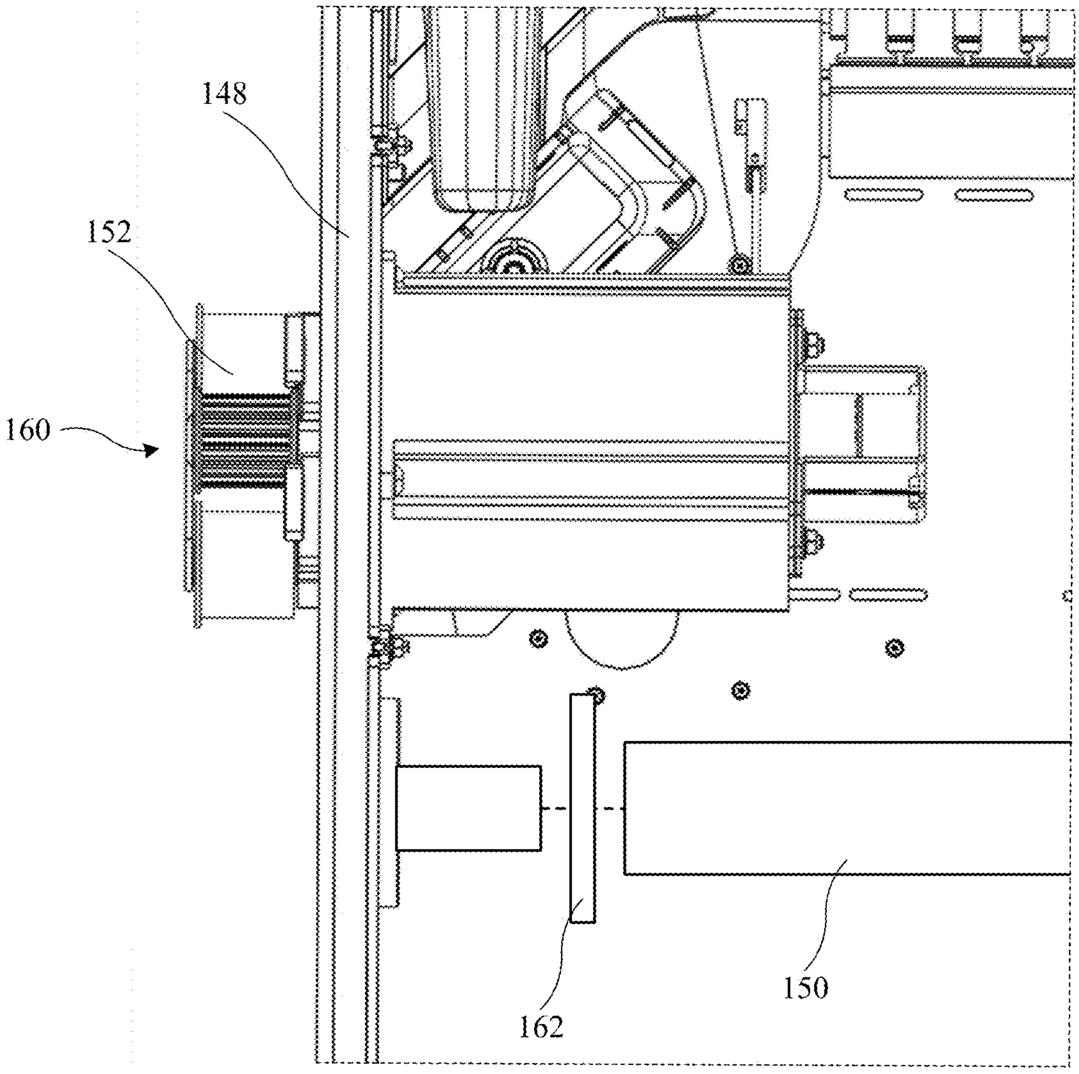
FIG. 21 is a top view of the base station during the installation of a pivot shaft.
Figure 22:
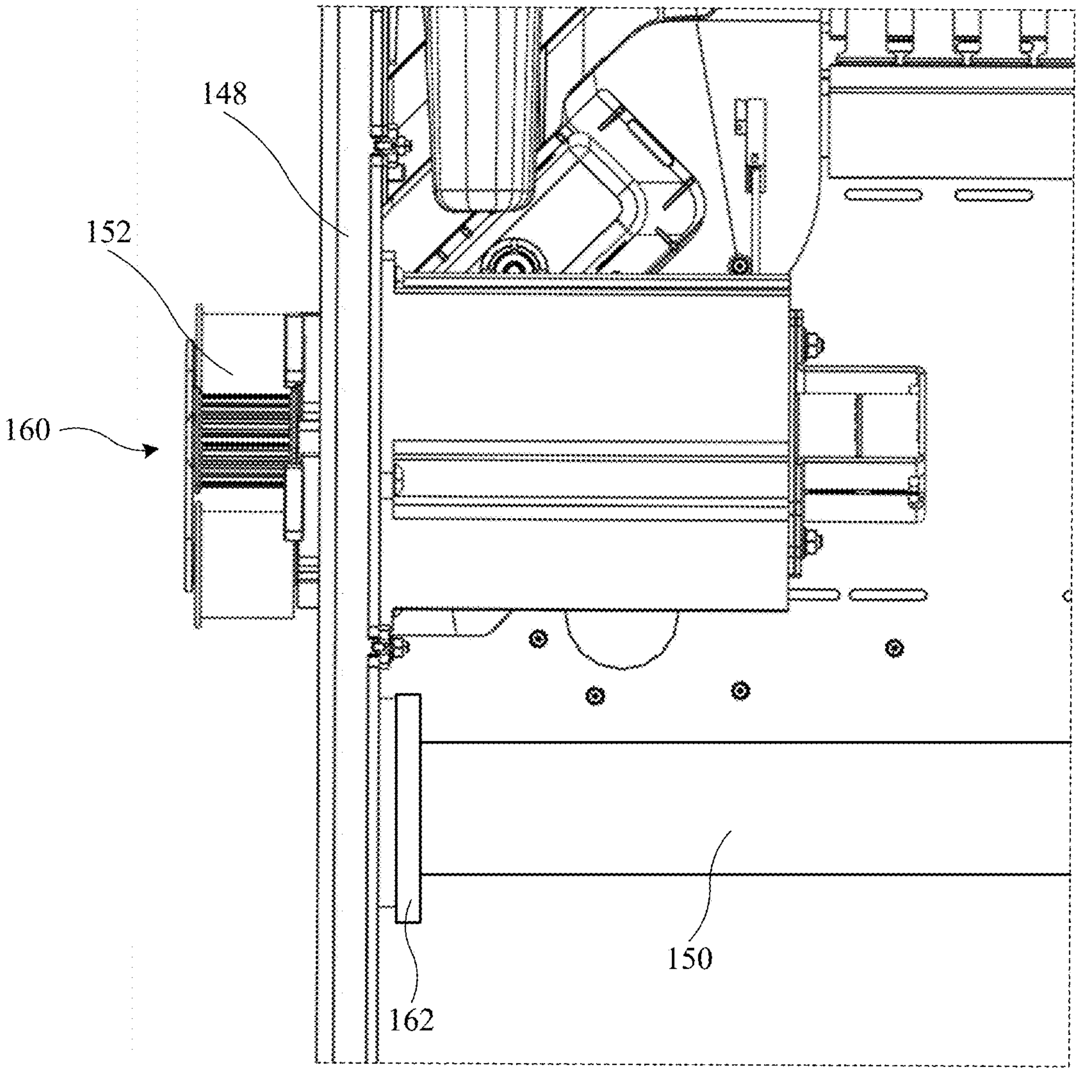
FIG. 22 is a perspective view of the base station upon installation of the pivot shaft.
Figure 23:
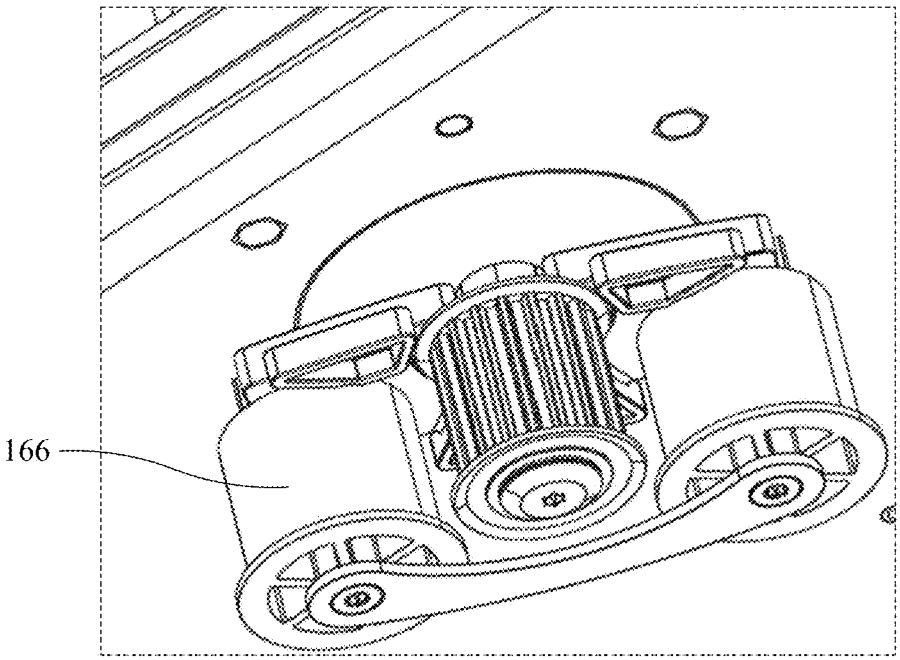
FIG. 23 is a perspective view of the drive system of the roof assembly.
Figure 24:
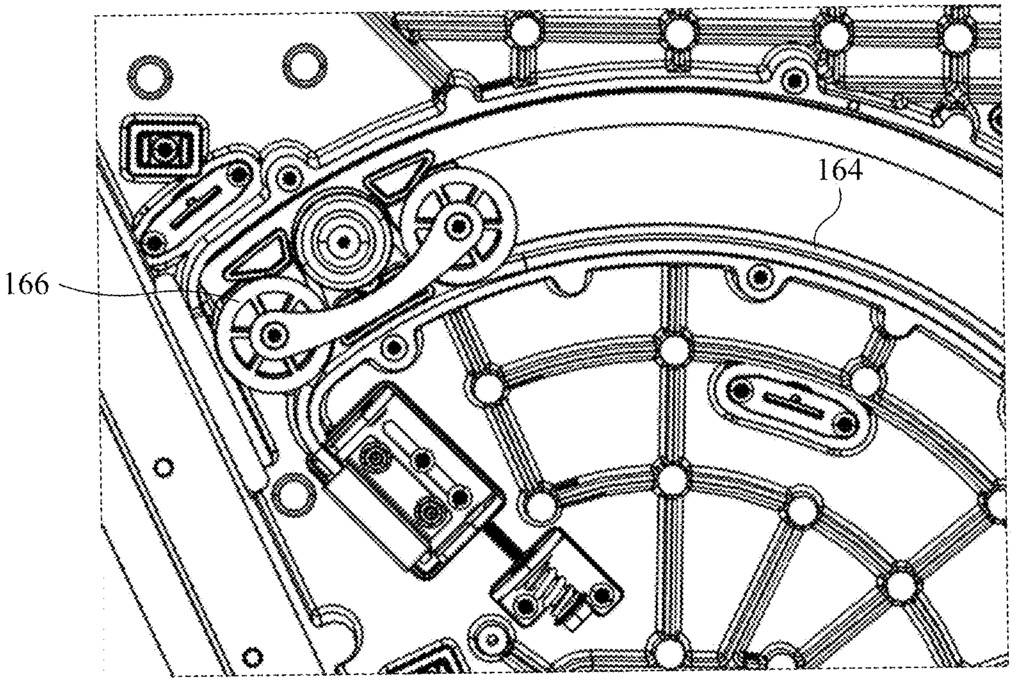
FIG. 24 is a perspective view of the drive system of the roof assembly.

The drive system 152 engages the ears 148 and is configured to rotate the ears 148 in relation to the base 102 during repositioning of the roof assembly 104 between the closed position and the open position. The drive system 152 includes: (one or more) at least one motor (actuator) 160; (one or more) one or more spacers 162 (FIGS. 19, 20); (one or more) at least one belt 164 (FIGS. 23, 24), which engages (contacts) the motors 160; (one or more) at least one pulley 166, which supports the belts 164; (one or more) at least one damper, which is configured to absorb force during repositioning of the roof between the closed and open positions; and (one or more) at least one limit sensors.

The motors 160 are connected (secured) to the base 102 and are configured to drive the roof assembly 104 during repositioning between the closed and open positions. In the illustrated embodiment, the base station 100 includes a pair of motors 160. Embodiments in which the particular number of motors 160 may be increased or decreased are also envisioned herein (e.g., depending upon the size and/or the configuration of the roof assembly 104), however, and would not be beyond the scope of the present disclosure.

The spacers 162 are positioned (located) between and separate the motors 160 and the base 102. The spacers 162 correspond in number to the motors 160 and are in general (radial) alignment therewith. As such, in the illustrated embodiment, the base station 100 includes a pair of spacers 162. Embodiments in which the particular number of spacers 162 may be increased or decreased are also envisioned herein (e.g., depending upon the particular number of motors 160), however, and would not be beyond the scope of the present disclosure.

As seen in FIG. 20, the spacers 162 each includes a generally symmetrical configuration, which allows for the use of identical ones of the spacers 162, thereby obviating the need for distinct (different) components and simplifying the manufacturing and assembly of the base station 100.

Figure 25:
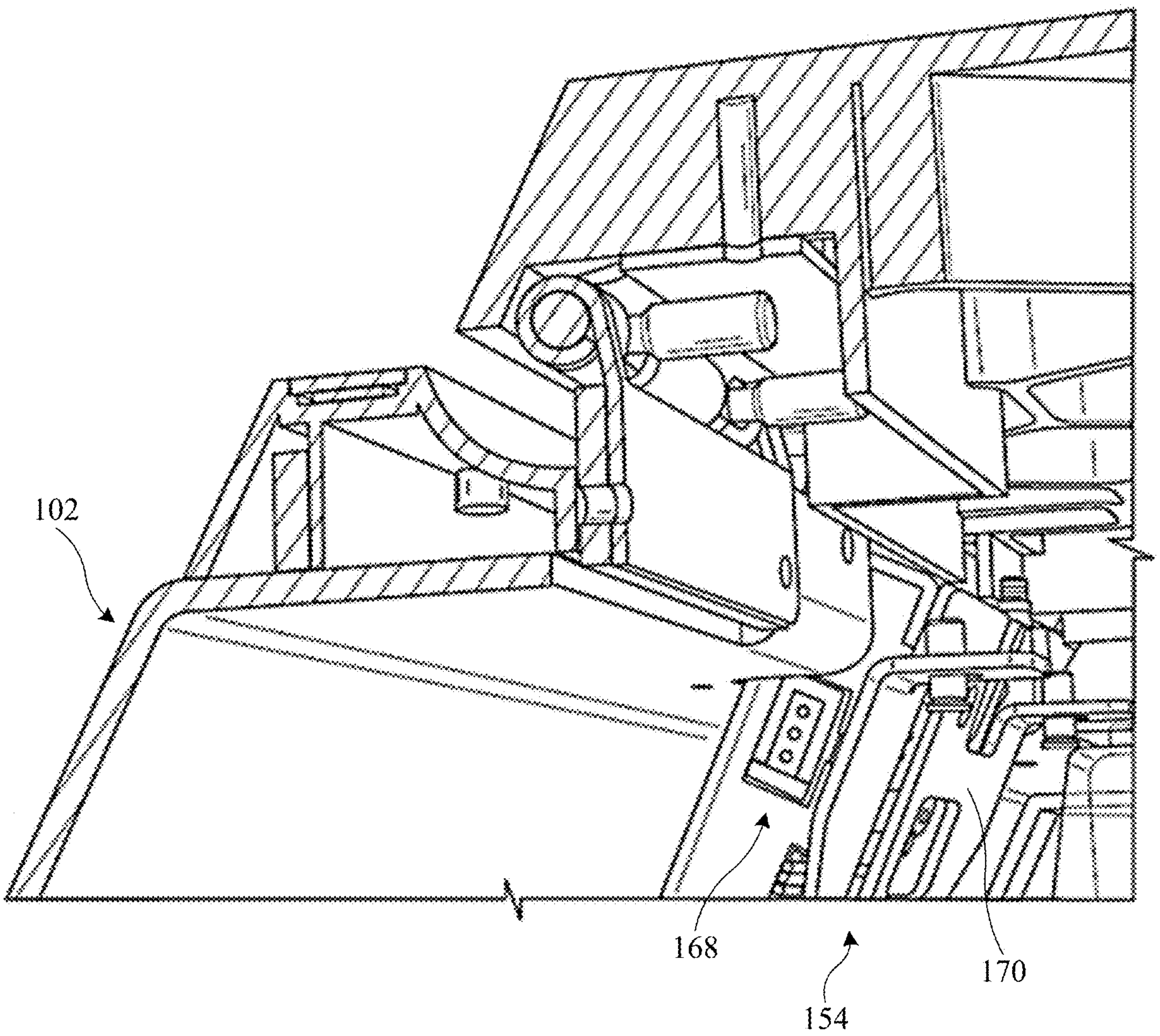
FIG. 25 is a perspective view of the base station illustrating a roof latch of the roof assembly.

The locking mechanism 154 (FIGS. 18, 25) includes a roof latch 168, which is connected (secured) to the base 102 via a bracket 170 (FIG. 25). The roof latch 168 is configured for engagement (contact) with the roof latch lever 124 (FIG. 13) such that the roof latch 168 is (manually) repositionable from a locked position into an unlocked position upon the application of sufficient force to the roof latch lever 124.

Figure 26:
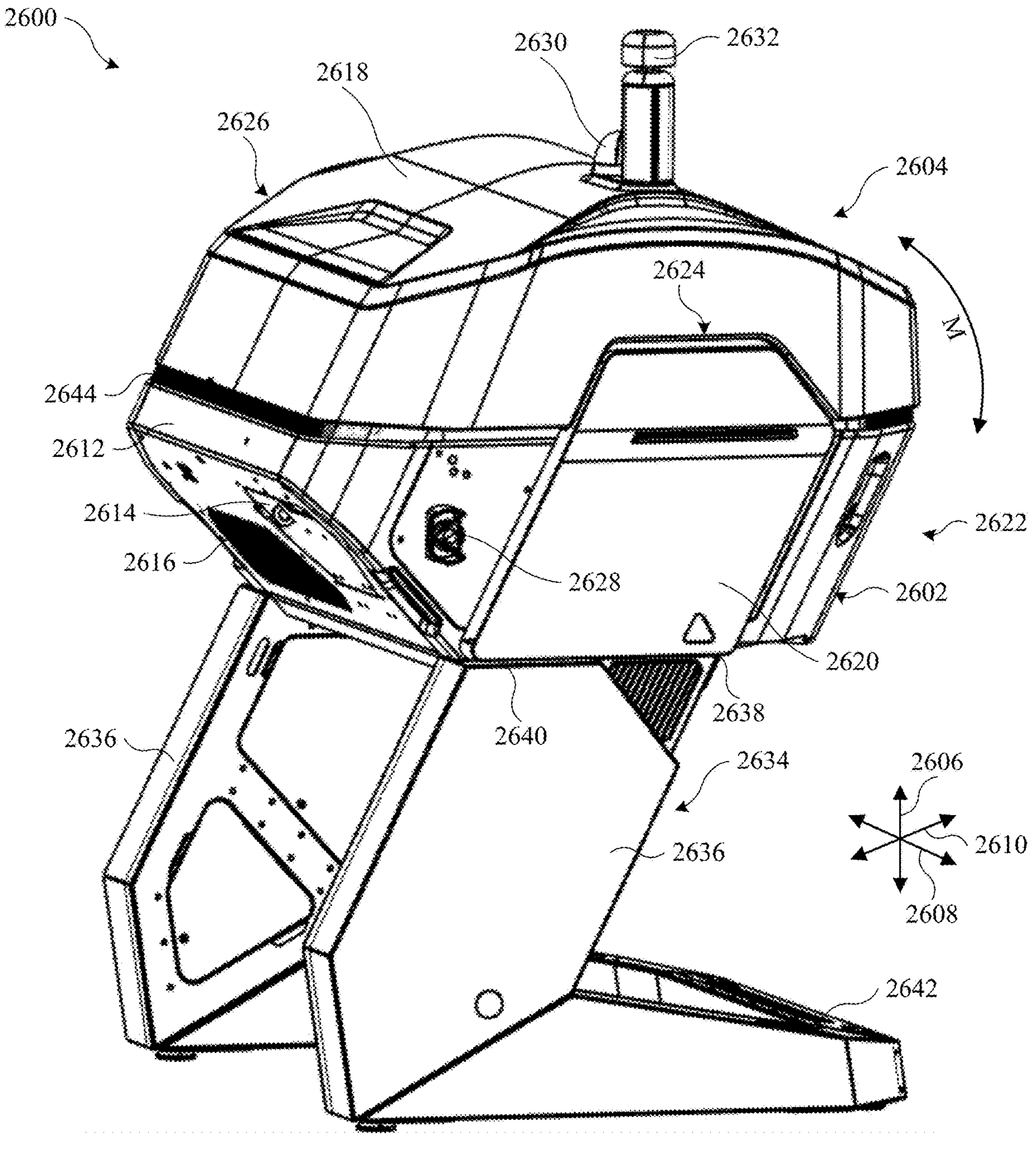
FIG. 26 is a perspective view of another example of a base station illustrating a roof assembly of the base station in a closed position.

FIG. 26 illustrates a perspective view of another example of a base station 2600. The base station 2600 may be similar to the base station 100 of FIGS. 1-25 described above unless otherwise stated. By way of example, the base station 2600 may also include a base 2602 and a roof assembly 2604 movably coupled to the base 2602. As discussed further below, the roof assembly 2604 may be movable between an open position, in which the roof assembly 2604 exposes an interior region of the base 2602, and a closed position, in which the roof assembly 2604 at least partially encloses the interior region of the base 2602. FIG. 26 illustrates the closed position of the roof assembly 2604.

The base station 2600 may be configured to house and/or support a UAV, such as the UAV 10. For example, the base 2602 may be or may include a landing platform (e.g., similar to the landing platform 114 of the base station 100). During operation (e.g., flight) of the UAV 10, the UAV 10 may commence a landing sequence, such as based upon recognition of the landing platform and/or one or more fiducial markings thereon, and land on the landing platform. That is, the UAV 10 may be docked on the landing platform and supported by the landing platform.

When the UAV 10 is docked, the roof assembly 2604 may be configured to move to the closed position shown in FIG. 26 to enclose the landing platform and the UAV 10 supported thereon to protect both the landing platform and the UAV 10 from environmental conditions (e.g., precipitation, debris, sunlight, etc.) When an operator wishes to initiate takeoff of the UAV 10 from the landing platform, the roof assembly 2604 may be actuated to move to the open position, whereby the roof assembly 2604 may be located at least partially below the landing platform with respect to an elevational direction 2606 of movement (e.g., an up-and-down direction). For illustrative purposes, the elevation direction 2606 may be considered movement along or parallel to a Z-axis of the base station 2600, which may be transverse to a lateral direction 2608 of movement (e.g., side-to-side movement along or parallel to an X-axis of the base station 2600) and transverse to a longitudinal direction 2610 of movement (e.g., front-to-back movement, or vice versa, along or parallel to a Y-axis of the base station 2600). As such, when the roof assembly 2604 is in the open position, the landing platform—and thus the UAV 10—are unobstructed by the roof assembly 2604 to facilitate takeoff and landing of the UAV 10.

The base 2602 may include a body 2612 that supports the landing platform. The body 2612 may substantially form an overall shape and housing of the base 2602. As discussed further below, the body 2612 may define a cavity therein, which may contain one or more components of the base station 2600, such as the landing platform and at least a portion of the drive system that actuates the roof assembly 2604. Additionally, the body 2612 may be movably coupled to the roof assembly 2604 and may help facilitate movement of the roof assembly 2604 between the open position and the closed position.

As mentioned above, the body 2612 may include and/or house one or more components of the base station 2600. By way of example, the body 2612 store one or more electrical components of the base station 2600, such as a control module, wiring (e.g., power and/or data wiring), one or more sensors (e.g., contact sensors, humidity sensors, temperature sensors, etc.), or a combination thereof. Such electrical components may be accessible from outside the base station 2600 via an access module 2614 of the body 2612. The access module 2614 may be an access panel, which may open to allow a user to access or otherwise communicate with the electrical components of the base station 2600. For example, the access module 2614 may be opened to expose a port, whereby the user may connect an external electronic device (e.g., laptop, tablet, mobile phone, etc.) to an electrical system of the base station 2600 via a connector connected to the port to thereby establish a communication path between the electronic device and the electrical system.

Additionally, due to potentially heightened operating temperatures of such an electrical system, the body 2612 may also include venting 2616 to dissipate such heat and ensure that the electrical system of the base station 2600 does not overheat. The venting 2616 may be slits, cutouts, or other openings to promote air flow between the interior region of the body 2612 (e.g., the cavity storing the electronic components therein) and an external environment. In some configurations, the base 2602 may also include one or more heat sinks to further promote heat dissipation from the body 2612. In an example, the electronic components of the base station 2600 may include one or more printed circuit boards (PCBs), which may be coupled to one or more heat sinks located within the body 2612. The one or more heat sinks may be coupled to the body 2612 such that heat generated by the PCBs may be transferred through the one or more heat sinks to the body 2612, at which point the heat may be dissipated into the external environment.

As discussed above, the roof assembly 2604 may be movably coupled to the base 2602. As shown in FIG. 26, the roof assembly 2604 may include a cover 2618 (e.g., a one-piece or unitary cover) and one or more ears, such a first ear 2620 coupled to the cover 2618 and movably coupled to the body 2612. For example, the first ear 2620 may be coupled to a first side 2622 (e.g., a first lateral side) of the cover 2618, such as within a groove 2624 defined by the cover 2618 and located on the first side 2622 of the cover 2618. The first ear 2620 may extend downward from the cover 2618 with respect to the elevational direction 2606 and be coupled to the first side 2622 of the base 2602 (e.g., the first side 2622 of the body 2612) to establish a pivot therebetween.

The roof assembly 2604 may further include a second ear, which may be similar to the first ear 2620 described above, that is coupled to an opposing second side 2626 of the cover 2618. For example, the second ear may extend downward from the cover 2618 with respect to the elevational direction 2606 and may be coupled to the opposing second side 2626 of the base 2602 (e.g., the opposing second side 2626 of the body 2612) to establish a pivot therebetween. Thus, based on actuation by the drive system of the base station 2600, the first ear 2620 and the second ear may facilitate movement of the roof assembly 2604 in a direction of movement (M) between the closed position and the open position. That is, the roof assembly 2604 may be rotatable through an angular range of motion that is defined by one or more ears of roof assembly 2604, such as the first ear 2620 and the second ear. For example, the roof assembly 2604 may be rotatable through the angular range of motion, which may be substantially within a range of approximately 110 degrees to approximately 120 degrees during repositioning of the roof assembly 2604 between the closed position and the open position. However, such a range of motion is not limited and could be tuned to any desired range of motion. For example, the roof assembly 2604 may be rotatable through an angular range of motion that may be within the range of approximately 60 degrees or more to approximately 180 degrees or less.

Actuation of the roof assembly 2604 may be done manually and/or remotely. For manual operation, the base station 2600 may include a manual override state in which a user may manually articulate the roof assembly 2604 between the closed position and the open position. For example, the base station 2600 may enter the manual override state for maintenance or during a power outage. However, it is envisioned that the roof assembly 2604 may generally be actuated remotely. For example, when the UAV 10 initiates a takeoff sequence, the takeoff sequence may include communicating with the base station (e.g., via wireless or wired communication) so that the roof assembly 2604 may be actuated in the direction of movement (M) to the open position. Similarly, when the UAV 10 lands on the landing platform, the base station 2600 may detect the UAV 10 (or the UAV 10 may communicate with the base station 2600 that it has landed), at which point the roof assembly 2604 may be actuated in the direction of movement (M) to the closed position.

Moreover, a user may actuate the roof assembly 2604 based upon user input, such as via an external electronic device in communication with the base station 2600 and/or a user interface disposed on the base station 2600, such as the first user interface 2628. For example, the first user interface 2628 may be disposed along an exterior surface of the body 2612, such as along the first side 2622 and/or the opposing second side 2626 of the body 2612. The user may interact with the first user interface 2628 (e.g., push, contact, slide, switch, etc.) to activate movement of the roof assembly 2604.

Similarly, in certain circumstances the user may wish to manually stop actuation of the roof assembly 2604. For example, the user may wish to initiate an emergency stop of the roof assembly 2604 midway through actuation of the roof assembly 2604 between the open position and the closed position. In such a case, the user may stop movement of the roof assembly 2604 between the closed position and the open position by interacting with the first user interface 2628.

As discussed above, the base station 2600 may include one or more electrical components that are disposed within the cavity of the body 2612. The base station 2600 may further include one or more electrical components, such as one or more sensors, along an exterior of the body 2612 and/or the cover 2618. For example, as shown in FIG. 26, the roof assembly 2604 may include a rain sensor 2630 (e.g., to detect rain or a severity thereof) and a wind sensor 2632 (e.g., to detect wind or a severity thereof) coupled to an exterior surface of the cover 2618, such as along a top exterior surface of the cover 2618 so that the rain sensor 2630 and the wind sensor 2632 are located above substantially all of the base station 2600 in the elevational direction 2606. As such, the rain sensor 2630 and the wind sensor 2632 may detect rain and wind, respectively, substantially unencumbered by the base station 2600. It should be noted that type of sensor may be disposed along the exterior surface of the base station 2600. For example, the base station 2600 may include one or more contact sensors, one or more pressure sensors, one or more temperature sensors, other sensors, or a combination thereof disposed along the exterior surface of the base station 2600.

Turning back to FIG. 26, the first ear 2620 and the second ear may be coupled to the body 2612 such that the roof assembly 2604 is movable (e.g., in the direction of movement (M)) between the closed position, in which the cover 2618 is configured to enclose the landing platform and the UAV 10 supported thereon, and an open position, in which the cover is located at least partially below the landing platform (e.g., below the body 2612) with respect to the elevational direction 2606 such that the landing platform is unobstructed by the cover 2618 to facilitate takeoff and landing of the UAV 10. To facilitate such articulation of the roof assembly 2604, the base 2602 may be coupled to a stand 2634.

The stand 2634 may include one or more legs, such as the legs 2636, which may support the base 2602 and thus also support the roof assembly 2604. For example, a lower surface 2638 of the body 2612 may be supported along an upper surface 2640 of the legs 2636. The legs 2636 may substantially define a clearance height for articulation of the roof assembly 2604. That is, the legs 2636 may extend upward in the elevational direction 2606 such that the base 2602 is raised above the ground to thereby provide an area in which the roof assembly 2604 is free to articulate at least partially beneath the body 2612 (e.g., in the open position). The legs 2636 may also be coupled to one another and/or further structurally reinforced by a frame 2642. As shown in FIG. 26 the frame 2642 may extend between the legs 2636 to improve stability of the stand 2634.

To further improve operation of the base station 2600, the base station 2600 may include indicator lighting 2644 extending at least partially around a perimeter (e.g., a periphery) of the base 2602. The indicator lighting 2644 may remain unobstructed by the roof assembly 2604 when the roof assembly 2604 is in the open position and when the roof assembly 2604 is in the closed position. That is, the indicator lighting 2644 may remain unobstructed by the roof assembly 2604 before, during, and after actuation of the roof assembly 2604. As such, the indicator lighting 2644 may provide a visual indication of activity of the base station 2600. In an example, the indicator lighting 2644 may illuminate during opening and/or closing of the roof assembly 2604.

Similarly, the indicator lighting 2644 may illuminate when the UAV 10 is docked within the base station 2600, when the base station 2600 is receiving power from an external power source, when the base station 2600 is malfunctioning, or a combination thereof. Illumination herein by the indicator lighting 2644 may be considered any lighting provided by the indicator lighting 2644 in any color, pattern (e.g., rate of pulsing), intensity, or a combination thereof. The indicator lighting 2644 may also be any lighting component that may facilitate such illumination, such as, for example, an LED panel (e.g., a backlit and/or edge-lit LED panel), fluorescent lighting, LED strips, or a combination thereof. However, the indicator lighting 2644 is not limited to any particular lighting component.

Figure 27:
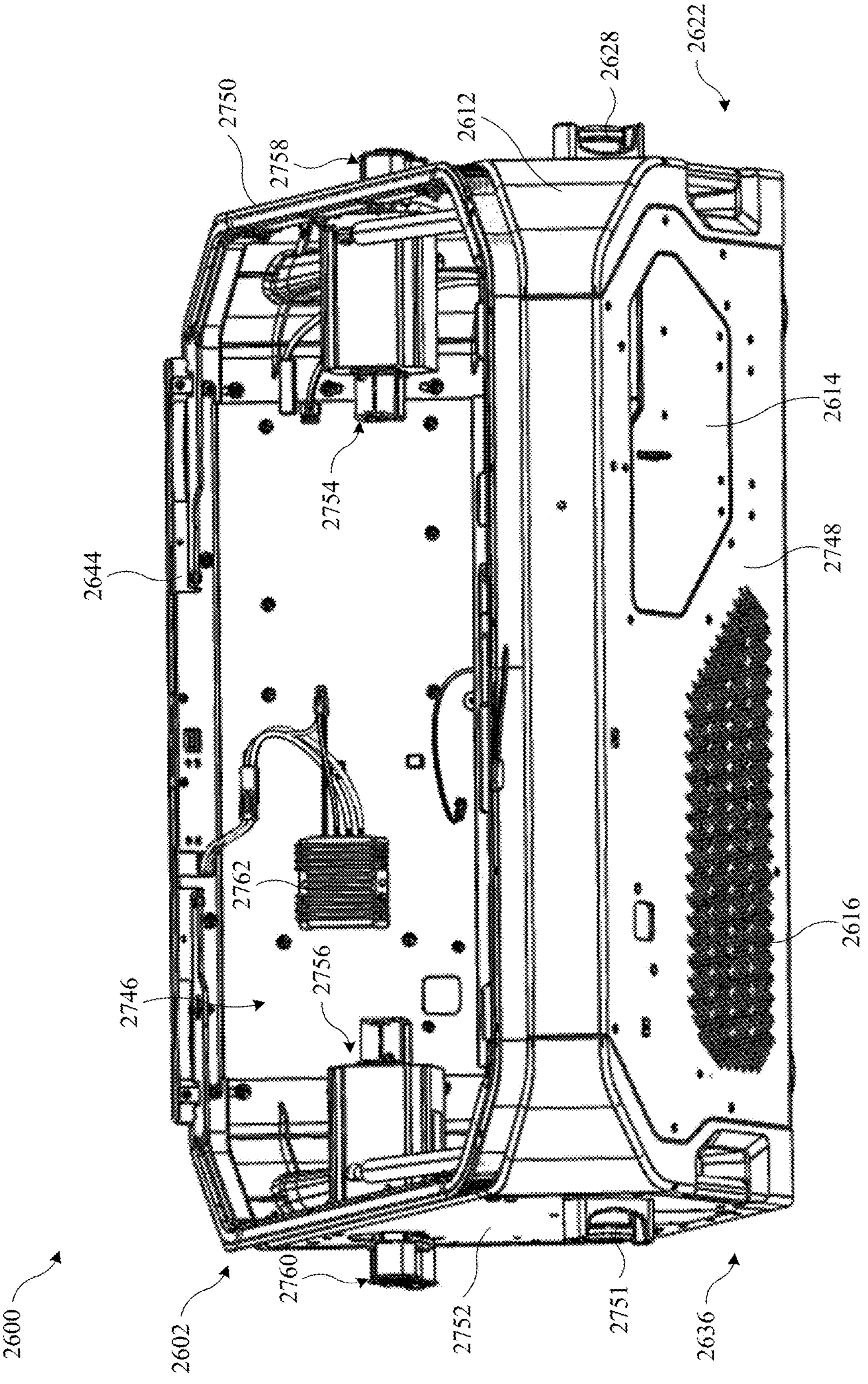
FIG. 27 is a perspective view of a base of the base station shown in FIG. 26.
Figure 28:
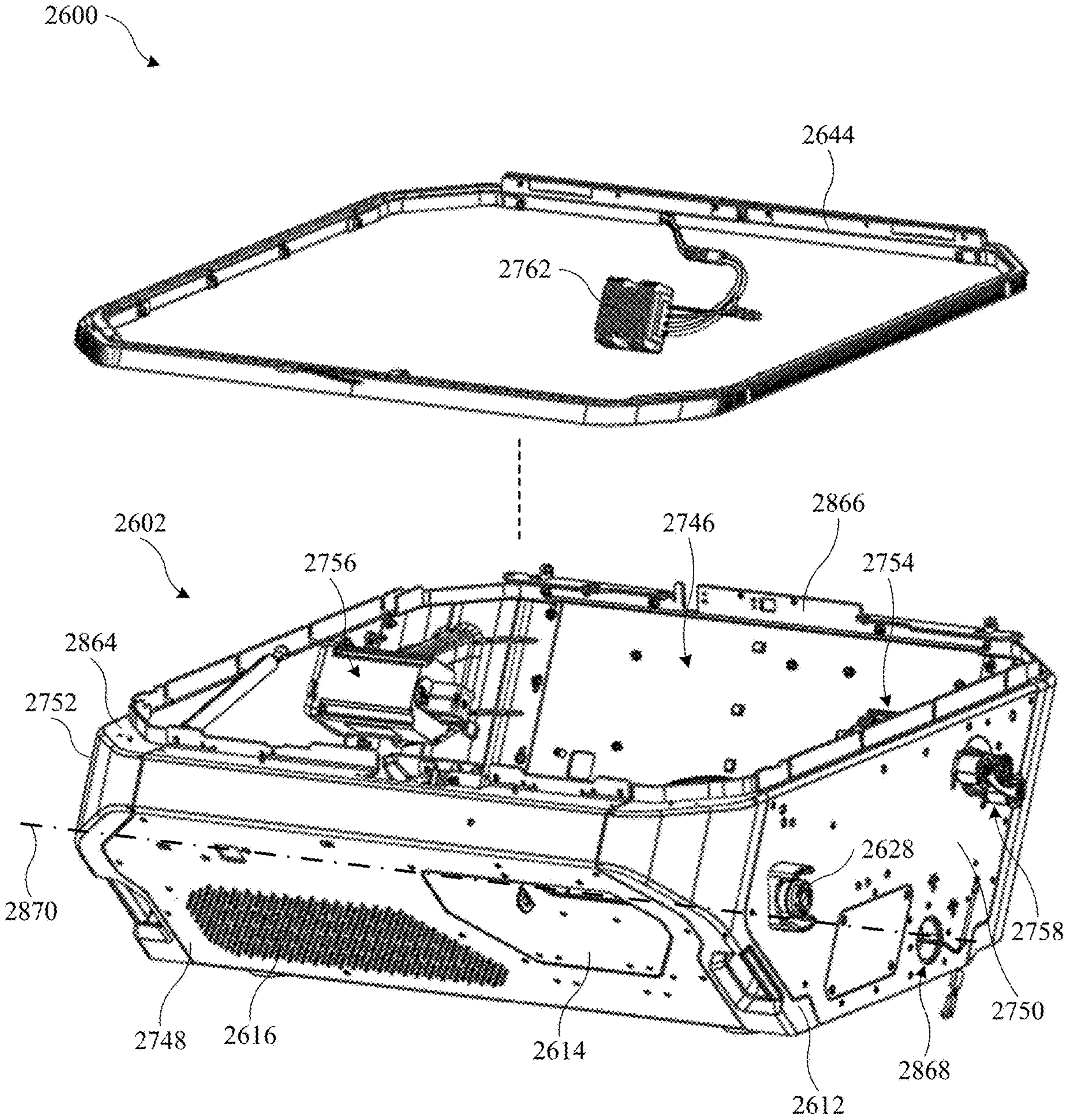
FIG. 28 is a partially exploded view of the base shown in FIG. 27.

FIG. 27 illustrates a perspective view of the base 2602 of the base station 2600. FIG. 28 illustrates a partially exploded view of the base 2602. The roof assembly 2604 and the landing platform have been removed for illustrative purposes and clarity. As discussed above, the base 2602 may include the body 2612, which may define a cavity 2746 therein. The body 2612 may form an overall housing of the body 2612 to contain one or more electrical components therein. The body 2612 may also include the access module 2614 and/or the venting 2616 to facilitate improved connectivity and operation, respectively, of the electrical system of the base station 2600. For example, the access module 2614 and the venting 2616 may be located along an exterior surface of a front panel 2748 of the body 2612. The body 2612 may further include one or more user interfaces, such as the first user interface 2628 disposed along the first side 2622 of the body 2612 (e.g., along a first side panel 2750 of the body 2612) and a second user interface 2751 disposed along the opposing second side 2626 of the body 2612 (e.g., along a second side panel 2752 of the body 2612), which may operate as described above.

As discussed above, one or more components of the base station 2600 may be disposed within the cavity 2746 of the body 2612. By way of example, at least a portion of a drive system of the roof assembly 2604 may be disposed within the cavity 2746 of the body 2612. For example, the drive system may include a first drive assembly 2754 (e.g., including a first actuator) and a second drive assembly 2756 (e.g., including a second actuator), which may both be disposed substantially within the cavity 2746 of the body 2612. The first drive assembly 2754 may be coupled to and extend at least partially through the first side panel 2750 to communicate with a first retaining mechanism 2758. Similarly, the second drive assembly 2756 may be coupled to and extend at least partially through the second side panel 2752 to communicate with a second retaining mechanism 2760. Though the roof assembly 2604 is not shown for illustrative purposes, the first retaining mechanism 2758 and the second retaining mechanism 2760 may be coupled to the first ear 2620 and the second ear of the roof assembly 2604, respectively, to move the roof assembly 2604 between the closed position and the open position. As such, the first drive assembly 2754 and the second drive assembly 2756 may move the roof assembly 2604 between the closed position, in which the roof assembly 2604 encloses the landing platform and the UAV 10 supported thereon, and the open position, in which the roof assembly 2604 exposes the landing platform to facilitate takeoff and landing of the UAV 10.

Additionally, a lighting module 2762 may also be disposed within the cavity 2746 of the body 2612. For example, the lighting module 2762 may be coupled (e.g., mounted) to an interior surface of the body 2612 and electrically connected to the indicator lighting 2644. As such, the lighting module 2762 may provide power to the indicator lighting 2644, may control one or more operations of the indicator lighting 2644 based upon a status of the base station 2600 (e.g., opening and/or closing of the roof assembly 2604), or both. As such, the lighting module 2762 may be protected within the confines of the cavity 2746 of the body 2612 and maintain electrical connection to the indicator lighting 2644.

The indicator lighting 2644 may also be coupled to the body 2612. For example, as shown in FIG. 28, the indicator lighting 2644 may be disposed along a top edge 2864 of the body 2612 and secured to the body 2612 by a peripheral bracket 2866 projecting (e.g., extending) in the elevational direction 2606 away from the top edge 2864. As such, the indicator lighting 2644 may be disposed along the top edge 2864 such that the indicator lighting 2644 remains substantially or entirely unobstructed by the roof assembly 2604 even when the roof assembly 2604 is in the closed position. Moreover, to provide sufficient indication to the user (e.g., to provide a visual indication of activity of the base station 2600), the indicator lighting 2644 may extend around substantially or entirely all of the periphery of the body 2612—and thus the base 2602—as defined by the top edge 2864 of the body 2612.

As discussed above, the first drive assembly 2754 and the second drive assembly 2756 may facilitate actuation of the roof assembly 2604. The drive assemblies, in conjunction with the roof assembly 2604, may define the angular range of motion of the roof assembly 2604 when moving between the open position and the closed position. Additionally, to ensure proper rotation of the roof assembly 2604 with respect to the base 2602, the first side panel 2750 and the second side panel 2752 may each define a pivot opening, such as the pivot opening 2868 of the first side panel 2750 shown in FIG. 28.

The pivot opening 2868 of the first side panel 2750 and the second side panel 2752 may facilitate pivotal engagement between the roof assembly 2604 and the body 2612. As discussed further below, the first ear 2620 of the roof assembly 2604 may be movably coupled to the first side 2622 of the body 2612 by a first pivot shaft projecting from the first ear 2620 into the pivot opening 2868 of the first side panel 2750. Additionally, the second ear of the roof assembly 2604 may be movably coupled to the opposing second side 2626 of the body 2612 by a second pivot shaft projecting from the second ear into the pivot opening 2868 of the second side panel 2752. The first pivot shaft and the second pivot may be coaxial along an axis of rotation 2870 of the roof assembly 2604. As such, the pivot opening 2868 of the first side panel 2750 and the second side panel 2752 may define the axis of rotation 2870 of the roof assembly 2604 to move in the direction of movement (M) between the open position and the closed position.

Figure 29:
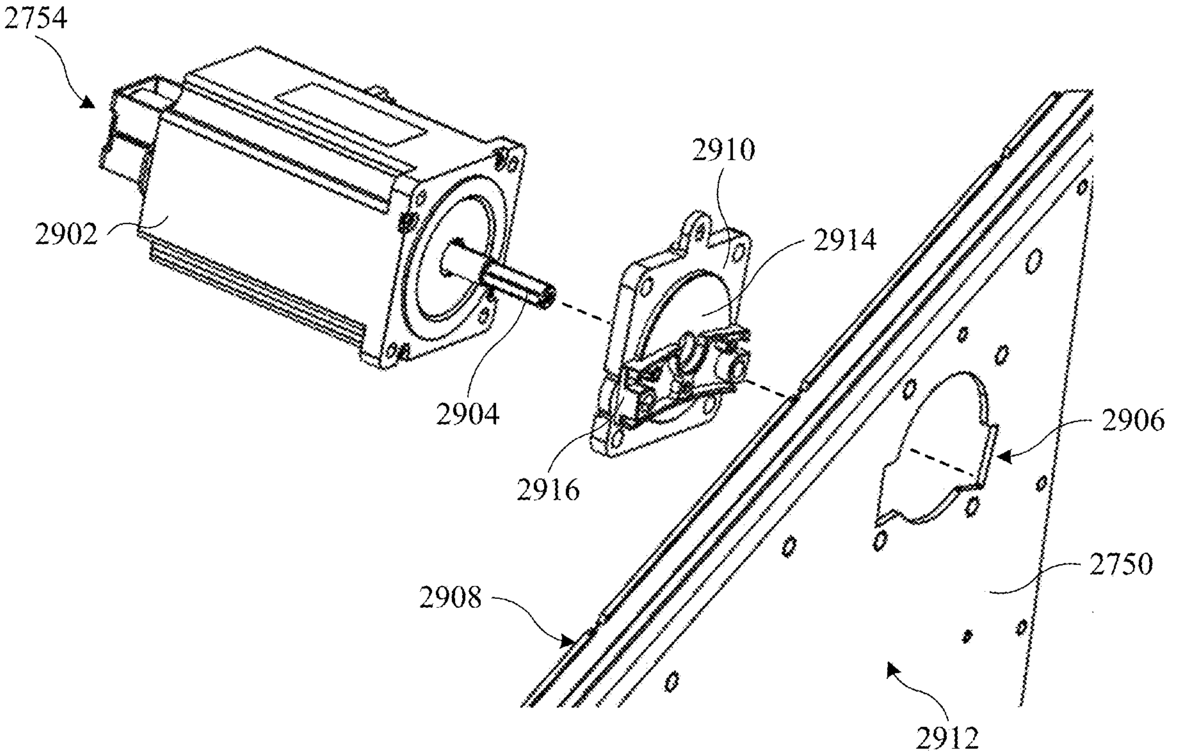
FIG. 29 is a partially exploded view of an actuator assembly of the base station shown in FIG. 26.

FIG. 29 illustrates a partially exploded view of the first drive assembly 2754 of the base station 2600 shown in FIGS. 27 and 28. The second drive assembly 2756 may be similar to the first drive assembly 2754. That is, the description of the first drive assembly 2754 herein may be equally describe the second drive assembly 2756 unless otherwise stated. As discussed above, the first drive assembly 2754 may be coupled to the first side panel 2750 of the body 2612 of the base 2602. The first drive assembly 2754 may also extend at least partially through the first side panel 2750 to communicate with the first retaining mechanism 2758 and thereby articulate the roof assembly 2604 with respect to the base 2602.

The first drive assembly 2754 may include an actuator 2902 that is configured to actuate (e.g., rotate) a drive shaft 2904 of the actuator 2902. The actuator 2902 may be coupled to the first side panel 2750 such that the drive shaft 2904 may extend through an actuator opening 2906 defined by the first side panel 2750. By way of example, the actuator 2902 may be coupled to an interior surface 2908 of the first side panel 2750 by a mounting bracket 2910 such that the drive shaft 2904 extends through the actuator opening 2906 to engage the first retaining mechanism 2758, which may be located adjacent to an exterior surface 2912 of the first side panel 2750 (e.g., external to the cavity 2746 of the body 2612).

The mounting bracket 2910 may include a protruding portion 2914 and a connector 2916. The connector 2916 may formed with (e.g., integrally formed with) or coupled to the protruding portion 2914 such that connector 2916 may at least partially extend through actuator opening 2906 to engage the first retaining mechanism 2758. For example, the protruding portion 2914 may protrude from a surface of the mounting bracket 2910 and may be keyed to a shape of the actuator opening 2906 such that, when the protruding portion is received by the actuator opening 2906, the mounting bracket 2910 and thus the actuator 2902 are prevented from unwanted rotation relative to the body 2612. As such, when the mounting bracket 2910 is coupled to the first side panel 2750, the protruding portion 2914 and the connector 2916 may extend into 2906 and/or at least partially through the actuator opening 2906. The drive shaft 2904 may then extend through the mounting bracket 2910 (e.g., an opening therein) and the actuator opening 2906 to communicate with the first retaining mechanism 2758.

Figure 30:
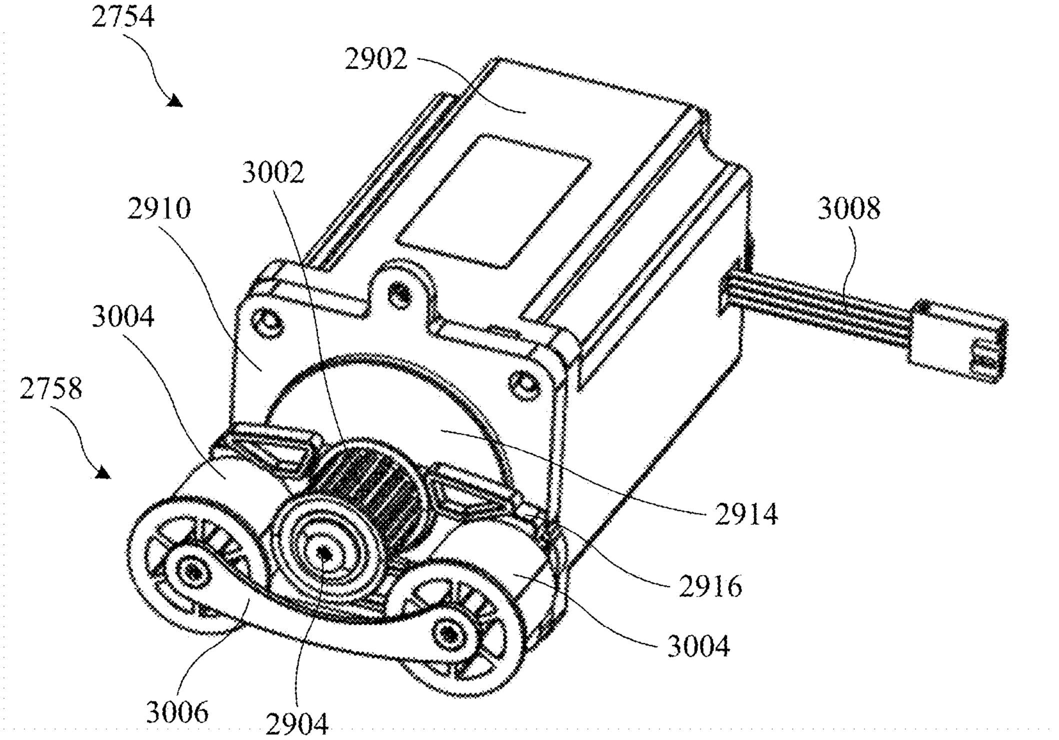
FIG. 30 is a perspective view of the actuator assembly shown in FIG. 29.

FIG. 30 illustrates a perspective view of the first drive assembly 2754 in communication with the first retaining mechanism 2758. As shown in FIG. 30, the drive shaft 2904 of the first drive assembly 2754 may extend through the mounting bracket 2910 to communicate with the first retaining mechanism 2758. In particular, the drive shaft 2904 may be coupled to a gear 3002 such that the drive shaft 2904 may rotate the gear 3002 about an axis of rotation of the drive shaft 2904. As discussed further below, the gear 3002 may be configured to mesh with a belt of the drive system of the roof assembly 2604 such that, based upon rotation of the gear 3002, the belt may be translated along the gear 3002 to drive the roof assembly 2604 between the open and closed positions. The actuator 2902 may be powered by an external power source connected to the actuator 2902 via wiring 3008 therebetween.

The first retaining mechanism 2758 may be mounted to the connector 2916 of the mounting bracket 2910. For example, the first retaining mechanism 2758 may include one or more bushings, such as the bushings 3004, which may be rotatably coupled to the connector 2916 and coupled to one another via a strap 3006. The bushings 3004 may be positioned on opposing sides of the gear 3002 such that the belt of the drive system may be routed around the gear 3002 and between the bushings 3004 (see FIGS. 35A and 35B below). As such, the bushings 3004, at least in part due to the strap 3006, may maintain a desired tension of the belt to ensure that the belt remains engaged (e.g., meshed) with the gear 3002 and thus ensure proper actuation of the roof assembly 2604.

Figure 31:
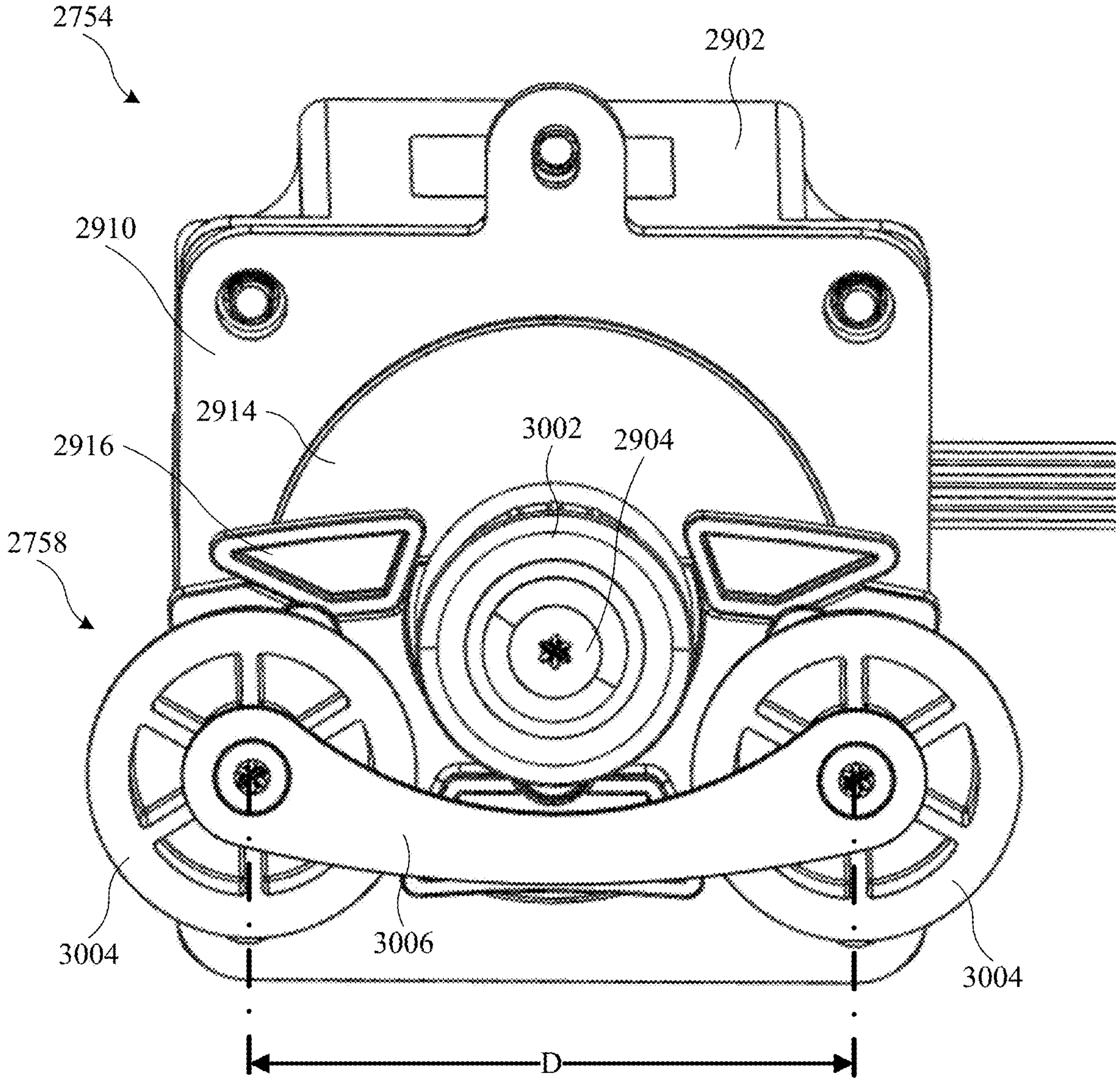
FIG. 31 is a front view of the actuator assembly shown in FIG. 29.

FIG. 31 illustrates a front view of the first drive assembly 2754 in communication with the first retaining mechanism 2758. As discussed above, the bushings 3004 may maintain the desired tension of the belt to ensure that the belt remains engaged with the gear 3002 of the actuator 2902 to thereby ensure proper actuation of the roof assembly 2604. To maintain such tension, the strap 3006 may extend between, and be coupled to the bushings 3004. The strap 3006 may be compliant or otherwise flexible (e.g., elastic) to facilitate a desired amount of lateral movement of the bushings 3004 relative to each other.

In particular, a distance (D) between the bushings 3004 may be tuned (e.g., adjusted) to adjust the tension on the belt of the drive system. For example, the bushings 3004 may move laterally relative to one another along the connector 2916 (e.g., within slots or channels of the connector 2916) such that the distance (D) between the bushings 3004 may be increased or decreased. As a result, the tension of the belt, which may be at least partially determined by contact on the belt by the bushings 3004, may be increased or decreased. For example, when the distance (D) between the bushings 3004 is decreased, the belt may be pushed towards the gear 3002 with a greater force to ensure proper meshing between the gear 3002 and the belt. Conversely, when the distance (D) between the bushings 3004 is increased, the belt may be pushed towards the gear with a lesser force to facilitate easier movement of the belt along the gear 3002. Thus, operation of the roof assembly 2604 may be tuned based upon a desired fluidity of movement.

Furthermore, the strap 3006 may define a maximum distance (D) between the bushings 3004 to further ensure that the belt remains meshed with the gear 3002. For example, the strap 3006 may exhibit some slack between the bushings 3004 or may otherwise be compliant such that, when the drive shaft 2904 drives the gear 3002 to advance the belt along the gear 3002, bushings 3004 may be able to move towards and away from one another to facilitate smother articulation of the roof assembly 2604. However, the strap 3006 may be tuned (e.g., based on material properties and/or dimensions) to ensure that the bushings 3004 are only free to move away from one another a desired maximum distance (D) to ensure that the belt does not disengage the gear 3002.

Figure 32A:
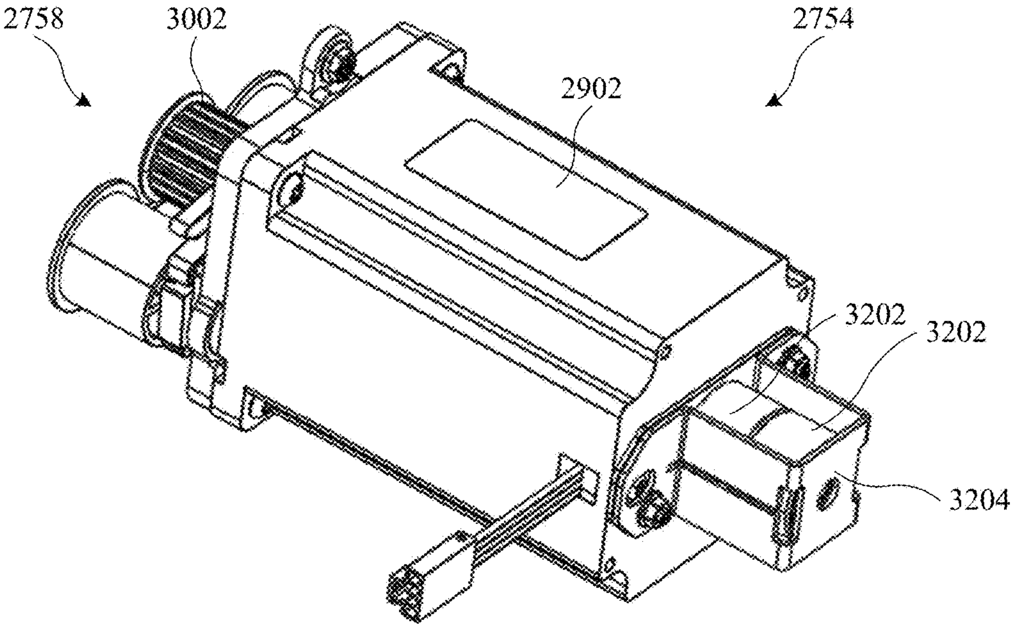
FIG. 32A is a rear perspective view of the actuator assembly shown in FIG. 29.
Figure 32B:
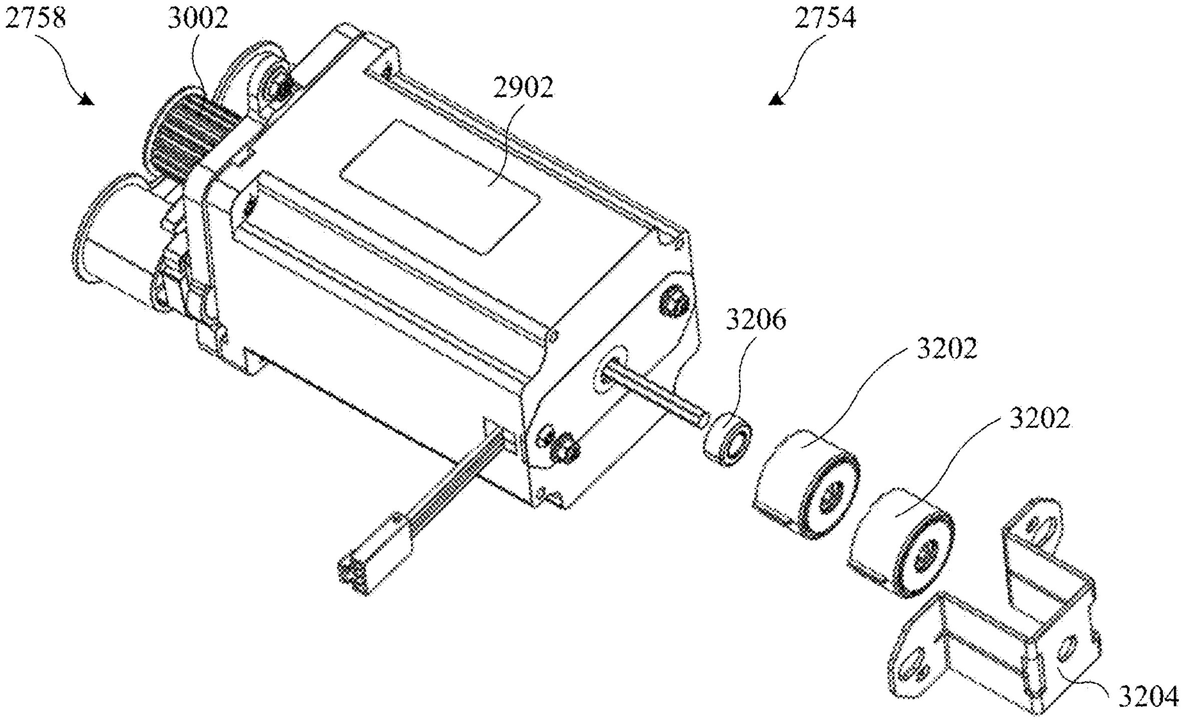
FIG. 32B is a front perspective view of the actuator assembly shown in FIG. 32A.

FIG. 32A illustrates a rear perspective view of the first drive assembly 2754 in communication with the first retaining mechanism 2758. FIG. 32B illustrates a partially exploded view of the first drive assembly 2754 shown in FIG. 32A. As discussed above, the gear 3002 of the actuator 2902 may be driven (e.g., rotated) by the drive shaft 2904 to engage and advance a belt of the drive system of the roof assembly 2604 to thereby actuator the roof assembly 2604 between the open position and the closed position.

During such operation, a user may need to stop the roof assembly 2604 during mid-operation in a position somewhere between the open position and the closed position. As a result, a weight of the roof assembly 2604 may naturally result in the roof assembly 2604 quickly moving to the open position or the closed position, depending on the position of the roof assembly 2604 during stoppage. That is, when the user initiates an emergency stop of the roof assembly 2604 during actuation (e.g., via the first user interface 2628 of the base 2602), the drive shaft 2904 may be free to rotate without resistance from the actuator 2902. As such, damage to the roof assembly 2604 may occur if the roof assembly 2604 quick moves to the open position or the closed position (e.g., "slams" closed).

To combat such concerns, the first drive assembly 2754 may include one or more counterweights, such as the counterweights 3202, coupled to the actuator 2902 by a counterweight bracket 3204. Any number of counterweights 3202 may be possible based upon a size and/or weight of the roof assembly 2604. As shown in FIGS. 32A and 32B, the counterweights 3202 may be coupled to the drive shaft 2904 at an opposing end of the drive shaft 2904 from the gear 3002. A gasket 3206 (e.g., O-ring, rubber seal, etc.) may be disposed between the counterweights 3202 and the actuator 2902 to seal an opening or gap therebetween. Based upon the position of the counterweights 3202, if an emergency stop is initiated, the counterweights 3202 may significantly slow down movement of the roof assembly 2604 towards the open position or the closed position when the drive shaft 2904 is free to rotate without resistance from the actuator 2902. As a result, damage to the roof assembly 2604 may be prevented during emergency stoppage.

Figure 33:
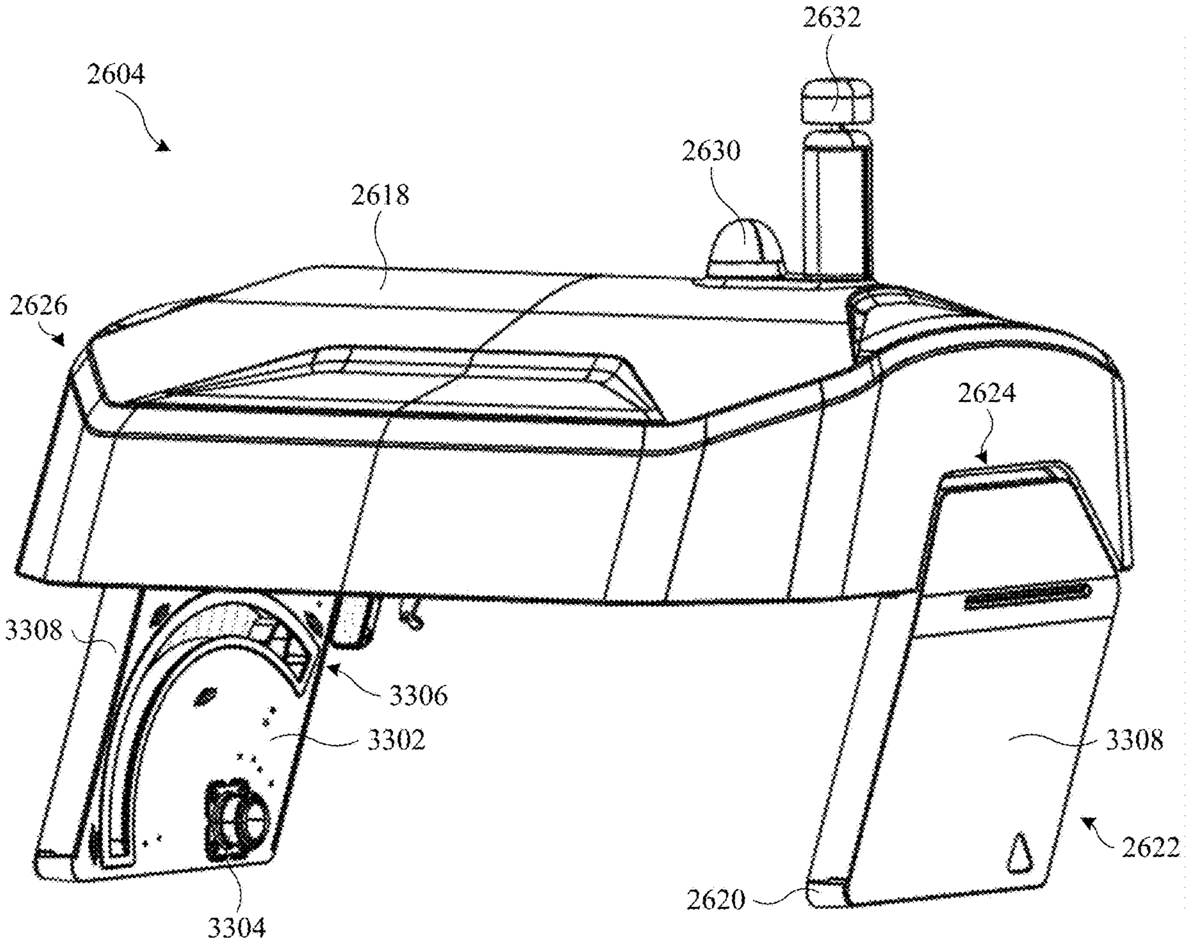
FIG. 33 is a perspective view of a roof assembly of the base station shown in FIG. 26.

FIG. 33 illustrates a perspective view of the roof assembly 2604 of the base station 2600. As discussed above, the roof assembly 2604 may include the cover 2618, which may include the rain sensor 2630 and the wind sensor 2632 disposed thereon. The roof assembly 2604 may also include one or more ears, such as the first ear 2620 and the second ear 3302, which may be coupled to the cover 2618 and movably coupled to the body 2612 of the base 2602 such that the roof assembly 2604 is movable between the open position and the closed position.

As shown in FIG. 33, the first ear 2620 may extend downward from the cover 2618 (e.g., downward from the groove 2624 of the cover 2618 located along the first side 2622 of the cover 2618) with respect to the elevational direction 2606 such that the first ear 2620 may be coupled to the first side 2622 of the base 2602 (e.g., the first side 2622 of the body 2612) via a pivot shaft of the first ear 2620, which may be similar to the pivot shaft 3304 of the second ear 3302. Similarly, the second ear 3302 may extend downward from the cover 2618 (e.g., downward from the groove 2624 of the cover 2618 located along the second side 2626 of the cover 2618) with respect to the elevational direction 2606 such that the second ear 3302 may be coupled to the opposing second side 2626 of the base 2602 (e.g., the second side 2626 of the body 2612) via the pivot shaft 3304 of the second ear 3302. As discussed about the pivot shaft 3304 of the first ear 2620 may be received by the pivot opening 2868 of the first side panel 2750 of the body 2612 and the pivot shaft 3304 of the second ear 3302 may be received by the pivot opening 2868 of the second side panel 2752 to define the axis of rotation 2870 of the roof assembly 2604.

Based on the above, the roof assembly 2604, when actuated by the first drive assembly 2754 and the second drive assembly 2756, may rotate about the axis of rotation 2870 defined by the pivot shaft 3304 of the first ear 2620 and the pivot shaft 3304 of the second ear 3302. Additionally, the first ear 2620 and the second ear 3302 may each include a track, such as the track 3306 of the second ear 3302 shown in FIG. 33. The track 3306 of the first ear 2620 may be complementary in shape to the track 3306 of the second ear 3302 such that the tracks may guide movement of the roof assembly 2604 between the open position and the closed position. That is, the actuator assemblies may, in conjunction with the belt and the retaining mechanism, be guided along a respective one of the tracks (e.g., the track 3306 of the first ear 2620 or the track 3306 of the second ear 3302). Additionally, to protect such operation from external moisture and/or debris, the first ear 2620 and the second ear 3302 may each include a cover panel 3308. As such, the track 3306 and the pivot shaft 3304 of each of the ears may be at least partially contained and/or enclosed by the cover panel 3308.

Figure 34:
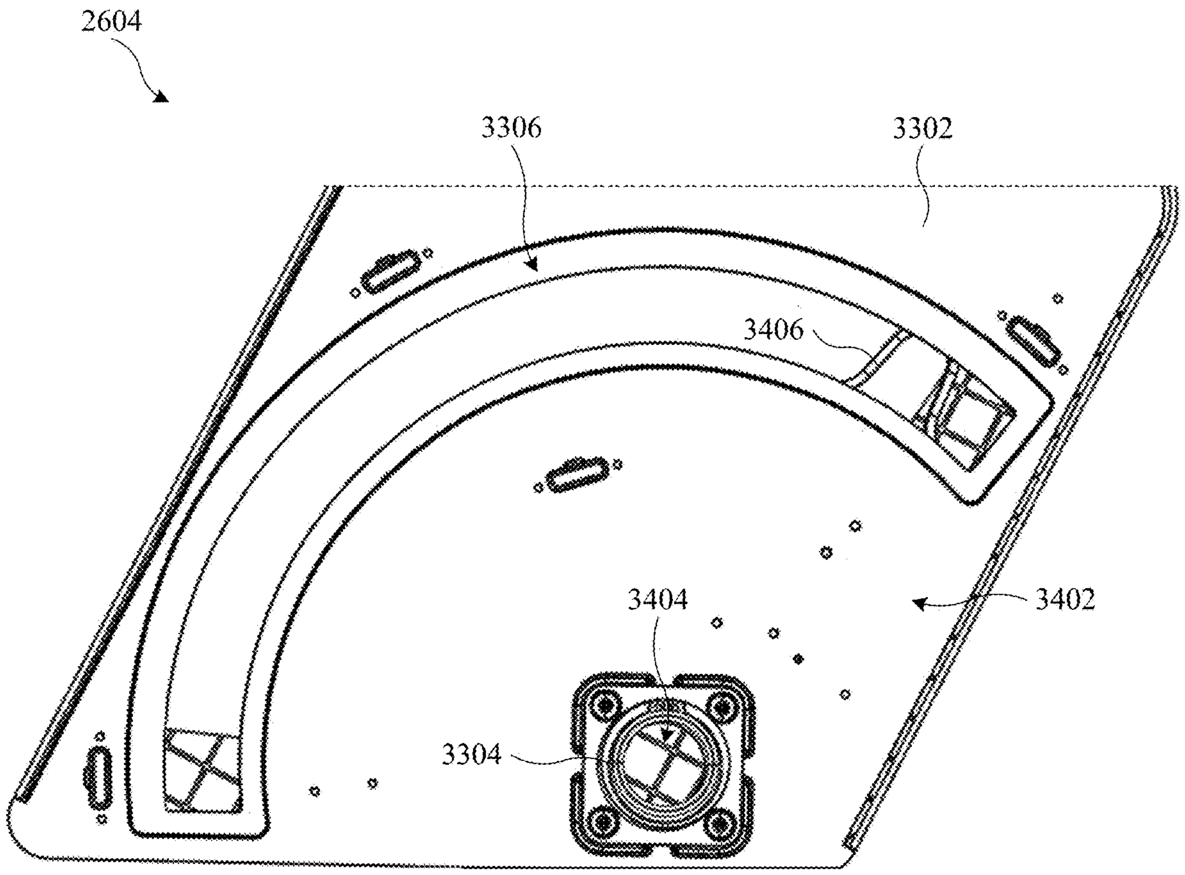
FIG. 34 is a close-up view of an ear of the roof assembly shown in FIG. 33.

FIG. 34 illustrates a close-up view of the second ear 3302 of the roof assembly 2604 shown in FIG. 33. The description herein of the second ear 3302 may also be equally applicably to the first ear 2620. That is, the first ear 2620 and the second ear 3302 may be similar unless otherwise stated. As discussed above, the second ear 3302 may define the track 3306. The second ear 3302 may further include the pivot shaft 3304 projecting from an inwardly facing surface 3402 of the second ear 3302 such that the pivot shaft 3304 may engage a respective pivot opening 2868 of the body 2612.

Additionally, as shown in FIG. 34, the pivot shaft 3304 of the second ear 3302 may define an opening 3404 therein. In particular, with respect to the base station 2600, the pivot shaft 3304 of the first ear 2620 (i.e., a first pivot shaft) and the pivot shaft 3304 of the second ear 3302 (i.e., a second pivot shaft) may each define an opening similar to the opening 3404. As such, wiring of the base station 2600 may be routed through one or more of the opening 3404 of the first pivot shaft or the opening 3404 of the second pivot shaft to electrically connect the base 2602 to the roof assembly 2604. As such, the roof assembly 2604 may rotate about the pivot shafts without shearing or otherwise damaging wiring extending through the opening 3404 of the pivot shafts.

The track 3306 of the second ear 3302 (and thus the first ear 2620) may be any size and/or shape to define the desired travel path of the roof assembly 2604 about the axis of rotation 2870. For example, as shown in FIG. 34, the track 3306 may be substantially arcuate and may at least partially surround the pivot shaft 3304 of the second ear 3302. Additionally, the track 3306 may extend through the second ear 3302 such that the belt 3406 of the drive system may communicate with the second drive assembly 2756 through the track 3306.

Figure 35A:
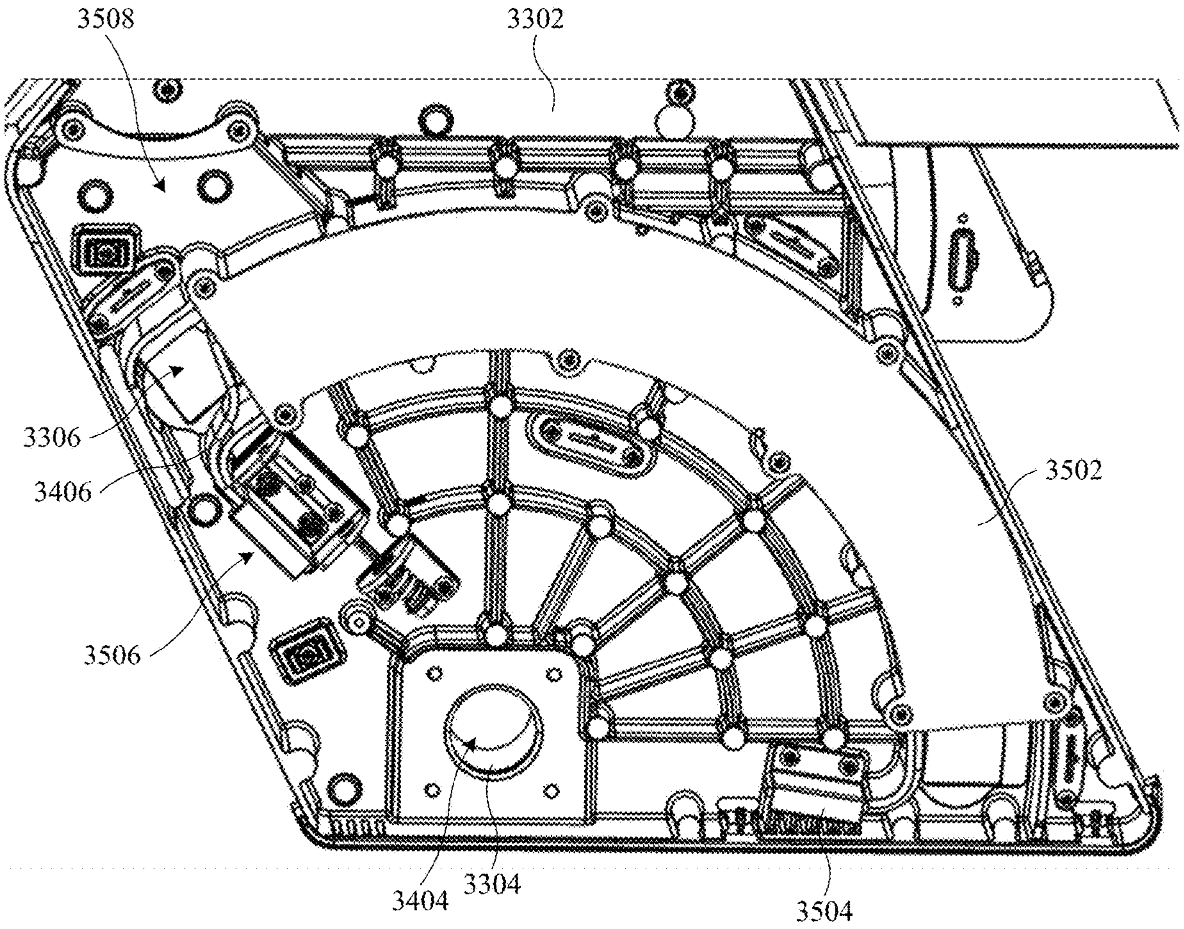
FIG. 35A is another close-up view of the ear shown in FIG. 34.
Figure 35B:
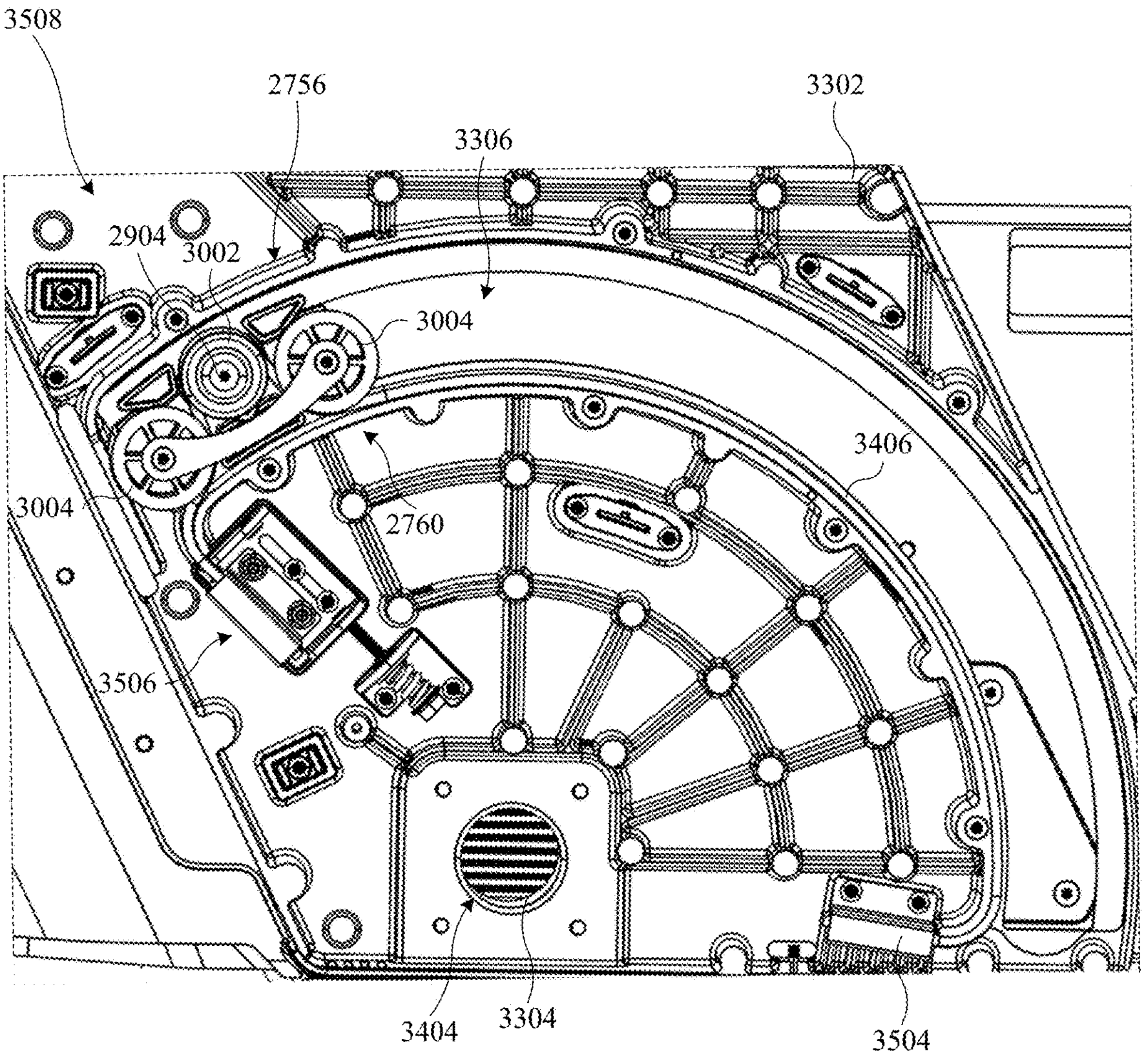
FIG. 35B is the close-up view of FIG. 35A with a track cover removed.

FIG. 35A illustrates another close-up view of the second ear 3302 with the cover panel 3308 removed. FIG. 35B illustrates the second ear 3302 shown in FIG. 35A with a track cover 3502 removed. The track cover 3502 may be configured to at least partially enclose the track 3306 within the second ear 3302 and/or maintain a position of the belt 3406 within the track 3306.

As discussed above, the second drive assembly 2756 may communicate with the second retaining mechanism 2760 to actuate the roof assembly 2604. In particular, as shown in FIG. 35B, the belt 3406 may be routed through the bushings 3004 and around the gear 3002 to mesh with the gear 3002 (e.g., grooves or teeth of the belt 3406 may mesh with teeth of the gear 3002) such that, when the drive shaft 2904 is rotated to thereby rotate the gear 3002, the rotational movement of the gear 3002 may advance (e.g., translate) the belt 3406 along the gear 3002 to guide rotation of the roof assembly 2604 along the track 3306.

To facilitate the above movement, the belt 3406 may be fixedly connect to the second ear 3302 via a belt bracket 3504 at a first end of the belt 3406. The belt 3406 may be routed through the track 3306, such as along a peripheral edge of the track 3306, routed through the bushings 3004 and around the gear 3002, and secured to a belt tensioner 3506 at an opposing second end of the belt 3406. As such, the belt 3406 may extend between, and be coupled to, the belt tensioner 3506 and the belt bracket 3504 to maintain a position and tension of the belt 3406 to facilitate translation of the belt 3406 relative to the gear 3002.

Additionally, it should be noted that the belt bracket 3504, the belt tensioner 3506, and the second retaining mechanism 2760 (or a portion thereof), may be contained within a cavity 3508 defined by the second ear 3302. The cavity 3508 may be enclosed by the cover panel 3308 such that the aforementioned components may be protected by moisture and/or debris, which may negatively impact operation of the drive system of the roof assembly 2604.

Figure 36:
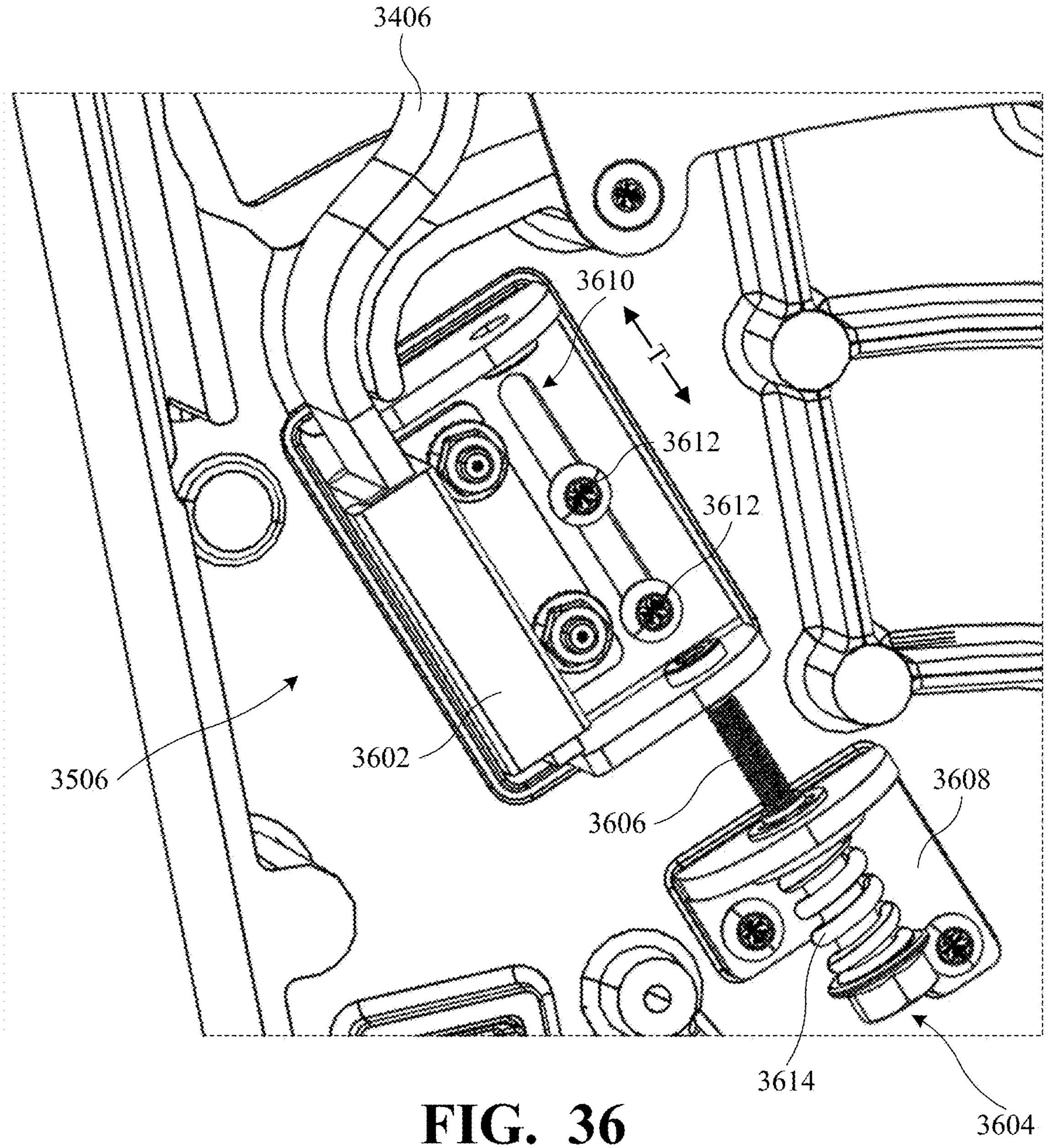
FIG. 36 is a close-up view of a belt tension shown in FIG. 35B.

FIG. 36 illustrates a close-up view of the belt tensioner 3506 shown in FIG. 35B. As discussed above, an end of the belt 3406 may be coupled to the belt tensioner 3506. For example, the end of the belt 3406 may be fixedly coupled to a tensioner bracket 3602 to maintain a position of the belt 3406 in conjunction with the belt bracket 3504. The tensioner bracket 3602 may be movable in a direction (T) towards and away from the track 3306 to adjust a tension of the belt 3406. That is, the tensioner bracket 3602 may be translated away from the belt 3406 in the direction (T) to increase the tension of the belt 3406. Conversely, the tensioner bracket 3602 may be translated towards the belt 3406 in the direction (T) to decrease the tension of the belt 3406. As such, since the belt 3406 is fixed to the tensioner bracket 3602, the tension of the belt 3406 may be adjusted by moving the tensioner bracket to ensure proper actuation of the roof assembly 2604.

To move the tensioner bracket 3602 in the direction (T), the tensioner bracket 3602 may be in communication with a tensioner 3604. The tensioner 3604 may be in communication with a fastener 3606 (e.g., a threaded fastener) or may be the fastener 3606. The tensioner 3604 may be rotated or otherwise advanced to move the tensioner bracket 3602. For example, the fastener 3606 may be coupled to the tensioner bracket 3602 such that advancing the tensioner 3604 towards the tensioner bracket 3602 may cause the tensioner bracket 3602 to move in the direction (T) towards the belt 3406, and advancing the fastener 3606 away from the tensioner bracket 3602 may cause the tensioner bracket 3602 to move in the direction (T) away from the belt 3406. As such, at least a portion of the tensioner 3604, such as a fixed plate 3608 of the tensioner 3604, may remain stationary. Moreover, the tensioner bracket 3602 may define a slot 3610 therein that may guide the tensioner bracket 3602 in the direction (T), such as along one or more fasteners 3612. Furthermore, to maintain the tension on the belt 3406, the tensioner may also include a biasing member 3614 (e.g., a spring, coil, compressible member, etc.) to bias the tensioner 3604 away from the tensioner bracket 3602.

Figure 37:
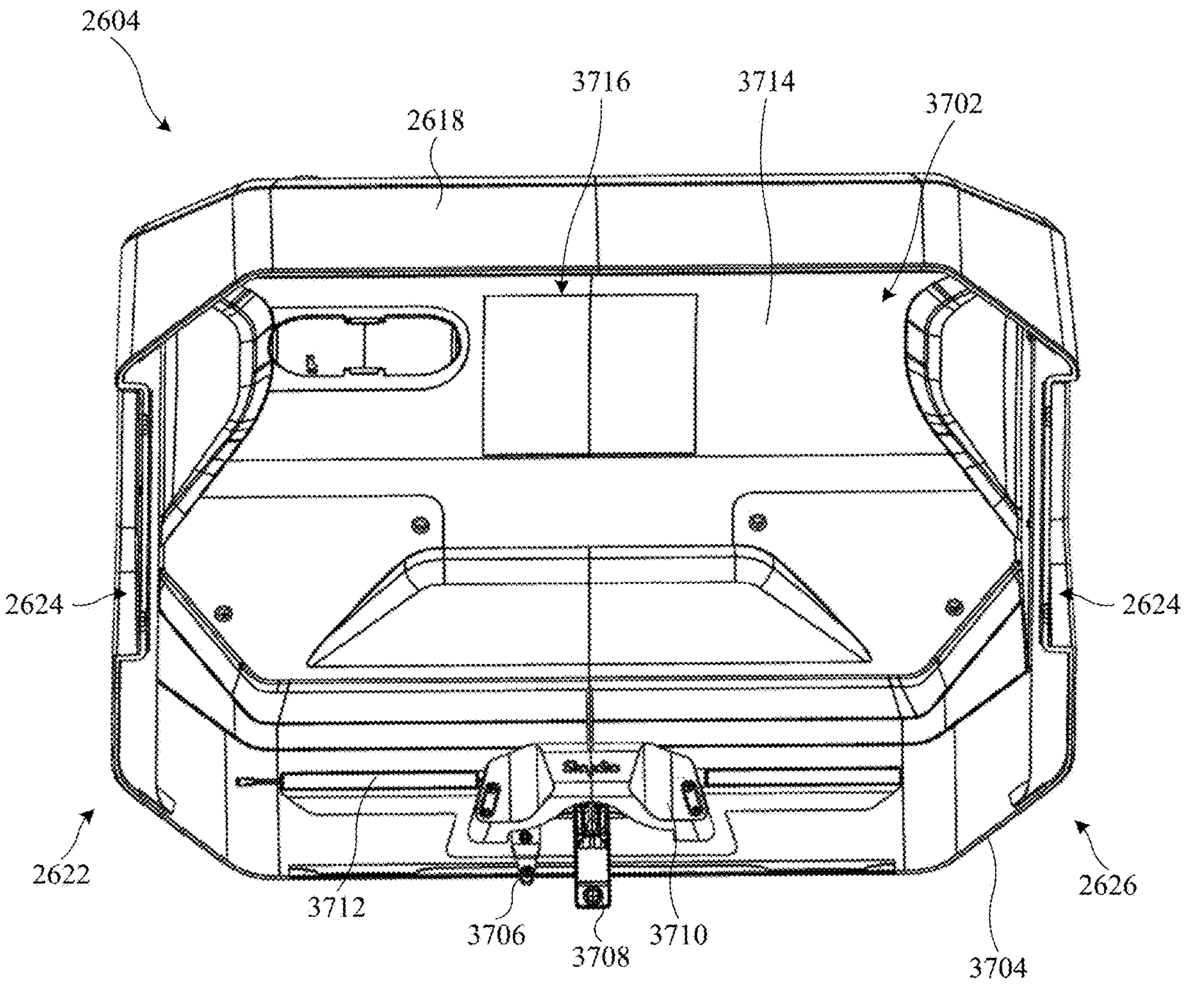
FIG. 37 is a perspective view of the roof assembly shown in FIG. 33 illustrating an interior of a cover of the roof assembly.
Figure 38:
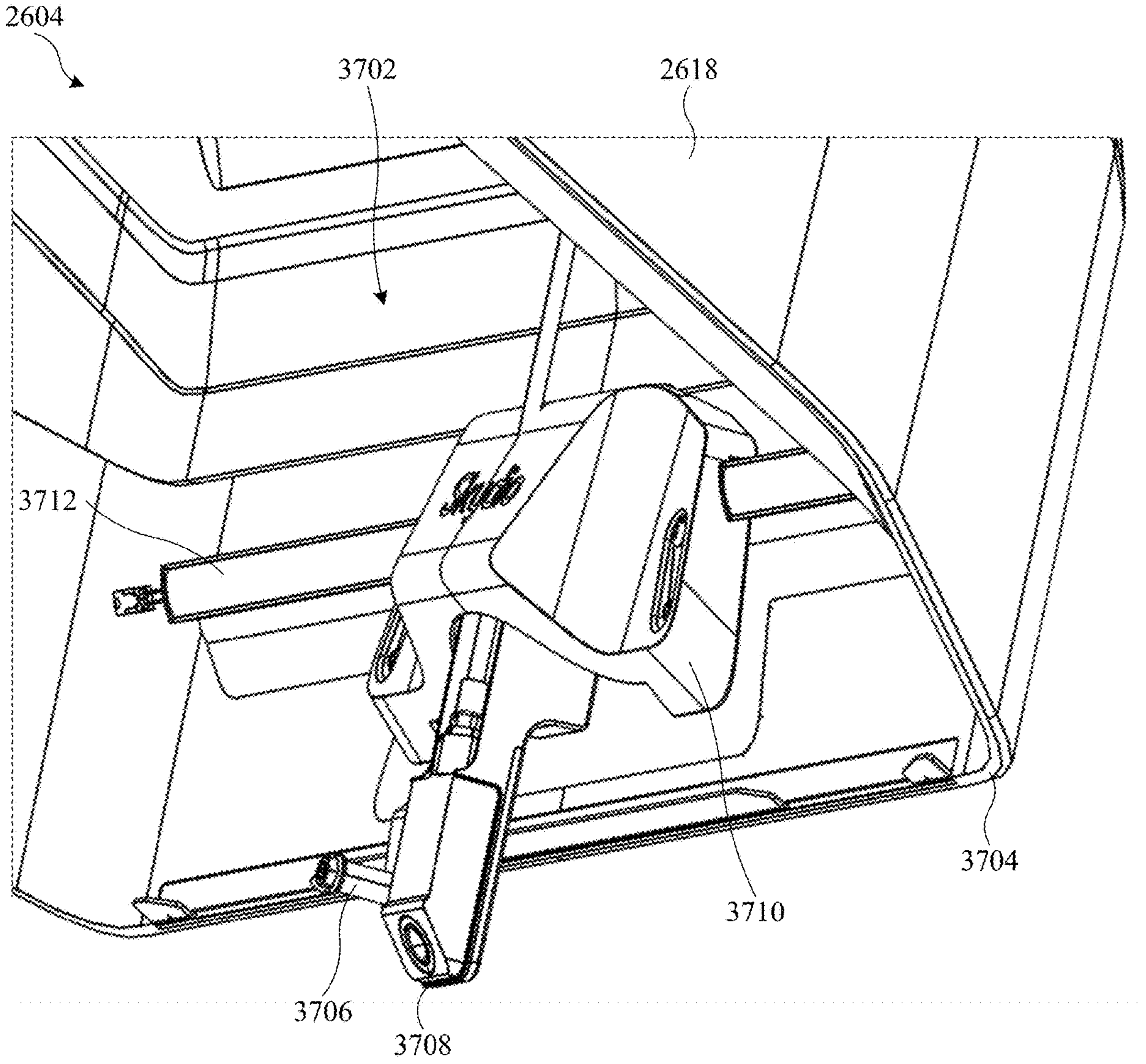
FIG. 38 is a close-up view of the roof assembly shown in FIG. 37.

FIG. 37 illustrates a perspective view of the roof assembly 2604 to further illustrate an interior of the cover 2618. FIG. 38 illustrates a close-up view of the roof assembly 2604 shown in FIG. 37. The first ear 2620 and the second ear 3302 have been removed for illustrative purposes. As discussed above, the first ear 2620 and the second ear 3302 may be coupled to the cover 2618 within the groove 2624 of the first side 2622 and the groove 2624 of the opposing second side 2626 of the cover 2618, respectively.

Similar to the body 2612 of the base 2602, the cover 2618 may define a cavity 3702 therein, which may store one or more components of the base station 2600. The cavity 3702 may also be adapted to at least partially enclose the base 2602 (e.g., the landing platform of the base 2602 support by the body 2612) and/or the UAV 10 when docked. By way of example, when the roof assembly 2604 is located in the closed position, at least a portion of the UAV 10 docked on the landing platform may be contained within the cavity 3702 of the cover 2618. For example, a mounting edge 3704 of the cover 2618 (e.g., a bottom edge of the cover 2618 with respect to the elevational direction 2606) may be configured to abut the top edge 2864 of the body 2612 and/or an upper surface of the indicator lighting 2644 to substantially enclose the base 2602 and contain the UAV 10 therein. The cover 2618 may further include a latch 3706 positioned adjacent to the mounting edge 3704, which may engage a portion of the body 2612 to lock the cover 2618 to the body 2612 when the roof assembly 2604 is in the closed position.

The roof assembly 2604 may also include a camera 3708 coupled to the cover 2618 and at least partially disposed within the cavity 3702 of the cover. For example, the camera 3708 may be secured to an interior wall of the cover 2618 such that at least a portion of the camera (e.g., a body of the camera) may extend into the cavity 3702 and be coupled to the interior wall by a camera bracket 3710. It should be noted that the camera 3708 is not limited to any particular type of camera and may be any camera that may capture images and/or video (e.g., live feed video) of a surrounding area. For example, based upon the position of the camera 3708 along the cover 2618, the camera 3708 may be positioned such that a field of view of the camera 3708 may monitor the landing platform—and thus also the UAV 10—when the roof assembly 2604 is in the closed position. Similarly, the camera 3708 may extend above the landing platform (e.g., above the top of the base 2602) in the elevation direction 2606 when the roof assembly 2604 is in the closed position such that the field of view of the camera 3708 maintains monitoring of the landing platform—and thus also the UAV 10. As such, the landing platform may be configured to be positioned within the field of view of the camera 3708 when the roof assembly 2604 is in the closed position and the open position. Thus, the camera 3708 may be coupled to the cover 2618 such that the camera 3708 may be enclosed by the base 2602 and the cover 2618 when the roof assembly 2604 is in the closed position.

The roof assembly 2604 may also include a light 3712 located within the cavity 3702 of the cover 2618. For example, the light 3712 may be located adjacent to the camera 3708 and contained within the cavity 3702 of the cover 2618 such that the light 3712 may illuminate the field of view of the camera 3708 (e.g., to illuminate the landing platform and the cavity 3702 of the cover 2618). The light 3712 may be adapted to illuminate a surrounding area based upon activity of the base station 2600 and/or the UAV 10. For example, the light 3712 may be adapted to illuminate the landing platform when the UAV 10 initiates a takeoff sequence and/or a landing sequence. Similarly, the light 3712 may illuminate the surrounding area when the roof assembly 2604 moves from the closed position to the open position, or vice versa. As such, the light 3712 may be any type of light, such as an LED panel and/or an LED strip.

As discussed above, the roof assembly 2604 may enclose the UAV 10 when the UAV 10 is docked on the landing platform and the roof assembly 2604 is in the closed position. In such a case, the user may need to wirelessly communicate with the UAV 10 while maintaining the closed position of the roof assembly 2604. For example, in circumstances where the user (e.g., the operator) is remotely located and communicating with the UAV 10 using wireless communication between the UAV 10 and an external electronic device, the user may be unable to physically access the UAV 10 to obtain data, a status of the UAV 10 (e.g., power charge), or other information pertaining to the UAV 10. As such, it may be necessary to ensure that the roof assembly 2604 does not inhibit (e.g., interfere) with the wireless communication between the UAV 10 and the external electronic device when the roof assembly 2604 is in the closed position.

To facilitate such wireless communication, the cover 2618 may include a cover panel 3714 disposed within the cavity 3702 of the cover 2618 such that a heating element, as discussed further below, is located between the interior surface of the cover 2618 and the cover panel 3714. The cover panel 3714 and the heating element may define a cutout 3716 therein that is configured to facilitate the wireless communication between the UAV 10 located on the landing platform and the external electronic device when the roof assembly 2604 is in the closed position. That is, the cover panel 3714 and/or the heating element may interfere with wireless communication between the UAV 10 and the external electronic device. As such, the cutout 3716 may form a void in the cover panel 3714 and/or the heating element to provide an access point for the wireless signal to reach the UAV 10 unobstructed. As shown in FIG. 37, the cutout 3716 may be enclosed by the cover 2618 such that the cutout 3716 does not expose the cavity 3702 of the cover 2618 to external elements (e.g., moisture and/or debris).

Figure 39:
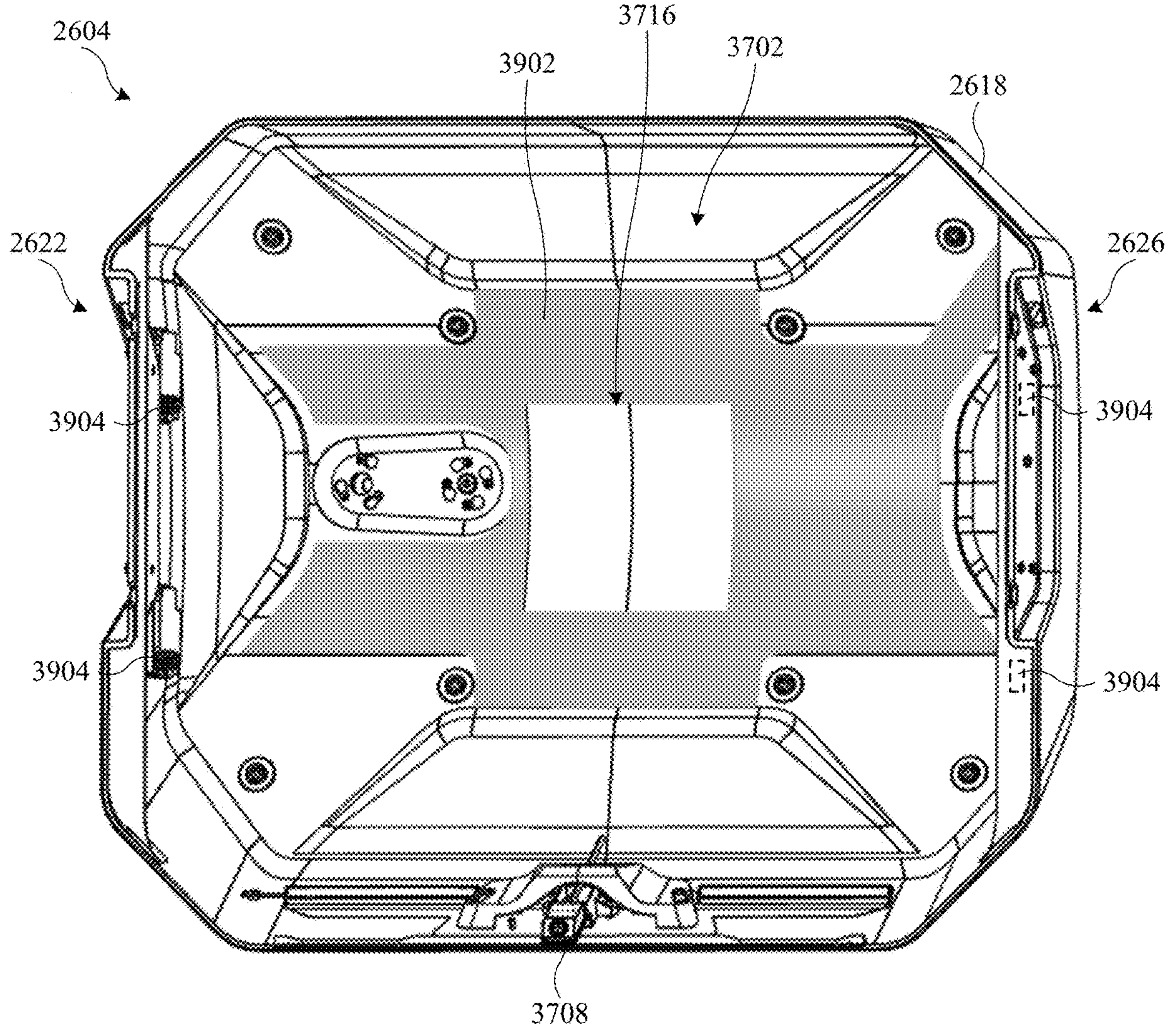
FIG. 39 is close-up view of the roof assembly shown in FIG. 37 highlighting a heating element of the cover.

To further illustrate, FIG. 39 is another perspective view of the cover 2618 with the cover panel 3714 removed to better show a heating element of the roof assembly 2604, such as the heating element 3902 (shaded for illustrative purposes). As discussed above, the heating element 3902 may be disposed along an interior surface of the cover 2618 and located within the cavity 3702 of the cover 2618. The heating element 3902 may be located between the interior surface of the cover 2618 and the cover panel 3714, and may at least partially define the cutout 3716 in conjunction with the cover panel 3714. A size and/or shape of the heating element 3902 and/or a position of the heating element 3902 is not particularly limited to any one configuration, and FIG. 40 is intended only as an illustrative configuration.

The heating element 3902 may facilitate de-icing of one or more of the roof assembly 2604, the base 2602, or the UAV 10. The heating element 3902 may be any type of heating element that may increase a temperature of at least a portion of the base station 2600. For example, the heating element 3902 may be a positive temperature coefficient (PTC) heater, a resistance wire heater, an infrared heater, another type of heating element, or a combination thereof. As such, the heating element 3902 may increase a temperature of the cover 2618 and/or the base 2602 (e.g., the body 2612 or one or more components therein) to prevent unwanted ice and/or snow accumulation, which may inhibit operation of the base station 2600. Similarly, the heating element 3902 may increase an overall temperature of the base station 2600 to maintain a temperature of the UAV 10 therein.

As discussed above, the UAV 10 may be in wireless communication with the external electronic device through the cutout 3716. The roof assembly 2604 may also be in wireless communication with the external electronic device (or another electronic device). For example, the roof assembly 2604 may include one or more antennas 3904 coupled to the interior surface of the cover 2618 and contained within the cavity 3702 of the cover 2618. For example, a first pair of the antennas 3904 may be disposed near the first side 2622 of the cover 2618 and a second pair of the antennas 3904 may be disposed near the opposing second side 2626 of the cover 2618. As such, the antennas 3904 may be spaced apart from the UAV 10 when docked and/or may be spaced apart from the camera 3708 to prevent electrical interface with the UAV 10 and/or the camera 3708. Thus, the antennas 3904 may act as a receiver and/or a transmitter to establish wireless communication with the external electronic device.

Figure 40:
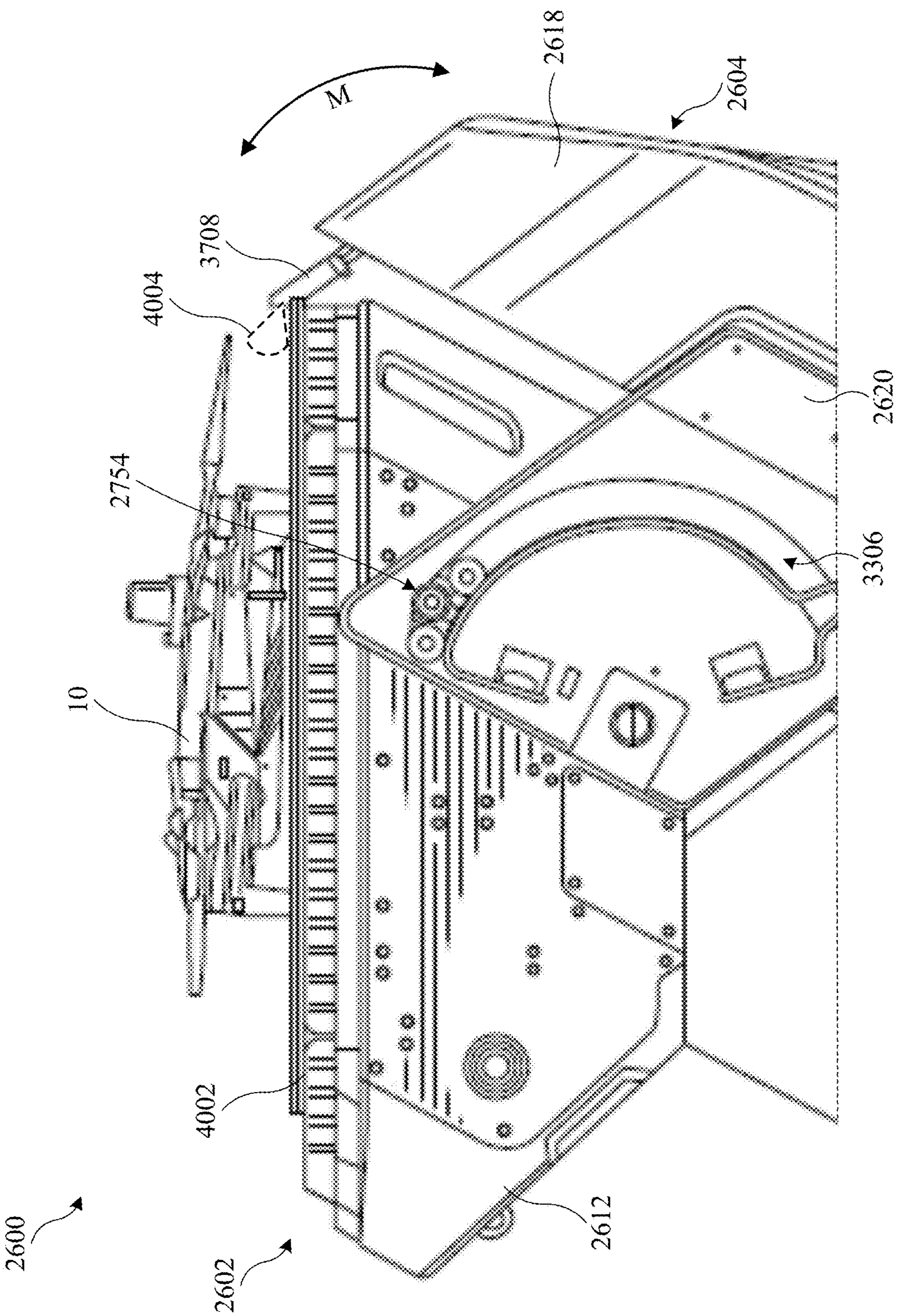
FIG. 40 is a side view of the base station shown in FIG. 26 illustrating the roof assembly of the base station in an open position.

FIG. 40 illustrates a side view of the base station 2600 having the roof assembly 2604 in an open position. As discussed above, the roof assembly 2604 may move in the direction of movement (M) between the closed position, in which the cover 2618 may enclose the landing platform, such as the landing platform 4002, and the UAV 10 supported thereon, and the open position, in which the cover 2618 may be located at least partially below the landing platform 4002—and thus also partially below the base 2602—with respect to the elevational direction 2606 such that the landing platform 4002 may be unobstructed by the cover 2618 to facilitate takeoff and landing of the UAV 10. In the open position, the roof assembly 2604 may also be at least partially inboard of the back side of the base 2602 with respect to the longitudinal direction 2610 such that at least a portion of the roof assembly 2604 (e.g., a portion of the cover 2618) is contained beneath the base 2602.

Such positioning of the roof assembly 2604 in the closed position and the open position may be dictated by the first drive assembly 2754 and the second drive assembly 2756. As discussed above, the drive assemblies may interact with the track 3306 of the first ear 2620 and the track 3306 of the second ear 3302, respectively, to define the angular range of motion and the swing envelope of the roof assembly 2604. Moreover, as shown in FIG. 40, the drive assemblies may be located beneath the landing platform 4002 with respect to the elevational direction 2606.

Additionally, as discussed above, the roof assembly 2604 may include a camera 3708 coupled to the cover 2618. The camera 3708 may be positioned such that a field of view 4004 of the camera 3708 may monitor the landing platform 4002 when the roof assembly 2604 is in the closed position. Similarly, the camera 3708 may also extending above the landing platform 4002 in the elevational direction 2606 when the roof assembly 2604 is in the closed position such that the field of view 4004 of the camera 3708 maintains monitoring of the landing platform 4002, and thus also maintains monitoring of the UAV 10. Thus, the camera 3708 may remain unobstructed by the base 2602 even when the roof assembly 2604 articulates between the closed position and the open position, such that the landing platform 4002 and the UAV 10 thereon may be accurately tracked.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately) 225°) and the term "generally orthogonal" should be understood as referring to configurations in with the pertinent components are oriented so as to define an angle therebetween that is equal to 90°±25% (i.e., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A base station for an unmanned aerial vehicle (UAV), comprising:

a base that includes:

a body defining a cavity therein; and a landing platform supported by the body and configured to support the UAV; and a roof assembly that includes a one-piece cover and that is movably coupled to the base to move between a closed position, in which the roof assembly is configured to enclose the landing platform, and an open position, in which the roof assembly is located such that the landing platform is unobstructed by the roof assembly, wherein the roof assembly is actuated between the closed position and the open position by a drive system that includes:

a first drive assembly located in the cavity of the body and extending through a first side panel of the body to couple to a first side of the roof assembly; and a second drive assembly located in the cavity of the body and extending through a second side panel of the body to couple to an opposing second side of the roof assembly.

2. The base station of claim 1, wherein the roof assembly includes:

a first ear fixedly coupled to a first side of the one-piece cover and movably coupled to a first side of the body; and a second ear fixedly coupled to an opposing second side of the one-piece cover and movably coupled to an opposing second side of the body.

3. The base station of claim 2, wherein:

the first drive assembly is movably coupled to the first ear;

the second drive assembly is movably coupled to the second ear; and the first drive assembly and the second drive assembly are located beneath the landing platform with respect to an elevational direction.

4. The base station of claim 2, wherein the first ear includes a first track that is configured to guide the first drive assembly during actuation of the roof assembly and the second ear includes a second track that is configured to guide the second drive assembly during actuation of the roof assembly.

5. The base station of claim 4, wherein the first track and the second track are symmetrical.

6. The base station of claim 4, wherein the first drive assembly is configured to engage a first belt disposed within the first track and the second drive assembly is configured to engage a second belt disposed within the second track to actuate the roof assembly.

7. The base station of claim 2, wherein the first ear is movably coupled to the first side of the body by a first pivot shaft projecting from the first ear into a first pivot opening defined by the first side panel, and wherein the second ear is movably coupled to the opposing second side of the body by a second pivot shaft projecting from the second ear into a second pivot opening defined by the second side panel.

8. The base station of claim 7, wherein the first pivot opening and the second pivot opening define an axis of rotation of the roof assembly, and wherein the first pivot shaft and the second pivot shaft are coaxial along the axis of rotation.

9. The base station of claim 8, wherein the first pivot opening is spaced apart from the first drive assembly and the second pivot opening is spaced apart from the second drive assembly.

10. A base station for an unmanned aerial vehicle (UAV), comprising:

a base that includes a landing platform configured to support the UAV; and a roof assembly movably coupled to the base and configured to move between a closed position, in which the roof assembly is configured to enclose the landing platform, and an open position, in which the roof assembly exposes the landing platform, wherein the roof assembly includes:

a one-piece cover;

an ear fixedly coupled to the one-piece cover, extending downward from the one-piece cover with respect to an elevational direction, and coupled to the base via a pivot shaft; and a drive assembly disposed within the base and coupled to the ear, wherein the drive assembly includes:

a drive shaft extending through the base and into the ear;

an actuator coupled to the drive shaft and configured to rotate the drive shaft; and a gear coupled to the drive shaft and in communication with the ear, wherein rotation of the drive shaft rotates the gear to drive the roof assembly between the closed position and the open position.

11. The base station of claim 10, wherein the drive assembly is coupled to the base by a mounting bracket located therebetween.

12. The base station of claim 10, wherein:

the ear defines a track;

a belt is disposed within the track; and the gear is positioned within the track and configured to engage with the belt to drive the roof assembly between the closed position and the open position.

13. The base station of claim 12, wherein rotational movement of the gear is configured to advance the belt along the gear to drive the roof assembly between the closed position and the open position.

14. The base station of claim 12, further comprising a retaining mechanism located at least partially within the base and coupled to the actuator, wherein the belt is routed through the retaining mechanism such that the retaining mechanism maintains engagement between the belt and the gear.

15. A base station for an unmanned aerial vehicle (UAV), comprising:

a base that includes:

a body defining a cavity therein; and a landing platform supported by the body; and a roof assembly movably coupled to the body and configured to move between a closed position and an open position, wherein the roof assembly includes:

a one-piece cover;

an ear fixedly coupled to the one-piece cover and movably coupled to the body via a pivot shaft; and a drive assembly disposed within the cavity of the body and movably coupled to the ear, wherein the drive assembly includes:

an actuator disposed within the cavity of the body and coupled to an interior surface of the body by a mounting bracket;

a drive shaft extending through an actuator opening defined by the body and a track defined by the ear, wherein the drive shaft is rotatably coupled to the actuator; and a gear coupled to the drive shaft and configured to engage a belt within the track, wherein rotation of the gear advances the belt along the gear to drive the roof assembly between the closed position and the open position.

16. The base station of claim 15, wherein the mounting bracket is secured within the actuator opening, and wherein the mounting bracket is keyed to the actuator opening to prevent rotation of the mounting bracket with respect to the body.

17. The base station of claim 15, wherein the drive shaft extends through the mounting bracket to couple to the gear.

18. The base station of claim 15, wherein a retaining mechanism is coupled to the mounting bracket and configured to maintain engagement between the belt and the gear, and wherein the retaining mechanism is guided along the track during movement of the roof assembly between the closed position and the open position.

19. The base station of claim 18, wherein the retaining mechanism includes one or more bushings that are guided along the track during movement of the roof assembly.

20. The base station of claim 19, wherein the retaining mechanism includes a pair of bushings that are disposed on opposing sides of the gear, and wherein the belt is routed around the gear and between the pair of bushings.

* * * * *